(12) United States Patent
Makhija et al.

(10) Patent No.: US 12,496,749 B2
(45) Date of Patent: Dec. 16, 2025

(54) PROCESS FOR RECYCLING POLYETHYLENE TEREPHTHALATE DETERMINED BY INTRINSIC VISCOSITY OF POLYETHYLENE TEREPHTHALATE

(71) Applicant: Revalyu Resources GmbH, Kleinostheim (DE)

(72) Inventors: Suresh L. Makhija, Mumbai (IN); Dhanvant Yeola, Nashik (IN); Christian Neumann, Hanau (DE)

(73) Assignee: Revalyu Resources GmbH, Kleinostheim (DE)

( * ) Notice: Subject to any disclaimer, the term of this patent is extended or adjusted under 35 U.S.C. 154(b) by 0 days.

(21) Appl. No.: 18/857,340

(22) PCT Filed: Sep. 19, 2023

(86) PCT No.: PCT/EP2023/075809
§ 371 (c)(1),
(2) Date: Oct. 16, 2024

(87) PCT Pub. No.: WO2024/061909
PCT Pub. Date: Mar. 28, 2024

(65) Prior Publication Data
US 2025/0262804 A1 Aug. 21, 2025

(30) Foreign Application Priority Data
Sep. 20, 2022 (EP) .................................... 22196676

(51) Int. Cl.
*C08J 11/24* (2006.01)
*B29B 17/02* (2006.01)
*C08J 11/02* (2006.01)

(52) U.S. Cl.
CPC .............. *B29B 17/02* (2013.01); *C08J 11/02* (2013.01); *C08J 11/24* (2013.01); *B29B 2017/0234* (2013.01); *B29B 2017/0237* (2013.01); *B29B 2017/0244* (2013.01); *C08J 2367/02* (2013.01)

(58) Field of Classification Search
USPC ........................ 521/44.5; 528/190, 193, 194
See application file for complete search history.

(56) References Cited

U.S. PATENT DOCUMENTS

| | | | |
|---|---|---|---|
| 3,884,850 A | 5/1975 | Ostrowski | |
| 3,907,868 A | 9/1975 | Currie et al. | |
| 4,609,680 A | 9/1986 | Fujita et al. | |
| 5,223,544 A | 6/1993 | Burkett et al. | |
| 5,710,315 A | 1/1998 | Gallagher | |
| 6,103,774 A | 8/2000 | Rule | |
| 6,136,869 A | 10/2000 | Ekart et al. | |
| 6,191,177 B1 | 2/2001 | Ekart et al. | |
| 6,223,904 B1 | 5/2001 | Stephan et al. | |
| 6,369,192 B1 | 4/2002 | Dufresne et al. | |
| 6,649,792 B2 | 11/2003 | Sirek et al. | |
| 6,706,843 B1 | 3/2004 | Ishihara | |
| 7,297,721 B2 | 11/2007 | Kulkarni | |
| 7,462,649 B2 | 12/2008 | Nakao et al. | |
| 7,802,685 B2 | 9/2010 | Allen et al. | |
| 7,807,728 B2 | 10/2010 | Yokoyama et al. | |
| 7,897,651 B2 | 3/2011 | Ikenaga | |
| 7,973,092 B2 | 7/2011 | Friedlaender | |
| 8,299,135 B2 | 10/2012 | Bhatt | |

(Continued)

FOREIGN PATENT DOCUMENTS

| | | |
|---|---|---|
| AU | 2020405780 | 6/2022 |
| BR | PI0402330 | 2/2006 |

(Continued)

OTHER PUBLICATIONS

IN202121037279A Singha "Chemical recycling of PET bottles flakes" (JB RPET Industries PVT LTD) Machine Translation (Year: 2021).*
ICPG, "The Importance of Controlling Intrinsic Viscosity in Extruded PET" Mar. 11, 2021 https://blog.icpg.co/the-importance-of-controlling-intrinsic-viscosity-in-extruded-pet; (Year: 2021).*
Jimmy Shah et al.—"The Importance of Controlling Intrinsic Viscosity in Extruded PET",—Mar. 11, 2021.
KWS—Screw Conveyor Basics "Design Engineering Manufacturing Screw"—Feb. 12, 2023.
"Intrinsic Viscosity Determination—Dilute Solution Viscometry"—Anton Paar Wiki—Feb. 1, 2023.
Celite Brand Diatomite Filter Aids for Maximum Clarity at Lowest Cost—Brochure—Jan. 1, 1999.

(Continued)

*Primary Examiner* — Terressa Boykin
(74) *Attorney, Agent, or Firm* — Dicke, Billig & Czaja, PLLC

(57) ABSTRACT

One aspect is a method for producing a first intermediate product.
A feedstock is provided that comprises a first polyester.
The feedstock is contacted with a first amount of a first organic compound in a volume section $V_1$ to obtain a first initial mixture. The first amount is in the form of a liquid.
The first polyester is contacted with a further organic compound in a volume section $V_3$ to obtain a further initial mixture.
A weight average molar mass of the first polyester is reduced in the volume section $V_3$ to obtain a first intermediate mixture. The first intermediate mixture comprises
  a first intermediate product and
  the further organic compound.
The first polyester is transported
  in a first direction that is at least partially opposite the direction of gravity when the first polyester has an intrinsic viscosity that is larger than or equal to $Y_{IV,1}$, where $Y_{IV,1}$ is 0.10 dL/g, and
  in further direction that is at least partially along the direction of gravity when the first polyester has an intrinsic viscosity that is less than or equal to $Y_{IV,2}$, where $Y_{IV,2}$ is 0.09 dL/g.

8 Claims, 13 Drawing Sheets

(56) References Cited

U.S. PATENT DOCUMENTS

| | | |
|---|---|---|
| 8,454,896 B2 | 6/2013 | Cavaglia' |
| 8,735,457 B2 | 5/2014 | Booth et al. |
| 8,877,107 B2 | 11/2014 | Hanimann et al. |
| 8,969,488 B2 | 3/2015 | Eckert et al. |
| 9,234,074 B2 | 1/2016 | Devraj |
| 9,353,237 B2 | 5/2016 | Morgan |
| 9,714,334 B2 | 7/2017 | Tabor et al. |
| 9,890,261 B2 | 2/2018 | Besse et al. |
| 10,273,332 B2 | 4/2019 | Tabor et al. |
| 11,396,588 B2 | 7/2022 | Parrott et al. |
| 12,071,509 B2 | 8/2024 | Thinon et al. |
| 12,157,792 B2 | 12/2024 | Thinon et al. |
| 2003/0134915 A1 | 7/2003 | Scantlebury et al. |
| 2009/0100616 A1 | 4/2009 | Haase |
| 2016/0009893 A1 | 1/2016 | Besse et al. |
| 2016/0122485 A1 | 5/2016 | Lim et al. |
| 2020/0283596 A1 | 9/2020 | Weber et al. |
| 2020/0399437 A1 | 12/2020 | Pawelski et al. |
| 2021/0040287 A1 | 2/2021 | Fang et al. |
| 2021/0094205 A1 | 4/2021 | Barenberg et al. |
| 2021/0230391 A1 | 7/2021 | Parrott et al. |
| 2022/0040889 A1 | 2/2022 | Rose et al. |
| 2022/0041836 A1 | 2/2022 | De Oliveira et al. |
| 2022/0325064 A1 | 10/2022 | Atkins et al. |
| 2022/0396679 A1 | 12/2022 | Wolters et al. |
| 2022/0396680 A1 | 12/2022 | Wolters et al. |
| 2023/0070962 A1 | 3/2023 | DeBruin et al. |
| 2023/0078550 A1 | 3/2023 | DeBruin et al. |
| 2023/0087754 A1 | 3/2023 | DeBruin et al. |
| 2023/0088250 A1 | 3/2023 | DeBruin et al. |
| 2023/0203268 A1 | 6/2023 | DeBruin et al. |
| 2023/0212370 A1 | 7/2023 | DeBruin et al. |
| 2023/0220181 A1 | 7/2023 | DeBruin et al. |
| 2025/0171608 A1 | 5/2025 | Makhija et al. |
| 2025/0171609 A1 | 5/2025 | Makhija et al. |
| 2025/0171610 A1 | 5/2025 | Makhija et al. |
| 2025/0171611 A1 | 5/2025 | Makhija et al. |
| 2025/0206907 A1 | 6/2025 | Makhija et al. |
| 2025/0206908 A1 | 6/2025 | Makhija et al. |
| 2025/0215184 A1 | 7/2025 | Makhija et al. |
| 2025/0215185 A1 | 7/2025 | Makhija et al. |

FOREIGN PATENT DOCUMENTS

| | | | |
|---|---|---|---|
| CN | 103146151 | 6/2013 | |
| CN | 103147163 | 6/2013 | |
| CN | 103357605 | 10/2013 | |
| CN | 103360260 | 10/2013 | |
| CN | 203346318 | 12/2013 | |
| CN | 103755933 | 4/2014 | |
| CN | 104327259 | 2/2015 | |
| CN | 104357938 | 2/2015 | |
| CN | 104447341 | 3/2015 | |
| CN | 105367415 | 3/2016 | |
| CN | 106832397 | 6/2017 | |
| CN | 107266664 | 10/2017 | |
| CN | 206883973 | 1/2018 | |
| CN | 108395373 | 8/2018 | |
| CN | 109134244 | 1/2019 | |
| CN | 109423699 | 3/2019 | |
| CN | 110273197 | 9/2019 | |
| CN | 110616474 | 12/2019 | |
| CN | 110698658 | 1/2020 | |
| CN | 110734578 | 1/2020 | |
| CN | 110818886 | 2/2020 | |
| CN | 111138641 | 5/2020 | |
| CN | 111849026 | 10/2020 | |
| CN | 111978686 | 11/2020 | |
| CN | 112608514 | 4/2021 | |
| CN | 112646135 | 4/2021 | |
| CN | 112759746 | 5/2021 | |
| DE | 19534276 | 3/1997 | |
| DE | 10140370 | 3/2003 | |
| DE | 102012220498 | 5/2014 | |
| DE | 102014220330 | 4/2016 | |
| EP | 0723532 | 7/1996 | |
| EP | 2054207 | 5/2009 | |
| EP | 2784110 | 10/2014 | |
| EP | 2917273 | 9/2015 | |
| EP | 3778744 | 2/2021 | |
| EP | 3875523 | 9/2021 | |
| EP | 3875523 A1 * | 9/2021 | ............. C08J 11/24 |
| FR | 3030541 | 6/2016 | |
| GB | 2586249 | 2/2021 | |
| GB | 2598077 | 2/2022 | |
| IN | 202121037279 | 9/2022 | |
| IT | VR20060034 | 8/2007 | |
| JP | H10502680 | 3/1998 | |
| JP | 2003049020 | 2/2003 | |
| JP | 2003191241 | 7/2003 | |
| JP | 2003300933 | 10/2003 | |
| JP | 2004083899 | 3/2004 | |
| JP | 2005-527678 | 9/2005 | |
| JP | 2005350509 | 12/2005 | |
| JP | 2006143622 | 6/2006 | |
| JP | 4937521 | 10/2006 | |
| JP | 2009120766 | 6/2009 | |
| KR | 100837781 | 6/2008 | |
| KR | 20110038860 | 4/2011 | |
| KR | 20110080260 | 7/2011 | |
| KR | 20120114503 | 10/2012 | |
| KR | 20120133036 | 12/2012 | |
| KR | 101306580 | 9/2013 | |
| NZ | 252649 | 3/1996 | |
| WO | 93/23465 | 11/1993 | |
| WO | 9510499 | 4/1995 | |
| WO | 2005121230 | 12/2005 | |
| WO | 2006044154 | 4/2006 | |
| WO | 2008017843 | 2/2008 | |
| WO | 2011043515 | 4/2011 | |
| WO | 2014072483 | 5/2014 | |
| WO | 2016/096768 | 6/2016 | |
| WO | 2021/096768 | 6/2016 | |
| WO | 2016123558 | 8/2016 | |
| WO | 2017092071 | 6/2017 | |
| WO | 2020058679 | 3/2020 | |
| WO | 2020061521 | 3/2020 | |
| WO | 2020/149798 | 7/2020 | |
| WO | 2020156966 | 8/2020 | |
| WO | 2021028695 | 2/2021 | |
| WO | 2021089803 | 5/2021 | |
| WO | 2021089809 | 5/2021 | |
| WO | 2021/122094 | 6/2021 | |
| WO | 2021163091 | 8/2021 | |
| WO | 2021163094 | 8/2021 | |
| WO | 2021163096 | 8/2021 | |
| WO | 2021163099 | 8/2021 | |
| WO | 2021211495 | 10/2021 | |
| WO | 2021211499 | 10/2021 | |
| WO | 2021211531 | 10/2021 | |
| WO | 2023176649 | 9/2023 | |
| WO | 2024061917 | 3/2024 | |

OTHER PUBLICATIONS

Plastic Tomra Material Sorting Waste Recycling, "High Performance Plastic Sorting Systems"—Feb. 9, 2023.

Leo-Wang et al—Kinetics of Diethylene Glycol Formation from—Department of chemical engineering—May 10, 1999.

Leian Bartolome et al.—Recent Developments in the Chemical Recycling of PET—Mar. 16, 2012.

International Search Report and Written Opinion in PCT/EP2023/075809 dated Oct. 11, 2023.

Kurihara et al. (Removal of Contaminations from Waste PET Bottles in Chemical Recycling, Journal of Environment and Engineering, vol. 5, No. 1, pp. 114-121, Published 2010) (Year: 2010).

Brivio (PET recycling: Review of the current available technologies and industrial perspectives, Advances in Chemical Engineering, vol. 60, pp. 215-267, Published Jan. 2022) (Year: 2022).

* cited by examiner

400

500

PROCESS FOR RECYCLING POLYETHYLENE TEREPHTHALATE DETERMINED BY INTRINSIC VISCOSITY OF POLYETHYLENE TEREPHTHALATE

CROSS-REFERENCE TO RELATED APPLICATIONS

This Utility Patent Application claims priority under 35 U.S.C. § 371 to International Application Serial No. PCT/EP2023/075809, filed Sep. 19, 2023, which claims the benefit of EP patent application Ser. No. 22196676.5, filed Sep. 20, 2022; which are both incorporated herein by reference in their entirety.

FIELD OF THE INVENTION

The invention pertains to a method for producing a first intermediate product from a first polyester, e.g., a method for producing polyethylene terephthalate (PET) oligomers from PET flakes. The invention also pertains to the first intermediate product obtained by the aforementioned method. The invention further pertains to a method for producing a further intermediate product using the first intermediate product, e.g., the production of PET polymers using the PET oligomers. The invention also pertains to the further intermediate product. The invention also pertains to a product that comprises the further intermediate product, e.g., PET yarn.

BACKGROUND

Polyethylene terephthalate (PET) is one of the most widely used and economically important thermoplastic polymers. PET is used for, e.g., fibres for clothing, containers for food and beverages, such as bottles, and for films.

As a result of the wide usage of PET and its non-biodegradability, PET-containing products have created serious ecological concerns. Methods for recycling PET are thus very important in order to reduce the amount of PET waste. One method of recycling is the reduction of PET into the chemical components that are used to produce PET, followed by the polymerisation of the chemical components to obtain recycled PET. This is known as chemical recycling. Disadvantages of the chemical recycling process include the following: the recycling process is generally very energy inefficient, is ecologically unfriendly, and has a low throughput. In particular, if the PET is depolymerised to monomers, this requires long depolymerisation times, and leads to the production of large amounts of degradation products that can't be removed from the recycled PET. Very often it is also required to mix the PET that is chemically recycled with virgin PET in order to obtain a recycled PET product of sufficiently high quality.

The chemical recycling of polyethylene terephthalate is described by, e.g., Bartolome et al. (2012), *Recent Developments in the Chemical Recycling of PET*, Material Recycling—Trends and Perspectives. EP3778744 A1 discloses a method for recycling PET that includes mixing virgin PET liquid material with the recycled PET (virgin PET liquid material is defined as the chemical components required to produce virgin PET, i.e., PET that is not obtained using a recycling method). CN109134244 A discloses a method for recycling PET that uses both glycol and methanol to depolymerise PET. CN108395373 A discloses a method for recycling PET that uses ethylene glycol and propylene glycol.

Objects

An object of the present invention is to at least partially overcome at least one of the disadvantages encountered in the state of the art.

It is a further object of the invention to provide a method for producing a first intermediate product, wherein the method can remove more impurities during the production of the first intermediate product. Sources of impurities include the feedstock (used for the method for producing the first intermediate product), which contain impurities such as sand and polyvinyl chloride.

It is a further object of the invention to provide a method for producing a first intermediate product, wherein the method leads to an improved embrittlement of a first polyester. The first intermediate product is obtained from the first polyester.

It is a further object of the invention to provide a method for producing a first intermediate product, wherein the method leads to an improved heating of a first polyester. The first intermediate product is obtained from the first polyester.

It is a further object of the invention to provide a method for producing a first intermediate product, wherein the method leads to a higher yield of the first intermediate product.

It is a further object of the invention to provide a method for producing a first intermediate product, wherein the method increases the lifetime of at least one filtering means used in the plant for producing the first intermediate product.

It is a further object of the invention to provide a method for producing a first intermediate product, wherein the method can remove more caustic during the production of the first intermediate product. Caustic may be present due to, e.g., the feedstock (used for the method for producing the first intermediate product) having being subjected to a caustic wash.

It is a further object of the invention to provide a method for producing a first intermediate product, wherein the method can more effectively remove adhesives adhering to the feedstock (used for the method for producing the first intermediate product).

It is a further object of the invention to provide a method for producing a first intermediate product, wherein the transport rate of the feedstock through a production plant is increased. Here the feedstock refers to the feedstock of the method for producing the first intermediate product, and the production plant refers to the plant where the first intermediate product is produced.

It is a further object of the invention to provide a method for producing a first intermediate product, wherein the method has an improved transport efficiency for transporting, e.g., a first polyester, the first intermediate product, and a further intermediate product, through the plant where the first intermediate product is produced. Transport efficiency is improved by, e.g., reducing the occurrence of blockages.

It is a further object of the invention to provide a method for producing a first intermediate product that requires less energy, e.g., the energy required for depolymerising a first polyester. The first intermediate product is obtained from the first polyester.

It is a further object of the invention to provide a method for producing a first intermediate product, wherein the method has an increased throughput.

It is a further object of the invention to provide a method for producing a first intermediate product, wherein the method has a reduced carbon footprint.

It is a further object of the invention to provide a method for producing a first intermediate product, wherein the first intermediate product has an improved purity.

It is a further object of the invention to provide a first intermediate product that can be used in a method for producing a further intermediate product.

It is a further object of the invention to provide a method for producing a further intermediate product, wherein the method requires less energy.

It is a further object of the invention to provide a method for producing a further intermediate product, wherein the method has a reduced carbon footprint.

It is a further object of the invention to provide a method for producing a further intermediate product, wherein the method has an increased throughput.

It is a further object of the invention to provide a method for producing a further intermediate product, wherein the method has a decreased polymerisation time.

It is a further object of the invention to provide a method for producing a further intermediate product, wherein the further intermediate product has an improved colour quality.

It is a further object of the invention to provide a method for producing a further intermediate product, wherein the further intermediate product has an improved purity.

It is a further object of the invention to provide a further intermediate product that has an improved colour quality.

It is a further object of the invention to provide a further intermediate product that has an improved purity.

It is a further object of the invention to provide a method for producing a further intermediate product, wherein the further intermediate product is obtained by using an increased amount of the first intermediate product. E.g., the further intermediate product is PET polymers that are obtained by the polymerisation of PET oligomers and PET monomers (the first intermediate product), wherein the PET oligomers and PET monomers are obtained by the depolymerisation of PET products; in addition, the PET polymers are obtained by the addition of less than 1% virgin PET oligomers and esters that can be used to produce PET.

PREFERRED EMBODIMENTS OF THE INVENTION

A contribution to at least partially fulfilling at least one of the above-mentioned objects is made by any of the embodiments of the invention.

A $1^{st}$ embodiment of the invention is a method for producing a first intermediate product, comprising the steps of
a. providing a feedstock that comprises a first polyester;
b. contacting the feedstock with a first amount of a first organic compound in a volume section $V_1$ to obtain a first initial mixture, wherein the first amount is in the form of a liquid;
c. contacting the first polyester with a further organic compound, preferably in a volume section $V_3$, to obtain a further initial mixture;
d. reducing a weight average molar mass of the first polyester, preferably in the volume section $V_3$, to obtain a first intermediate mixture, wherein the first intermediate mixture comprises
   i. a first intermediate product,
   ii. the further organic compound;
wherein the first polyester is transported
I./ in a first direction that is at least partially opposite the direction of gravity when the first polyester has an intrinsic viscosity that is larger than or equal to $Y_{IV,1}$, where $Y_{IV,1}$ is 0.10 dL/g, more preferably 0.15 dL/g, even more preferably 0.20 dL/g, and further preferably 0.30 dL/g; and
II./ in further direction that is at least partially along the direction of gravity when the first polyester has an intrinsic viscosity that is less than or equal to $Y_{IV,2}$, where $Y_{IV,2}$ is 0.09 dL/g, more preferably 0.07 dL/g, and even more preferably 0.05 dL/g.

In the $1^{st}$ embodiment, $Y_{1,IV} > Y_{2,IV}$. In an aspect of the $1^{st}$ embodiment, the transport should preferably be understood to mean at least one or all of the following: the transport of the first polyester from a first volume section to a further volume section (e.g., transport from the volume section $V_1$ to the volume section $V_2$, transport from the volume section $V_2$ to the volume section $V_3$), and the transport of the first polyester through a volume section (e.g., the volume section $V_1$, the volume section $V_3$). In an aspect of the $1^{st}$ embodiment, it is preferred that the first polyester is first transported in the first direction, followed by the transporting of the first polyester in the further direction. In an aspect of the $1^{st}$ embodiment, it is preferred that the first polyester is transported in the first direction after having being contacted with the first amount of a first organic compound in the volume section $V_1$. In an aspect of the $1^{st}$ embodiment, it is preferred that the first polyester is either transported in the first direction, the further direction, or both, when the intrinsic viscosity of the first polyester is in the range of $Y_{2,IV}$ to $Y_{1,IV}$. In an aspect of the $1^{st}$ embodiment, it is preferred that at least a fraction of an organic compound, preferably the first organic compound, is transported against the first direction when the first polyester is transported along the first direction. In an aspect of the $1^{st}$ embodiment, it is preferred that at least a fraction of an organic compound, preferably the further organic compound, is transported along the further direction when the first polyester is transported along the further direction. In an aspect of the $1^{st}$ embodiment, it is preferred that $Y_{IV,1}$ and $Y_{IV,2}$ have one of the following combination of values in features I./ and II./: $Y_{IV,1}$ is 0.10 dL/g and $Y_{IV,2}$ is 0.09 dL/g; $Y_{IV,1}$ is 0.15 dL/g and $Y_{IV,2}$ is 0.07 dL/g; $Y_{IV,1}$ is 0.20 dL/g and $Y_{IV,2}$ is 0.05 dL/g; $Y_{IV,1}$ is 0.30 dL/g and $Y_{IV,2}$ is 0.05 dL/g; $Y_{IV,1}$; is 0.10 dL/g and $Y_{IV,2}$ is 0.05 dL/g; or $Y_{IV,1}$ is 0.30 dL/g and $Y_{IV,2}$ is 0.09 dL/g. In an aspect of the $1^{st}$ embodiment, it is preferred that the transport of the first polyester along the first direction comprises at least one or all of the following: transport from the volume section $V_1$ to the volume section $V_2$, transport through the volume section $V_2$, or both. In an aspect of the $1^{st}$ embodiment, it is preferred that the transport of the first polyester along the further direction comprises transport through the volume section $V_3$. In an aspect of the $1^{st}$ embodiment, it is preferred that when the first polyester is transported in the first direction, the first polyester has a temperature in the range of 50° C. to 220° C., more preferably in the range of 65° C. to 200° C. In an aspect of the $1^{st}$ embodiment, it is preferred that when the first polyester is transported in the further direction, the first polyester has a temperature in the range of 180° C. to 220° C., more preferably in the range of 180° C. to 210° C. In an aspect of the $1^{st}$ embodiment, it is preferred that the first polyester is in the form of a plurality of fragments.

In an aspect of the $1^{st}$ embodiment, it is preferred that the first intermediate mixture further comprises the first organic compound. In an aspect of the $1^{st}$ embodiment, it is preferred that the further organic compound is in the form of a liquid. In an aspect of the $1^{st}$ embodiment, it is preferred that, prior to the contact of the feedstock with the first amount of the first organic compound, at least a fraction of the first amount of the first organic compound is fed into the volume section $V_1$. In this aspect, it is preferred that the temperature of the at least a fraction of the first amount of the first organic compound that is fed in the volume section $V_1$ has a temperature in the range of 100° C. to 160° C., more preferably in the range of 115° C. to 145° C. In an aspect of the $1^{st}$ embodiment, it is preferred that, prior to the contact of the feedstock with the first amount of the first organic compound, the first polyester is fed into the volume section $V_1$. In this aspect it is preferred that the temperature of the first polyester that is fed in the volume section $V_1$ has a temperature in the range of 0° C. to 60° C., and more preferably in the range of 10° C. to 40° C. In an aspect of the $1^{st}$ embodiment, it is preferred that, prior to the contact of the feedstock with the first amount of the first organic compound, at least a fraction of the first amount of the first organic compound and the feedstock are fed separately into the volume section $V_1$. E.g., the fraction of the first amount and the feedstock are fed into the volume section $V_1$ using different inlets.

In a preferred embodiment of the method for producing a first intermediate product, the first polyester in the feedstock has a density in the range of 1.25 g/cm³ to 1.55 g/cm³, more preferably in the range of 1.28 g/cm³ to 1.50 g/cm³, and further preferably in the range of 1.31 g/cm³ to 1.47 g/cm³. This preferred embodiment is a $2^{nd}$ embodiment of the invention, that preferably depends on the $1^{st}$ embodiment of the invention.

In an aspect of the $2^{nd}$ embodiment, examples of the first polyester are amorphous PET with a density in the range of 1.33 g/cm³ to of 1.39 g/cm³, and single crystal PET with a density of 1.455 g/cm³.

In a preferred embodiment of the method for producing a first intermediate product, the first polyester is selected from the group consisting of a polyethylene terephthalate, a polybutylene terephthalate, a polylactide, a polytrimethylene terephthalate, a polyethylene naphthalate, a polycarbonate, a polyester carbonate, a polyarylate, a polyester resin, preferably an unsaturated polyester resin, and a combination of two or more thereof. This preferred embodiment is a $3^{rd}$ embodiment of the invention, that preferably depends on any of the $1^{st}$ to $2^{nd}$ embodiments of the invention.

In an aspect of the $3^{rd}$ embodiment, it is particularly preferred that the first polyester is polyethylene terephthalate.

In a preferred embodiment of the method for producing a first intermediate product, the feedstock comprises at least 65 wt-%, more preferably at least 85 wt-%, even more preferably at least 95 wt-%, and further preferably at least 99 wt-%, based on a total weight of the feedstock, of the first polyester. This preferred embodiment is a $4^{th}$ embodiment of the invention, that preferably depends on any of the $1^{st}$ to $3^{rd}$ embodiments of the invention.

In an aspect of the $4^{th}$ embodiment, it is preferred that the first polyester is polyethylene terephthalate. In a further aspect of the $4^{th}$ embodiment, it is preferred that the feedstock comprises less than 1 wt-%, more preferably less than 0.1 wt-%, and further preferably less than 0.01 wt-% of a polyamide, based on a total weight of the feedstock.

In a preferred embodiment of the method for producing a first intermediate product, the feedstock has a bulk density in the range of 0.10 g/cm³ to 0.75 g/cm³, more preferably in the range of 0.15 g/cm³ to 0.65 g/cm³, even more preferably in the range of 0.18 g/cm³ to 0.50 g/cm³, further preferably in the range of 0.20 g/cm³ to 0.40 g/cm³ and even further preferably in the range of 0.22 g/cm³ to 0.37 g/cm³. This preferred embodiment is a $5^{th}$ embodiment of the invention, that preferably depends on any of the $1^{st}$ to $4^{th}$ embodiments of the invention.

In a preferred embodiment of the method for producing a first intermediate product, the feedstock further comprises at least one impurity. This preferred embodiment is a $6^{th}$ embodiment of the invention, that preferably depends on any of the $1^{st}$ to $5^{th}$ embodiments of the invention.

In a preferred embodiment of the method for producing a first intermediate product, the at least one impurity in the feedstock is in the range of 10 ppm wt to 10000 ppm wt, more preferably in the range of 20 ppm wt to 4000 ppm wt, even more preferably in the range of 30 ppm wt to 3000 ppm wt, and further preferably in the range of 40 ppm wt to 2500 ppm wt, where the wt is based on a total weight of the feedstock. This preferred embodiment is a $7^{th}$ embodiment of the invention, that preferably depends on the $6^{th}$ embodiment of the invention.

In an aspect of the $7^{th}$ embodiment, it is preferred that the ppm values given for the at least one impurity are measured after the feedstock has been subjected to a washing step. In another aspect of the $7^{th}$ embodiment, it is preferred that the ppm values given for the at least one impurity are measured when the first polyester is provided in the form of a plurality of fragments.

In a preferred embodiment of the method for producing a first intermediate product, the first polyester in the feedstock is in the form of a plurality of fragments. This preferred embodiment is an $8^{th}$ embodiment of the invention, that preferably depends on any of the $1^{st}$ to $7^{th}$ embodiments of the invention.

In a preferred embodiment of the method for producing a first intermediate product, the fragments are in a form that is selected from the group consisting of flakes, threads, fibres, particles, splinters, sheets, films, and a combination of two or more thereof. This preferred embodiment is a $9^{th}$ embodiment of the invention, that preferably depends on the $8^{th}$ embodiment of the invention.

In an aspect of the $9^{th}$ embodiment, flakes are particularly preferred.

In a preferred embodiment of the method for producing a first intermediate product, at least 50 wt-%, more preferably at least 60 wt-%, even more preferably at least 70 wt-%, further preferably at least 80 wt-%, and even further preferably at least 85 wt-% of the fragments, based on a total weight of the plurality of fragments in the feedstock, have at least one or all of the following properties:
a. a first dimension in the range of 0.1 mm to 25.0 mm, more preferably in the range of 0.5 mm to 20.0 mm, even more preferably in the range of 1.0 mm to 15.0 mm, and further preferably in the range of 2.5 mm to 13 mm;
b. a thickness in the range of 0.1 mm to 3.5 mm, more preferably in the range of 0.2 mm to 3.0 mm, and further preferably in the range of 0.3 mm to 2.7 mm.

This preferred embodiment is a $10^{th}$ embodiment of the invention, that preferably depends on any of the $8^{th}$ to $9^{th}$ embodiments of the invention.

Examples of the first dimension in the $10^{th}$ embodiment is a width and a length. In an aspect of the $10^{th}$ embodiment, all possible combination of the features a. and b. are preferred aspects of the embodiment. These combinations are e.g., a; b; a+b.

In a preferred embodiment of the method for producing a first intermediate product, 30 wt-% or less, more preferably 27 wt-% or less, even more preferably 23 wt-% or less, and further preferably 20 wt-% or less of the fragments, based on a total weight of the plurality of fragments in the feedstock, have a thickness that is equal to or larger than 1.0 mm. This preferred embodiment is an 11$^{th}$ embodiment of the invention, that preferably depends on any of the 8$^{th}$ to 10$^{th}$ embodiments of the invention.

In an optional aspect of the 11$^{th}$ embodiment, in the range of 1 wt-% to 30 wt-%, optionally in the range of 2 wt % to 27 wt-%, optionally in the range of 5 wt-% to 23 wt-%, or optionally in the range of 7 wt-% to 20 wt-% of the fragments have a thickness that is equal to or larger than 1.0 mm. In an aspect of the 11$^{th}$ embodiment, it is preferred that the wt-% ranges apply to fragments that have a thickness in the range of 1.0 mm to 4.0 mm, more preferably in the range of 1.0 mm to 3.5 mm, and further preferably in the range of 1.0 mm to 2.7 mm.

In a preferred embodiment of the method for producing a first intermediate product, the plurality of fragments are at least partially sorted according to a physical property. This preferred embodiment is a 12$^{th}$ embodiment of the invention, that preferably depends on any of the 8$^{th}$ to 11$^{th}$ embodiments of the invention.

In an aspect of the 12$^{th}$ embodiment, it is preferred that the at least partial sorting is done according to at least one of the following properties of the fragments: a weight, a thickness, a colour, an optical classification based on an absorption of light, an electrical property, an aerodynamic property, a width, a length, a geometric shape (e.g., a curvature), or a combination of two or more thereof. In an aspect of the 12$^{th}$ embodiment, it is preferred that the sorting is done prior to contacting the feedstock with the first amount of the first organic compound. In an aspect of the 12$^{th}$ embodiment, it is preferred that the physical property is not a density of the fragments.

In a preferred embodiment of the method for producing a first intermediate product, the plurality of fragments are at least partially sorted using at least one or all of the following:

a. a sieve;
b. a gravity separator;
c. a means adapted and arrange for settling;
d. a centrifuge.

This preferred embodiment is a 13$^{th}$ embodiment of the invention, that preferably depends on the 12$^{th}$ embodiment of the invention.

In an aspect of the 13$^{th}$ embodiment, all possible combination of the features a. to d. are preferred aspects of the embodiment. These combinations are e.g., a; b; c; d; a+b; a+c; a+d; b+c; b+d; c+d; a+b+c; a+b+d; a+c+d; b+c+d; a+b+c+d. In an aspect of the 13$^{th}$ embodiment, it is preferred to use a means that does not use a density of the first polyester to perform the at least partial sorting. In an aspect of the 13$^{th}$ embodiment, a gravity separator is particularly preferred. In this aspect, a gravity separator that does not require a fluid to perform the at least partial sorting is more preferred. A suitably gravity separator can be obtained from, e.g., Cimbria Heid GmbH (Austria).

In a preferred embodiment of the method for producing a first intermediate product, the first organic compound has at least one or all of the following properties:

a. comprises at least two hydroxyl groups e.g., diol with 2 hydroxyl groups, triol with 3 hydroxyl groups;
b. a molar mass of at least 60 g/mol;
c. a boiling point of at least 192° C., and more preferably at least 195° C.

This preferred embodiment is a 14$^{th}$ embodiment of the invention, that preferably depends on any of the 1$^{st}$ to 13$^{th}$ embodiments of the invention.

Examples of the first organic compound include (mono) ethylene glycol, propylene glycol, and glycerol. In an aspect of the 14$^{th}$ embodiment, all possible combination of the features a. to c. are preferred aspects of the embodiment. These combinations are e.g., a; b; c; a+b; a+c; b+c; a+b+c. In an aspect of the 14$^{th}$ embodiment, it is particularly preferred that the first organic compound is (mono)ethylene glycol, more preferably mono-ethylene glycol. In an aspect of the 14$^{th}$ embodiment, it is particularly preferred that the first organic compound is not propylene glycol.

In a preferred embodiment of the method for producing a first intermediate product, a temperature of the first initial mixture in the volume section $V_1$ is in the range of 50° C. to 90° C., more preferably in the range of 55° C. to 85° C., even more preferably in the range of 55° C. to 80° C., further preferably in the range of 60° C. to 80° C., and even further preferably in the range of 65° C. to 77° C. This preferred embodiment is a 15$^{th}$ embodiment of the invention, that preferably depends on any of the 1$^{st}$ to 14$^{th}$ embodiments of the invention.

In an aspect of the 15$^{th}$ embodiment, it is particularly preferred that the temperature of the first initial mixture is below the glass transition temperature of the first polyester. In an aspect of the 15$^{th}$ embodiment, it is preferred that a temperature of the first polyester in the volume section $V_1$ differs by less than 4%, more preferably by less than 2%, and further preferably by less than 1% from a temperature of the first organic compound in the volume section $V_1$.

In a preferred embodiment of the method for producing a first intermediate product, a mass ratio of the feedstock, more preferably the first polyester, to the first organic compound in the volume section $V_1$ is in the range of 0.02 to 3, more preferably in the range of 0.04 to 2.8, even more preferably in the range of 0.06 to 2.6, further preferably in the range of 0.08 to 2.4, and even further preferably in the range of 0.09 to 2.2. This preferred embodiment is a 16$^{th}$ embodiment of the invention, that preferably depends on any of the 1$^{st}$ to 15$^{th}$ embodiments of the invention.

In an aspect of the 16$^{th}$ embodiment, it is preferred that the mass ratio of the feedstock, more preferably the first polyester, to the first organic compound in the volume section $V_1$ is in the range of 0.02 to 1.3, more preferably in the range of 0.04 to 0.5, even more preferably in the range of 0.06 to 0.28, further preferably in the range of 0.08 to 0.22, and even further preferably in the range of 0.09 to 0.16. In an aspect of the 16$^{th}$ embodiment, it is preferred that the temperature in the volume section $V_1$ is in the range of 55° C. to 80° C. In an aspect of the 16$^{th}$ embodiment, it is more preferred that the temperature in the volume section $V_1$ is below 79° C. In an aspect of the 16$^{th}$ embodiment, it is preferred that the temperature in the volume section $V_1$ is in the range of 65° C. to 77° C.

In a preferred embodiment of the method for producing a first intermediate product, the first polyester in the volume section $V_1$ has an intrinsic viscosity in the range of 0.50 dL/g to 1.00 dL/g, more preferably in the range of 0.60 dL/g to 0.95 dL/g, even more preferably in the range of 0.70 dL/g to 0.90 dL/g, and further preferably in the range of 0.76 dL/g to 0.84 dL/g. This preferred embodiment is a 17$^{th}$ embodiment of the invention, that preferably depends on any of the 1$^{st}$ to 16$^{th}$ embodiments of the invention.

In a preferred embodiment of the method for producing a first intermediate product, at least one or all of the following applies to the first polyester in the volume section $V_1$:

a. the intrinsic viscosity of the first polyester varies by less than 15%, more preferably by less than 10%, even more preferably by less than 7%, further preferably by less than 5%, and even further preferably by less than 3%;
b. a weight average molar mass of the first polyester varies by less than 20%, more preferably by less than 15%, even more preferably by less than 10%, further preferably by less than 7%, and even further preferably by less than 5%.

This preferred embodiment is an $18^{th}$ embodiment of the invention, that preferably depends on any of the $1^{st}$ to $17^{th}$ embodiments of the invention.

In an aspect of the $18^{th}$ embodiment, all possible combination of the features a. and b. are preferred aspects of the embodiment. These combinations are e.g., a; b; a+b.

In a preferred embodiment of the method for producing a first intermediate product, at least one or all of the following applies:
a. a weight average molar mass of the first polyester, prior to being contacted with the first amount of the first organic compound, is in the range of 50 000 Da to 73 000 Da, more preferably in the range of 54 000 Da to 68 000 Da, and further preferably in the range of 57 000 Da to 65000 Da;
b. the weight average molar mass of the first polyester exiting the volume section $V_1$ is in the range of 40 000 Da to 76 000 Da, more preferably in the range of 44 000 Da to 74 000 Da, even more preferably in the range of 48 000 Da to 72 000 Da, and further preferably in the range of 50 000 Da to 70 000 Da.

This preferred embodiment is a $19^{th}$ embodiment of the invention, that preferably depends on any of the $1^{st}$ to $18^{th}$ embodiments of the invention.

In an aspect of the $19^{th}$ embodiment, all possible combination of the features a. and b. are preferred aspects of the embodiment. These combinations are e.g., a; b; a+b. In an aspect of the $19^{th}$ embodiment, it is preferred that the weight average molar mass of the first polyester exiting the volume section $V_1$ is in the range of 51 000 Da to 55 000 Da.

In a preferred embodiment of the method for producing a first intermediate product, a relative ratio of the particle count per area of the at least one impurity in the feedstock to the particle count per area of the at least one impurity at an outlet of the volume section $V_1$, is equal to or greater than 15, more preferably equal to or greater than 20, even more preferably equal to or greater than 25, further preferably equal to or greater than 30, and even further preferably equal to or greater than 35. This preferred embodiment is a $20^{th}$ embodiment of the invention, that preferably depends on any of the $6^{th}$ to $19^{th}$ embodiments of the invention.

In an aspect of the $20^{th}$ embodiment, it is preferred that the relative ratio of the particle count per area of the at least one impurity in the feedstock to the particle count per area of the at least one impurity at the outlet of the volume section $V_1$, is equal to or less than 1000, more preferably equal to or less than 500, and even more preferably equal to or less than 250.

In a preferred embodiment of the method for producing a first intermediate product, a residence time of the first polyester in the volume section $V_1$ is in the range of 5 min to 45 min, more preferably in the range of 8 min to 40 min, and further preferably in the range of 10 min to 30 min. This preferred embodiment is a $21^{st}$ embodiment of the invention, that preferably depends on any of the $1^{st}$ to $20^{th}$ embodiments of the invention.

In a preferred embodiment of the method for producing a first intermediate product, a pressure in the volume section $V_1$ is in the range of 75 kPa to 130 kPa, more preferably in the range of 90 kPa to 115 kPa, further preferably in the range of 95 kPa to 107 kPa, and even further preferably in the range of 98 kPa to 103 kPa. This preferred embodiment is a $22^{nd}$ embodiment of the invention, that preferably depends on any of the $1^{st}$ to $21^{st}$ embodiments of the invention.

In an aspect of the $22^{nd}$ embodiment, it is preferred that the pressure in the volume section $V_1$ is atmospheric pressure.

In a preferred embodiment of the method for producing a first intermediate product, the method further comprises the step of agitating the first initial mixture in the volume section $V_1$. This preferred embodiment is a $23^{rd}$ embodiment of the invention, that preferably depends on any of the $1^{st}$ to $22^{nd}$ embodiments of the invention.

In an aspect of the $23^{rd}$ embodiment, it is preferred that the first initial mixture is agitated using a mechanical means adapted and arranged for agitation, a non-mechanical means adapted and arranged for agitation, or a combination thereof. In this aspect, it is further preferred that the mechanical means, the non-mechanical means, or both, are adapted and arranged for suspending particles in a liquid, e.g., suspending a plurality of fragments of the feedstock in the first organic compound. Suspension of particles can be achieved by, e.g., using a mechanical agitation means that has a number of revolutions per minute above a minimum value. In an aspect of the $23^{rd}$ embodiment, it is preferred that the first initial mixture is agitated such that impurities can float on the surface of the first initial mixture. This can be achieved, by, e.g., using an agitation means that has a number of revolutions per minute below a maximum value.

In a preferred embodiment of the method for producing a first intermediate product, the method further comprises the step of at least partially removing at least one impurity from the first initial mixture in the volume section $V_1$.

This preferred embodiment is a $24^{th}$ embodiment of the invention, that preferably depends on any of the $1^{st}$ to $23^{rd}$ embodiments of the invention.

In an aspect of the $24^{th}$ embodiment, it is preferred that the at least one impurity was present in the feedstock. In an aspect of the $24^{th}$ embodiment, it is preferred that a floatable separating means is used to at least partially remove the at least one impurity. In a further aspect of the $24^{th}$ embodiment, it is preferred that the at least one impurity is at least partially remove using skimming, filtration, or a combination thereof.

In a preferred embodiment of the method for producing a first intermediate product, the method further comprises the step of transporting the first polyester, preferably from the volume section $V_1$, to a volume section $V_2$. This preferred embodiment is a $25^{th}$ embodiment of the invention, that preferably depends on any of the $1^{st}$ to $24^{th}$ embodiments of the invention.

In an aspect of the $25^{th}$ embodiment, it is preferred to transport the first polyester to the volume section $V_2$ after the feedstock has been contacted with the first amount of the first organic compound in the volume section $V_1$. In another aspect of the $25^{th}$ embodiment, it is preferred that at least a fraction of the first organic compound in the volume section $V_1$ is transported along with the first polyester to the volume section $V_2$. In another aspect of the $25^{th}$ embodiment, it is preferred that at least a fraction of the first organic compound in the volume section $V_2$ is transported (e.g., flows) from the volume section $V_2$ to the volume section $V_1$. In an aspect of the $25^{th}$ embodiment, it is preferred to transport the first polyester to the volume section $V_2$ prior to contacting the first polyester with the further organic compound. In an aspect of the $25^{th}$ embodiment, it is preferred that a transport direction of the first polyester through the volume section $V_2$ is at least partially opposite to the direction of gravity, more preferably opposite the direction of gravity. In an aspect of the $25^{th}$ embodiment, it is preferred that the volume section $V_2$ is arranged at least partially vertically, more preferably vertically. An at least partial vertical arrangement should preferably be understood to mean that a longest dimension (e.g., length) of the volume section $V_2$ is not parallel to the ground. For example, if the volume section $V_2$ is arranged vertically, the length of the volume section $V_2$ is perpendicular to the ground.

In a preferred embodiment of the method for producing a first intermediate product, the volume section $V_2$ is at least partially filled with the first organic compound, and wherein
  i. a level of the first organic compound in the volume section $V_1$ is at a height $H_1$ from a floor, and
  ii. a level of the first organic compound in the volume section $V_2$ is at a height $H_2$ from the floor, and
wherein $H_1 < H_2$.

This preferred embodiment is a $26^{th}$ embodiment of the invention, that preferably depends on the $25^{th}$ embodiment of the invention.

In an aspect of the $26^{th}$ embodiment, it is preferred that at least a fraction of the first organic compound in the volume section $V_2$ was transported from the volume section $V_1$. In another aspect of the $26^{th}$ embodiment, it is preferred that at least a fraction of the first organic compound in the volume section $V_2$ was added via at least one inlet of the volume section $V_2$, e.g., an inlet of a further kind, and an inlet of an even-further kind. In this aspect, it is preferred that at least 50 wt-%, more preferably at least 60 wt-%, and further preferably at least 70 wt-% of the first organic compound in the volume section $V_2$ is due to the addition of the first organic compound via at least one inlet of the volume section $V_2$. The wt-% is based on the total weight of the first organic compound in the volume section $V_2$. "A further amount of the first organic compound" is an example of a fraction of the first organic compound added via at least one inlet. In an aspect of the $26^{th}$ embodiment, it is preferred to transport the first polyester from the volume section $V_1$ to a volume section $V_2$ via a siphon.

In a preferred embodiment of the method for producing a first intermediate product, the difference $H_2 - H_1$ is at least 1 cm, more preferably at least 10 cm, further preferably at least 30 cm and even further preferably at least 60 cm. This preferred embodiment is a $27^{th}$ embodiment of the invention, that preferably depends on the $26^{th}$ embodiment of the invention.

In an aspect of the $27^{th}$ embodiment, it is preferred that the difference $H_2 - H_1$ is less than 250 cm, more preferably less than 180 cm, even more preferably less than 160 cm, and further preferably less than 140 cm.

In a preferred embodiment of the method for producing a first intermediate product, prior to entering the volume section $V_2$, the first polyester is transported along an even-further direction, wherein the even-further direction is at least partially against the direction of gravity. This preferred embodiment is a $28^{th}$ embodiment of the invention, that preferably depends on any of the $25^{th}$ to $27^{th}$ embodiments of the invention.

In an aspect of the $28^{th}$ embodiment, it is preferred that at least a fraction of the first organic compound is transported in a direction opposite the even-further direction. E.g., the first polyester and a fraction of the first organic compound are transported in opposite directions.

In a preferred embodiment of the method for producing a first intermediate product, an angle between the even-further direction and a horizontal plane is in the range of 12° to 45°, more preferably in the range of 17° to 40°, even more preferably is in the range of 20° to 35°, further preferably in the range of 24° to 32°. This preferred embodiment is a $29^{th}$ embodiment of the invention, that preferably depends on the $28^{th}$ embodiment of the invention.

In an aspect of the $29^{th}$ embodiment, an example of a horizontal plane is a floor, e.g., a floor of a recycling plant. In an aspect of the $29^{th}$ embodiment, it is preferred that the horizontal plane is perpendicular to the direction of gravity.

In a preferred embodiment of the method for producing a first intermediate product, the method further comprises the step of contacting the first polyester with a further amount of the first organic compound, preferably in the volume section $V_2$. This preferred embodiment is a $30^{th}$ embodiment of the invention, that preferably depends on any of the $1^{st}$ to $29^{th}$ embodiments of the invention.

In an aspect of the $30^{th}$ embodiment, it is preferred to contact the first polyester with the further amount of the first organic compound prior to contacting the first polyester with the further organic compound.

In a preferred embodiment of the method for producing a first intermediate product, the method further comprises the step of increasing the temperature of the first polyester, preferably in the volume section $V_2$. This preferred embodiment is a $31^{st}$ embodiment of the invention, that preferably depends on any of the $1^{st}$ to $30^{th}$ embodiments of the invention.

In an aspect of the $31^{st}$ embodiment, it is preferred that the temperature is increased by the contact of the first polyester with the further amount of the first organic compound. In an aspect of the $31^{st}$ embodiment, it is preferred to increase the temperature prior to contacting the first polyester with the further organic compound.

In a preferred embodiment of the method for producing a first intermediate product, the temperature in the volume section $V_2$ is in the range of 50° C. to 220° C., more preferably in the range of 60° C. to 210° C., more preferably in the range of 65° C. to 205° C., and further preferably in the range of 68° C. to 200° C. This preferred embodiment is a $32^{nd}$ embodiment of the invention, that preferably depends on any of the $25^{th}$ to $31^{st}$ embodiments of the invention.

In an aspect of the $32^{nd}$ embodiment, it is preferred that the temperature in the volume section $V_2$ is the temperature of a mixture comprising the first polyester and the first organic compound.

In a preferred embodiment of the method for producing a first intermediate product, the volume section $V_2$ comprises a first zone and a further zone, and wherein at least one or all of the following applies:
  a. a relative ratio of the temperature in the first zone to the temperature in the further zone is in the range of 0.2 to 1.0, more preferably in the range of 0.3 to 0.9, and further preferably in the range of 0.4 to 0.8;
  b. a relative ratio of the mass ratio of the first polyester to the first organic compound in the first zone to the mass ratio of the first polyester to the first organic compound in the further zone is in the range of 0.01 to 0.90, more preferably in the range of 0.02 to 0.60, even more preferably in the range of 0.03 to 0.30, and further preferably in the range of 0.04 to 0.15.

This preferred embodiment is a $33^{rd}$ embodiment of the invention, that preferably depends on any of the $25^{th}$ to $32^{rd}$ embodiments of the invention.

In an aspect of the $33^{rd}$ embodiment, all possible combination of the features a. and b. are preferred aspects of the embodiment. These combinations are e.g., a; b; a+b.

In a preferred embodiment of the method for producing a first intermediate product, the volume section $V_2$ comprises a first zone and a further zone, and wherein at least one or all of the following applies:
   a. the temperature in the first zone is in the range of 50° C. to 220° C., preferably in the range of 50° C. to 190° C., more preferably in the range of 60° C. to 180° C., even more preferably in the range of 65° C. to 170° C., further preferably in the range of 68° C. to 160° C., and even further preferably in the range of 68° C. to 150° C.;
   b. the temperature in the further zone is in the range of 120° C. to 220° C., more preferably in the range of 130° C. to 210° C., even more preferably in the range of 135° C. to 205° C., and further preferably in the range of 138° C. to 200° C.;
   c. the mass ratio of the first polyester to the first organic compound in the first zone is in the range of 0.1 to 0.9, more preferably in the range of 0.2 to 0.8, even more preferably in the range of 0.3 to 0.6, and further preferably in the range of 0.4 to 0.5;
   d. the mass ratio of the first polyester to the first organic compound in the further zone is in the range of 1 to 20, more preferably in the range of 2 to 16, even more preferably in the range of 3 to 12, and further preferably in the range of 5 to 10.

This preferred embodiment is a $34^{th}$ embodiment of the invention, that preferably depends on any of the $25^{th}$ to $33^{rd}$ embodiments of the invention.

In an aspect of the $34^{th}$ embodiment, all possible combination of the features a. to d. are preferred aspects of the embodiment. These combinations are e.g., a; b; c; d; a+b; a+c; a+d; b+c; b+d; c+d; a+b+c; a+b+d; a+c+d; b+c+d; a+b+c+d. In an aspect of the $34^{th}$ embodiment, it is preferred that the temperature in the first zone increases from a first end of the first zone to a further end of the first zone. E.g., the temperature increases from 70° C., measured at the first end of the first zone, to 145° C., measured at the further end of the first zone. In this aspect, it is preferred that the first end of the first zone is located downstream of the further end of the first zone. E.g., the first end of the first zone is located near an inlet of the volume section $V_2$ through which the first polyester enters the volume section $V_2$. In another aspect of the $34^{th}$ embodiment, it is preferred that the temperature in the further zone increases from a first end of the further zone to a further end of the further zone. E.g., the temperature increases from 140° C., measured at the first end of the further zone, to 200° C., measured at the further end of the further zone. In this aspect, it is preferred that the first end of the further zone is located downstream of the further end of the further zone. E.g., the further end of the further zone is located near an outlet of the volume section $V_2$ through which the first polyester exits the volume section $V_2$. E.g., moving from an inlet to an outlet of the volume section $V_2$, the ends of the zones are arranged in this order: the first end of the first zone, the further end of the first zone, the first end of the further zone, and the further end of the further zone. In another aspect of the $34^{th}$ embodiment, it is preferred that the further end of the first zone forms the first end of the further zone. In an aspect of the $34^{th}$ embodiment, feature a., it is particularly preferred that the temperature in the first zone is in the range of 50° C. to 190° C., more preferably in the range of 60° C. to 180° C., even more preferably in the range of 65° C. to 170° C., further preferably in the range of 68° C. to 160° C., and even further preferably in the range of 68° C. to 150° C. In an aspect of the $34^{th}$ embodiment, feature a., it is preferred that the temperature in the first zone is in the range of 60° C. to 210° C., more preferably in the range of 60° C. to 200° C., further preferably in the range of 65° C. to 197° C., and even further preferably in the range of 67° C. to 196° C. In an aspect of the $34^{th}$ embodiment, feature a., it is particularly preferred that the temperature in the first zone is in the range of 50° C. to 196° C., more preferably in the range of 55° C. to 196° C., even more preferably in the range of 60° C. to 196° C., further preferably in the range of 65° C. to 196° C., and even further preferably in the range of 68° C. to 196° C. In an aspect of the $34^{th}$ embodiment, feature a., it is preferred that the temperature in the first zone is below the boiling point of the first organic compound. In an aspect of the $34^{th}$ embodiment, feature b., it is preferred that the temperature in the further zone is in the range of 160° C. to 220° C., more preferably in the range of 170° C. to 210° C., even more preferably in the range of 180° C. to 200° C., further preferably in the range of 185° C. to 196° C., and even further preferably in the range of 190° C. to 196° C. In an aspect of the $34^{th}$ embodiment, feature b., it is preferred that the temperature in the further zone is below the boiling point of the first organic compound.

In a preferred embodiment of the method for producing a first intermediate product, at least one or all of the following applies:
   a. a first fraction of the further amount of the first organic compound contacted with the first polyester is in the form of a gas, e.g., a vapour;
   b. a further fraction of the further amount of the first organic compound contacted with the first polyester is in the form of a liquid.

This preferred embodiment is a $35^{th}$ embodiment of the invention, that preferably depends on any of the $30^{th}$ to $34^{th}$ embodiments of the invention.

In the $35^{th}$ embodiment, the first fraction and the further fraction are measured in wt-%, based on the total weight of the further amount of the first organic compound that is contacted with the first polyester. In an aspect of the $35^{th}$ embodiment, all possible combination of the features a. and b. are preferred aspects of the embodiment.

These combinations are e.g., a; b; a+b. In the $35^{th}$ embodiment, a "fraction" (e.g., the first fraction, the further fraction) should preferably be understood to include a value of 100 wt-%. E.g., in the aspect of embodiment $35^{th}$, wherein only feature a. applies, the first fraction would be 100 wt-%. In the $35^{th}$ embodiment, the first fraction should preferably be understood to include first organic compound that was initially in gas form, but which has condensed prior to contact with the first polyester. In an aspect of the $35^{th}$ embodiment, feature a., it is preferred that the temperature of the first fraction of the further amount of the first organic compound is above the boiling point of the first organic compound. In an aspect of the $35^{th}$ embodiment, feature a., it is preferred that the temperature of the first fraction of the further amount of the first organic compound is in the range of 200° C. to 240° C., more preferably in the range of 210° C. to 230° C. In an aspect of the $35^{th}$ embodiment, feature b., it is preferred that the temperature of the further fraction of the further amount of the first organic compound is below the boiling point of the first organic compound. In an aspect of the $35^{th}$ embodiment, feature b., it is preferred that the temperature of the further fraction of the further amount of the first organic compound is in the range of 180° C. to 196° C., more preferably in the range of 190° C. to 196° C.

In a preferred embodiment of the method for producing a first intermediate product, the first fraction makes up in the range of 50 wt-% to 90 wt-%, more preferably in the range of 55 wt-% to 85 wt-%, even more preferably in the range of 60 wt-% to 80 wt-%, further preferably in the range of 65 wt-% to 75 wt-%, of the further amount of the first organic compound. The wt-% is based on the total weight of the further amount of the first organic compound. This preferred embodiment is a 36$^{th}$ embodiment of the invention, that preferably depends on the 35$^{th}$ embodiment of the invention.

In the 36$^{th}$ embodiment, the sum of the wt-% of the first fraction and the wt-% of the further fraction add up to 100 wt-%. E.g., if the first fraction makes up 55 wt-% of the further amount of the first organic compound, the further fraction makes up the remaining 45 wt-% of the further amount of the first organic compound.

In a preferred embodiment of the method for producing a first intermediate product, the first polyester enters the volume section $V_2$ via at least one inlet of a first kind, and wherein at least one or all of the following applies:
 a. at least a fraction (e.g., a first fraction) of the further amount of the first organic compound enters the volume section $V_2$ via at least one inlet of a further kind, preferably in the form of a gas, wherein the at least one inlet of the further kind is adapted and arranged such that a flow direction of the further amount of first organic compound, which enters through the at least one inlet of the further kind, through the volume section $V_2$ is at least partially along a transport direction of the first polyester through the volume section $V_2$;
 b. at least a fraction (e.g., a further fraction) of the further amount of the first organic compound enters the volume section $V_2$ via at least one inlet of an even-further kind, preferably in the form of a liquid, wherein the at least one inlet of the even-further kind is adapted and arranged such that a flow direction of the further amount of first organic compound, which enters through the at least one inlet of the even-further kind, through the volume section $V_2$ is at least partially opposite the transport direction of the first polyester through the volume section $V_2$.

This preferred embodiment is a 37$^{th}$ embodiment of the invention, that preferably depends on any of the 30$^{th}$ to 36$^{th}$ embodiments of the invention.

In an aspect of the 37$^{th}$ embodiment, all possible combination of the features a. and b. are preferred aspects of the embodiment. These combinations are e.g., a; b; a+b. In an aspect of the 37$^{th}$ embodiment, it is preferred that the transport direction of the first polyester through the volume section $V_2$ is parallel to a length of the volume section $V_2$. In an aspect of the 37$^{th}$ embodiment, it is preferred that the transport direction of the first polyester through the volume section $V_2$ is at least partially opposite to the direction of gravity. In this aspect, it is more preferred that the transport direction is opposite the direction of gravity. In an aspect of the 37$^{th}$ embodiment, it is preferred that the fraction in feature a. is a first fraction of the further amount of the first organic compound. In an aspect of the 37$^{th}$ embodiment, it is preferred that the fraction in feature b. is a further fraction of the further amount of the first organic compound.

In a preferred embodiment of the method for producing a first intermediate product, at least one impurity is present in the volume section $V_2$. This preferred embodiment is a 38$^{th}$ embodiment of the invention, that preferably depends on any of the 25$^{th}$ to 37$^{th}$ embodiments of the invention.

In the 38$^{th}$ embodiment, an example of the at least one impurity is an impurity that was present in the feedstock, and which was transported from the volume section $V_1$ to the volume section $V_2$.

In a preferred embodiment of the method for producing a first intermediate product, the volume section $V_2$ comprises a first zone and a further zone, and wherein the relative ratio of the particle count per area of the at least one impurity in the first zone to a particle count per area of the at least one impurity in the further zone is equal to or greater than 10, more preferably equal to or greater than 15, even more preferably equal to or greater than 20, further preferably equal to or greater than 25, and even further preferably equal to or greater than 30. This preferred embodiment is a 39$^{th}$ embodiment of the invention, that preferably depends on the 38$^{th}$ embodiment of the invention.

In an aspect of the 39$^{th}$ embodiment, it is preferred that the relative ratio of the particle count per area of the at least one impurity in the first zone to a particle count per area of the at least one impurity in the further zone is equal to or less than 1000, more preferably equal to or less than 500, and even more preferably equal to or less than 250.

In a preferred embodiment of the method for producing a first intermediate product, at least one or all of the following applies to the volume section $V_2$:
 a. the pressure is in the range of 80 kPa to 135 kPa, more preferably in the range of 95 kPa to 120 kPa, further preferably in the range of 100 kPa to 115 kPa, and even further preferably in the range of 104 kPa to 109 kPa;
 b. an overpressure is in the range of 2 kPa to 12 kPa, more preferably in the range of 4 kPa to 8 kPa, and further preferably in the range of 5 kPa to 7 kPa.

This preferred embodiment is a 40$^{th}$ embodiment of the invention, that preferably depends on any of the 25$^{th}$ to 39$^{th}$ embodiments of the invention.

In an aspect of the 40$^{th}$ embodiment, all possible combination of the features a. and b. are preferred aspects of the embodiment. These combinations are e.g., a; b; a+b.

In a preferred embodiment of the method for producing a first intermediate product, the residence time of the first polyester in the volume section $V_2$ is in the range of 30 min to 270 min, more preferably in the range of 50 min to 250 min, and further preferably in the range of 80 min to 220 min. This preferred embodiment is a 41$^{st}$ embodiment of the invention, that preferably depends on any of the 25$^{th}$ to 40$^{th}$ embodiments of the invention.

In a preferred embodiment of the method for producing a first intermediate product, the method further comprises the step of reducing at least one or all of the following, preferably in the volume section $V_2$:
 a. the weight average molar mass of the first polyester;
 b. the intrinsic viscosity of the first polyester.

This preferred embodiment is a 42$^{nd}$ embodiment of the invention, that preferably depends on any of the 1$^{st}$ to 41$^{st}$ embodiments of the invention.

In an aspect of the 42$^{nd}$ embodiment, all possible combination of the features a. and b. are preferred aspects of the embodiment. These combinations are e.g., a; b; a+b. In an aspect of the 42$^{nd}$ embodiment, it is preferred to perform at least one or all of the steps a. and b. in the 42$^{nd}$ embodiment prior to contacting the first polyester with the further organic compound.

In a preferred embodiment of the method for producing a first intermediate product, at least one or all of the following applies:
 a. the weight average molar mass of the first polyester is reduced, preferably in the volume section $V_2$, by at least 50%, more preferably by at least 60%, even more preferably by at least 70%, further preferably by at least 75%, even further preferably at least 80%, and particularly preferably at least 85%;

b. the intrinsic viscosity of the first polyester is reduced, preferably in the volume section $V_2$, by at least 40%, more preferably by at least 50%, even more preferably by at least 60%, further preferably by at least 70%, and further preferably by at least 75%.

This preferred embodiment is a $43^{rd}$ embodiment of the invention, that preferably depends on the $42^{nd}$ embodiment of the invention.

In an aspect of the $43^{rd}$ embodiment, all possible combination of the features a. and b. are preferred aspects of the embodiment. These combinations are e.g., a; b; a+b. In an aspect of the $43^{rd}$ embodiment, it is preferred that the intrinsic viscosity of the first polyester is reduced by 97% or less, more preferably by 95% or less, even more preferably by 93% or less, and further preferably by 90% or less. In an aspect of the $43^{rd}$ embodiment, it is preferred that the intrinsic viscosity of the first polyester is reduced by a value that is in the range of 70% to 80%. In an aspect of the $43^{rd}$ embodiment, it is preferred that the weight average molar mass of the first polyester is reduced by 97% or less, more preferably by 95% or less, and further preferably by 93% or less. In an aspect of the $43^{rd}$ embodiment, it is preferred that the weight average molar mass of the first polyester is reduced by a value that is in the range of 85% to 93%.

In a preferred embodiment of the method for producing a first intermediate product, after the reduction step has been completed, preferably in the volume section $V_2$, the first polyester has at least one or all of the following properties:
 a. an intrinsic viscosity in the range of 0.08 dL/g to 0.45 dL/g, more preferably in the range of 0.10 dL/g to 0.35 dL/g, even more preferably in the range of 0.12 dL/g to 0.25 dL/g, and further preferably in the range of 0.12 dL/g to 0.19 dL/g;
 b. a weight average molar mass in the range of 3 000 Da to 7 500 Da, more preferably in the range of 3 200 Da to 7 300 Da, even more preferably in the range of 3 800 Da to 7 100 Da, and further preferably in the range of 4 000 Da to 6 900 Da.

This preferred embodiment is a $44^{th}$ embodiment of the invention, that preferably depends on any of the $42^{nd}$ to $43^{rd}$ embodiments of the invention.

In an aspect of the $44^{th}$ embodiment, all possible combination of the features a. and b. are preferred aspects of the embodiment. These combinations are e.g., a; b; a+b. In an aspect of the $44^{th}$ embodiment, it is preferred that the properties a. and b. are the properties of the first polyester that exits the volume section $V_2$. In an aspect of the $44^{th}$ embodiment, it is preferred that the weight average molar mass is in the range of 4 000 Da to 5 000 Da.

In a preferred embodiment of the method for producing a first intermediate product, the method further comprises the step of transporting the first polyester to a volume section $V_3$. This preferred embodiment is a $45^{th}$ embodiment of the invention, that preferably depends on any of the $1^{st}$ to $44^{th}$ embodiments of the invention.

In an aspect of the $45^{th}$ embodiment, it is preferred that the first polyester is transported from the volume section $V_1$ to the volume section $V_3$, more preferably via the volume section $V_2$. In other words, the first polyester can be transported from volume section $V_1$ to volume section $V_3$, without the first polyester passing through the volume section $V_2$. It is, however, more preferred that the first polyester is transported from the volume section $V_2$ to the volume section $V_3$.

In a preferred embodiment of the method for producing a first intermediate product, the further organic compound has at least one or all of the following properties:

a. comprises at least two hydroxyl groups, e.g., diol with 2 hydroxyl groups, triol with 3 hydroxyl groups;
 b. a molar mass of at least 60 g/mol;
 c. a boiling point of at least 192° C., and more preferably at least 195° C.

This preferred embodiment is a $46^{th}$ embodiment of the invention, that preferably depends on any of the $1^{st}$ to $45^{th}$ embodiments of the invention.

Examples of the further organic compound include (mono)ethylene glycol, propylene glycol, and glycerol. In an aspect of the $46^{th}$ embodiment, all possible combination of the features a. to c. are preferred aspects of the embodiment. These combinations are e.g., a; b; c; a+b; a+c; b+c; a+b+c. In an aspect of the $46^{th}$ embodiment, it is particularly preferred that the further organic compound is (mono)ethylene glycol, more preferably mono-ethylene glycol. In an aspect of the $46^{th}$ embodiment, it is particularly preferred that the further organic compound is not propylene glycol.

In a preferred embodiment of the method for producing a first intermediate product, the further initial mixture, preferably located in volume section $V_3$, is agitated. This preferred embodiment is a $47^{th}$ embodiment of the invention, that preferably depends on any of the $1^{st}$ to $46^{th}$ embodiments of the invention.

In an aspect of the $47^{th}$ embodiment, it is preferred that agitation is performed using a mechanical means adapted and arranged for agitation, a non-mechanical means adapted and arranged for agitation, or a combination thereof.

In a preferred embodiment of the method for producing a first intermediate product, the mass ratio of first polyester to the further organic compound in the further initial mixture, preferably at an entrance end of the volume section $V_3$, is larger than 1.0. This preferred embodiment is a $48^{th}$ embodiment of the invention, that preferably depends on any of the $1^{st}$ to $47^{th}$ embodiments of the invention.

In an aspect of the $48^{th}$ embodiment, it is preferred that the entrance end is the position where the first polyester enters the volume section $V_3$.

In a preferred embodiment of the method for producing a first intermediate product, the temperature of the further initial mixture, preferably in the volume section $V_3$, is in the range of 180° C. to 220° C., more preferably in the range of 180° C. to 210° C. This preferred embodiment is a $49^{th}$ embodiment of the invention, that preferably depends on any of the $1^{st}$ to $48^{th}$ embodiments of the invention.

In a preferred embodiment of the method for producing a first intermediate product, the pressure in the volume section $V_3$ is in the range of 75 kPa to 131 kPa, more preferably in the range of 90 kPa to 116 kPa, further preferably in the range of 95 kPa to 108 kPa, and even further preferably in the range of 98 kPa to 104 kPa. This preferred embodiment is a $50^{th}$ embodiment of the invention, that preferably depends on any of the $45^{th}$ to $49^{th}$ embodiments of the invention.

In an aspect of the $50^{th}$ embodiment, it is preferred that the pressure in the volume section $V_3$ is atmospheric pressure.

In a preferred embodiment of the method for producing a first intermediate product, a residence time of the further initial mixture in the volume section $V_3$ is in the range of 100 minutes to 560 minutes, more preferably in the range of 140 minutes to 440 minutes, and further preferably in the range of 170 minutes to 380 minutes. This preferred embodiment is a $51^{st}$ embodiment of the invention, that preferably depends on any of the $45^{th}$ to $50^{th}$ embodiments of the invention.

In a preferred embodiment of the method for producing a first intermediate product, the first intermediate mixture comprises at least 70 wt-%, more preferably at least 80 wt-%, even more preferably at least 85 wt-%, further preferably at least 90 wt-%, and even further preferably at least 94 wt-% of the first intermediate product. This preferred embodiment is a $52^{nd}$ embodiment of the invention, that preferably depends on any of the $1^{st}$ to $51^{st}$ embodiments of the invention.

In the $52^{nd}$ embodiment, the wt-% are based on a total weight of the first intermediate mixture. In an optional aspect of the $52^{nd}$ embodiment, the first intermediate mixture comprises in the range of 70 wt-% to 99 wt-%, optionally in the range of 80 wt-% to 95 wt-%, and optionally in the range of 88 wt-% to 92 wt-% of the first intermediate product.

In a preferred embodiment of the method for producing a first intermediate product, at least 40 wt-%, more preferably at least 50 wt-%, even more preferably at least 60 wt-%, further preferably at least 65 wt-%, and even further preferably at least 70 wt-% of the first intermediate product is in the form of oligomers that have in the range of 2 to 35, more preferably in the range of 2 to 30, even more preferably in the range of 2 to 25, and further preferably in the range of 2 to 20 repeating units. This preferred embodiment is a $53^{rd}$ embodiment of the invention, that preferably depends on any of the $1^{st}$ to $52^{nd}$ embodiments of the invention.

In the $53^{rd}$ embodiment, the wt-% are based on a total weight of the first intermediate product in the first intermediate mixture. In an aspect of the $53^{rd}$ embodiment, it is preferred that at least 40 wt-%, more preferably at least 50 wt-%, even more preferably at least 60 wt-%, further preferably at least 65 wt-%, and even further preferably at least 70 wt-% of the first intermediate product is in the form of oligomers that have a number of repeating units in at least one of the following ranges: 3 to 30, 4 to 30, 6 to 30, 8 to 30, 3 to 20, 4 to 20, 6 to 20. In an aspect of the $53^{rd}$ embodiment, it is preferred that at least 70 wt-% of the oligomers have in the range of 2 to 35, more preferably in the range of 2 to 30, even more preferably in the range of 2 to 25, and further preferably in the range of 2 to 20 repeating units. A preferred oligomer comprises repeating units of ethylene terephthalate. In an aspect of the $53^{rd}$ embodiment, it is preferred that at least 40 wt-%, more preferably at least 50 wt-%, even more preferably at least 60 wt-%, further preferably at least 65 wt-%, and even further preferably at least 70 wt-% of the first intermediate product is in the form of oligomers that have a number of repeating units in the range of 2 to 15, more preferably 2 to 12, and further preferably 2 to 10.

In a preferred embodiment of the method for producing a first intermediate product, at least one or all of the following applies:
  a. the first intermediate product comprises 30 wt-% or less, more preferably 25 wt-% or less, even more preferably 20 wt-% or less, further preferably 15 wt-% or less, and even further preferably 10 wt-% or less of a monomer;
  b. the first intermediate product comprises at least 70 wt-%, more preferably at least 75 wt-%, even more preferably at least 80 wt-%, further preferably at least 85 wt-%, and even further preferably at least 90 wt-% of an oligomer.

This preferred embodiment is a $54^{th}$ embodiment of the invention, that preferably depends on any of the $1^{st}$ to $53^{rd}$ embodiments of the invention.

In the $54^{th}$ embodiment, the wt-% are based on a total weight of the first intermediate product in the first intermediate mixture. In an aspect of the $54^{th}$ embodiment, all possible combination of the features a. and b. are preferred aspects of the embodiment. These combinations are e.g., a; b; a+b. For example, the first intermediate product comprises 20 wt-% of a monomer, and 80 wt-% of an oligomer. In the $54^{th}$ embodiment, an example of a monomer is BHET. In the $54^{th}$ embodiment, an example of an oligomer is a PET oligomer. In an optional aspect of the $54^{th}$ embodiment, the first intermediate product comprises in the range of 15 wt-% to 30 wt-%, and optionally in the range of 20 wt-% to 25 wt-% of the monomer. In an optional aspect of the $54^{th}$ embodiment, the first intermediate product comprises in the range of 70 wt-% to 85 wt-%, and optionally in the range of 75 wt-% to 85 wt-% of the oligomer. In an aspect of the $54^{th}$ embodiment, a particularly preferred oligomer has in the range of 2 to 10 repeating units.

In a preferred embodiment of the method for producing a first intermediate product, at least one or all of the following applies:
  a. the first intermediate product comprises at least 20 wt-%, more preferably at least 30 wt-%, even more preferably at least 40 wt-%, further preferably at least 50 wt-%, and even further preferably at least 60 wt-% of a monomer;
  b. the first intermediate product comprises at least 20 wt-%, preferably at least 30 wt-%, more preferably at least 40 wt-%, and further preferably at least 50 wt-% of an oligomer.

This preferred embodiment is an alternative embodiment of the $54^{th}$ embodiment of the invention, that preferably depends on any of the $1^{st}$ to $53^{rd}$ embodiments of the invention. In an aspect of the invention, any of the $55^{th}$ to $106^{th}$ embodiments of the invention preferably depend on this alternative embodiment of the $54^{th}$ embodiment of the invention. In the alternative $54^{th}$ embodiment, the wt-% are based on a total weight of the first intermediate product in the first intermediate mixture. In the alternative $54^{th}$ embodiment, an example of a monomer is BHET.

In the alternative $54^{th}$ embodiment, an example of an oligomer is a PET oligomer.

In an aspect of the alternative $54^{th}$ embodiment, all possible combination of the features a. and b. are preferred aspects of the embodiment. These combinations are e.g., a; b; a+b. In a preferred aspect of the alternative $54^{th}$ embodiment, feature a., the first intermediate product comprises in the range of 20 wt-% to 60 wt-%, more preferably in the range of 30 wt-% to 50 wt-%, and further preferably in the range of 35 wt-% to 40 wt-% of the monomer. In this aspect, it is preferred that the remaining wt-% of the first intermediate product is made up of oligomers. In an aspect of the alternative $54^{th}$ embodiment, a particularly preferred oligomer has in the range of 2 to 10 repeating units.

In a preferred embodiment of the method for producing a first intermediate product, the first intermediate product has at least one or all of the following properties:
  a. an intrinsic viscosity in the range of 0.010 dL/g to 0.120 dL/g, more preferably in the range of 0.030 dL/g to 0.090 dL/g, and further preferably in the range of 0.040 dL/g to 0.070 dL/g, and further preferably in the range of 0.045 dL/g to 0.065 dL/g;
  b. a weight average molar mass in the range of 350 Da to 800 Da, more preferably in the range of 450 Da to 650 Da, and further preferably in the range of 500 Da to 600 Da.

This preferred embodiment is a $55^{th}$ embodiment of the invention, that preferably depends on any of the $1^{st}$ to $54^{th}$ embodiments of the invention.

In an aspect of the 55$^{th}$ embodiment, all possible combination of the features a. and b. are preferred aspects of the embodiment. These combinations are e.g., a; b; a+b.

In a preferred embodiment of the method for producing a first intermediate product, at least one or all of the following applies:
a. the first intermediate mixture comprises 20 wt-% or less, more preferably 15 wt-% or less, even more preferably 12 wt-% or less, further preferably 10 wt-% or less, and even further preferably 8 wt-% or less of the further organic compound;
b. the first intermediate mixture comprises less than 15 wt-%, more preferably less than 10 wt-%, and further preferably less than 5 wt-% of a dicarboxylic acid, e.g., terephthalic acid.

This preferred embodiment is a 56$^{th}$ embodiment of the invention, that preferably depends on any of the 1$^{st}$ to 55$^{th}$ embodiments of the invention.

In an aspect of the 56$^{th}$ embodiment, all possible combination of the features a. and b. are preferred aspects of the embodiment. These combinations are e.g., a; b; a+b. In the 56$^{th}$ embodiment, the wt-% are based on a total weight of the first intermediate mixture. In an aspect of the 56$^{th}$ embodiment, the further organic compound should preferably be understood to be free, i.e., not chemically bound to the first intermediate product by a covalent bond. In an optional aspect of the 56$^{th}$ embodiment, the first intermediate mixture comprises in the range of 5 wt-% to 20 wt-%, optionally in the range of 7 wt-% to 15 wt-%, and optionally in the range of 9 wt-% to 12 wt-% of the further organic compound.

In a preferred embodiment of the method for producing a first intermediate product, the method further comprises the step of transporting the first intermediate mixture, preferably from the volume section $V_3$, to a volume section $V_4$. This preferred embodiment is a 57$^{th}$ embodiment of the invention, that preferably depends on any of the 1$^{st}$ to 56$^{th}$ embodiments of the invention.

In an aspect of the 57$^{th}$ embodiment, it is preferred that the intrinsic viscosity of the first intermediate product increases by less than 5%, more preferably by less than 3%, further preferably by less than 1%, and even further preferably by less than 0.1% in the volume section $V_4$. In another aspect of the 57$^{th}$ embodiment, it is preferred that the intrinsic viscosity of the first intermediate product decreases by less than 5%, more preferably by less than 3%, further preferably by less than 1%, and even further preferably by less than 0.1% in the volume section $V_4$. In yet another aspect of the 57$^{th}$ embodiment, it is preferred that the intrinsic viscosity of the first intermediate product varies (neither increases nor decreases) by less than 5%, more preferably by less than 3%, further preferably by less than 1%, and even further preferably by less than 0.1% in the volume section $V_4$.

In a preferred embodiment of the method for producing a first intermediate product, the method further comprises the step of adding first particulated material to the first intermediate mixture, preferably in the volume section $V_4$. This preferred embodiment is a 58$^{th}$ embodiment of the invention, that preferably depends on any of the 1$^{st}$ to 57$^{th}$ embodiments of the invention.

In an aspect of the 58$^{th}$ embodiment, it is preferred that the first particulated material is adapted and arranged for adsorption. In another aspect of the 58$^{th}$ embodiment, it is preferred that the first particulated material is adapted and arranged for de-colouring. In a further aspect of the 58$^{th}$ embodiment, it is preferred that the first particulated material is porous. In an aspect of the 58$^{th}$ embodiment, it is particularly preferred that the first particulated material is adapted and arranged for filtration, more preferably micro-filtration. Micro-filtration is the filtration of particles in the range of 0.5 μm-10 μm. In an aspect of the 58$^{th}$ embodiment, it is preferred to add the first particulate material after the weight average molar mass of the first polyester has been reduced.

In a preferred embodiment of the method for producing a first intermediate product, the first particulated material has a median pore diameter in the range of 5.0 μm to 20.0 μm, preferably in the range of 10.0 μm to 20.0 μm, and further preferably in the range of 15.0 μm to 18.0 μm. This preferred embodiment is a 59$^{th}$ embodiment of the invention, that preferably depends the 58$^{th}$ embodiment of the invention.

In a preferred embodiment of the method for producing a first intermediate product, the first particulated material has a pore diameter distribution with at least one mode in the range of 8 000 nm to 20 000 nm, more preferably in the range of 10 000 nm to 18 000 nm, and further preferably in the range of 10 000 nm to 15 000 nm. This preferred embodiment is a 60$^{th}$ embodiment of the invention, that preferably depends on any of the 58$^{th}$ to 59$^{th}$ embodiments of the invention.

In a preferred embodiment of the method for producing a first intermediate product, the first particulated material has a pore diameter distribution with at least two modes in the range of 8 000 nm and 20 000 nm, and wherein
a. at least one mode is in the range of 8 000 nm to 15 000 nm, preferably in the range of 10 000 nm to 15 000 nm;
b. at least one mode is in the range of >15 000 nm to 20 000 nm, preferably in the range of 16 000 nm to 18 000 nm.

This preferred embodiment is a 61$^{st}$ embodiment of the invention, that preferably depends on any of the 58$^{th}$ to 60$^{th}$ embodiments of the invention.

In an aspect of the 61$^{st}$ embodiment, all possible combination of the features a. and b. are preferred aspects of the embodiment. These combinations are e.g., a; b; a+b. In an aspect of the 61$^{st}$ embodiment, it is preferred that the mode in feature a. is a secondary mode. In an aspect of the 61$^{st}$ embodiment, it is preferred that the mode in feature b. is a primary mode.

In a preferred embodiment of the method for producing a first intermediate product, the first particulated material has a pore diameter distribution with at least one first mode in the range of 9 000 nm to 15 000 nm, and at least one further mode in the range of >15 000 nm to 20 000 nm, wherein a ratio of the first mode to the further mode is in the range of 0.30 to 1.00, preferably in the range of 0.40 to 0.90, and further preferably in the range of 0.45 to 0.85. This preferred embodiment is a 62$^{nd}$ embodiment of the invention, that preferably depends on any of the 58$^{th}$ to 61$^{st}$ embodiments of the invention.

In a preferred embodiment of the method for producing a first intermediate product, the first particulated material has at least one or all of the following properties:
a. a cumulative pore volume in the range of 0.6 cm$^3$/g to 1.9 cm$^3$/g, preferably in the range of 0.9 cm$^3$/g to 1.7 cm$^3$/g, and more preferably in the range of 1.1 cm$^3$/g to 1.5 cm$^3$/g for pores with a diameter in the range of 9000 nm and 20 000 nm;
b. a cumulative pore volume in the range of 0.5 cm$^3$/g to 1.4 cm$^3$/g, preferably in the range of 0.6 cm$^3$/g to 1.2 cm$^3$/g, and more preferably in the range of 0.8 cm$^3$/g to 1.0 cm$^3$/g for pores with a diameter in the range of 10 000 nm and 15 000 nm;
c. a cumulative pore volume in the range of 0.10 cm$^3$/g to 0.80 cm$^3$/g, preferably in the range of 0.20 cm$^3$/g to 0.60 cm$^3$/g, and more preferably in the range of 0.25 cm³/g to 0.40 cm³/g for pores with a diameter in the range of >15 000 nm to 20 000 nm.

This preferred embodiment is a 63$^{rd}$ embodiment of the invention, that preferably depends on any of the 58$^{th}$ to 62$^{nd}$ embodiments of the invention.

In an aspect of the 63$^{rd}$ embodiment, all possible combination of the features a. to c. are preferred aspects of the embodiment. These combinations are e.g., a; b; c; a+b; a+c; b+c; a+b+c.

In a preferred embodiment of the method for producing a first intermediate product, the first particulated material has at least one or all of the following properties:
  a. a permeability in the range of 0.7 Darcy to 10.0 Darcy, preferably in the range of 1.5 Darcy to 7.5 Darcy, more preferably in the range of 3.0 Darcy to 5.0 Darcy, and further preferably in the range of 3.5 Darcy to 4.5 Darcy;
  b. a median particle size in the range of 25 µm to 60 µm, preferably in the range of 35 µm to 55 µm, more preferably in the range of 40 m to 50 µm, and further preferably in the range of 43 m to 50 µm.

This preferred embodiment is a 64$^{th}$ embodiment of the invention, that preferably depends on any of the 58$^{th}$ to 63$^{rd}$ embodiments of the invention.

In an aspect of the 64$^{th}$ embodiment, all possible combination of the features a. and b. are preferred aspects of the embodiment. These combinations are e.g., a; b; a+b.

In a preferred embodiment of the method for producing a first intermediate product, the first particulated material is selected from the group consisting of activated carbon (e.g., activated charcoal), activated clay, diatomaceous earth, perlite, bentonite, cellulose, and a combination of at least two thereof. This preferred embodiment is a 65$^{th}$ embodiment of the invention, that preferably depends on any of the 58$^{th}$ to 64$^{th}$ embodiments of the invention.

In an aspect of the 65$^{th}$ embodiment, it is particularly preferred that the first particulated material is diatomaceous earth.

In a preferred embodiment of the method for producing a first intermediate product, the mass ratio of the first particulated material to the first intermediate mixture in the volume section $V_4$ is in the range of $5.0 \times 10^{-4}$ to $2.5 \times 10^{-3}$, more preferably in the range of $1.0 \times 10^{-3}$ to $2.0 \times 10^{-3}$, and further preferably in the range of $1.2 \times 10^{-3}$ to $1.8 \times 10^{-3}$. This preferred embodiment is a 66$^{th}$ embodiment of the invention, that preferably depends on any of the 58$^{th}$ to 65$^{th}$ embodiments of the invention.

In a preferred embodiment of the method for producing a first intermediate product, a temperature of the first intermediate mixture in the volume section $V_4$ is in the range of 160° C. to 230° C., more preferably in the range of 170° C. to 220° C., even more preferably in the range of 180° C. to 215° C., further preferably in the range of 185° C. to 209° C., and even further preferably in the range of 190° C. to 205° C. This preferred embodiment is a 67$^{th}$ embodiment of the invention, that preferably depends on any of the 57$^{th}$ to 66$^{th}$ embodiments of the invention.

In a preferred embodiment of the method for producing a first intermediate product, the first intermediate mixture in the volume section $V_4$ is agitated. This preferred embodiment is a 68$^{th}$ embodiment of the invention, that preferably depends on any of the 57$^{th}$ to 67$^{th}$ embodiments of the invention.

In an aspect of the 68$^{th}$ embodiment, it is preferred that the first intermediate mixture is agitated using a mechanical means adapted and arranged for agitating.

In a preferred embodiment of the method for producing a first intermediate product, a residence time of the first intermediate mixture in the volume section $V_4$ is 10 hours or less, more preferably 7 hours or less, and further preferably 5 hours or less. This preferred embodiment is a 69$^{th}$ embodiment of the invention, that preferably depends on any of the 57$^{th}$ to 68$^{th}$ embodiments of the invention.

In an optional aspect of the 69$^{th}$ embodiment, the residence time of the first intermediate mixture in the volume section $V_4$ is at least 0.1 hours, optionally at least 1 hour, and optionally at least 3.5 hours.

In a preferred embodiment of the method for producing a first intermediate product, the method further comprises the step of transporting the first intermediate mixture to a filtering means, preferably from the volume section $V_4$. This preferred embodiment is a 70$^{th}$ embodiment of the invention, that preferably depends on any of the 1$^{st}$ to 69$^{th}$ embodiments of the invention.

In a preferred embodiment of the method for producing a first intermediate product, the filtering means is selected from the group consisting of a leaf filter, a lamella clarifier, a candle filter, a porous filter, a sintered filter, a metallic wire mesh, a rotary drum filter, and a combination of two or more thereof. This preferred embodiment is a 71$^{st}$ embodiment of the invention, that preferably depends on the 70$^{th}$ embodiment of the invention. In an aspect of the 71$^{st}$ embodiment, a preferred filtering means is a leaf filter, more preferably a vertical leaf filter.

In a preferred embodiment of the method for producing a first intermediate product, the pressure in the filtering means in in the range of 80 kPa to 1000 kPa, more preferably in the range of 140 kPa to 800 kPa, even more preferably in the range of 170 kPa to 610 kPa, and further preferably in the range of 200 kPa to 545 kPa. This preferred embodiment is a 72$^{nd}$ embodiment of the invention, that preferably depends on any of the 70$^{th}$ to 71$^{st}$ embodiments of the invention.

In a preferred embodiment of the method for producing a first intermediate product, the temperature in the filtering means in in the range of 150° C. to 215° C., more preferably in the range of 160° C. to 205° C., even more preferably in the range of 165° C. to 200° C., and further preferably in the range of 170° C. to 195° C. This preferred embodiment is a 73$^{rd}$ embodiment of the invention, that preferably depends on any of the 70$^{th}$ to 72$^{nd}$ embodiments of the invention.

In a preferred embodiment of the method for producing a first intermediate product, the method further comprises the step of pre-coating the filtering means, preferably with the first particulated material. This preferred embodiment is a 74$^{th}$ embodiment of the invention, that preferably depends on any of the 70$^{th}$ to 73$^{rd}$ embodiments of the invention.

In an aspect of the 74$^{th}$ embodiment, it is preferred that the pre-coating step is performed prior to at least partially removing at least one or all of the following: at least one impurity, the first particulated material.

In a preferred embodiment of the method for producing a first intermediate product, the method further comprises the step of at least partially removing at least one impurity from the first intermediate mixture, preferably using the filtering means. This preferred embodiment is a 75$^{th}$ embodiment of the invention, that preferably depends on any of the 1$^{st}$ to 74$^{th}$ embodiments of the invention.

In an aspect of the 75$^{th}$ embodiment, it is preferred to at least partially remove the first particulated material from the first intermediate mixture, more preferably using the filtering means. E.g., both the at least one impurity and the first particulated material is at least partially removed. In an aspect of the 75$^{th}$ embodiment, it is preferred that the particulates that are removed (e.g., the at least one impurity, the first particulated material) have a particle size that is larger than 100 nm, more preferably larger than 150 nm, and further preferably larger than 200 nm. In an aspect of the 75$^{th}$ embodiment, it is preferred that the particulates that are removed (e.g., the at least one impurity, the first particulated material) have a particle size of 50 μm or less, more preferably 20 m or less, even more preferably 10 m or less, and further preferably 5 μm or less.

In a preferred embodiment of the method for producing a first intermediate product, the method further comprises the step of transporting the first intermediate mixture to a volume section $V_5$. This preferred embodiment is a 76$^{th}$ embodiment of the invention, that preferably depends on any of the 1$^{st}$ to 75$^{th}$ embodiments of the invention. In an aspect of the 76$^{th}$ embodiment, it is preferred that the first intermediate mixture is transported from the volume section $V_3$ to the volume section $V_5$. It is however, more preferred that the first intermediate mixture is transported from a volume section $V_3$ to the volume section $V_5$ via at least one or all of the following: the volume section $V_4$, the filtering means. In this aspect, it is particularly preferred that the first intermediate mixture is transported to the volume section $V_5$ from the filtering means.

In a preferred embodiment of the method for producing a first intermediate product, the method further comprises the step of adjusting a b value of the Hunter Lab colour coordinates of the first intermediate mixture, preferably in a volume section $V_5$, so that b≤0, more preferably b≤−1, and further preferably b≤−2. This preferred embodiment is a 77$^{th}$ embodiment of the invention, that preferably depends on any of the 1$^{st}$ to 76$^{th}$ embodiments of the invention.

In an aspect of the 77$^{th}$ embodiment, it is preferred that the Hunter Lab colour coordinates of the first intermediate mixture is adjusted, preferably in a volume section $V_5$, so that b is in the range of −10 to −3, more preferably −9 to −4, and further preferably in the range of −8 to −6.

In a preferred embodiment of the method for producing a first intermediate product, the method further comprises the step of adjusting an L value of the Hunter Lab colour coordinates of the first intermediate mixture, preferably in a volume section $V_5$, so that L≥65, more preferably L≥70, and further preferably L≥75. This preferred embodiment is a 78$^{th}$ embodiment of the invention, that preferably depends on any of the 1V to 77$^{th}$ embodiments of the invention.

In an aspect of the 78$^{th}$ embodiment, it is preferred that the Hunter Lab colour coordinates of the first intermediate mixture is adjusted, preferably in a volume section $V_5$, so that L is in the range of 65 to 92, more preferably 70 to 86, and further preferably in the range of 75 to 82.

In a preferred embodiment of the method for producing a first intermediate product, the Hunter Lab colour coordinate (s) L, b, or both, are adjusted by the addition of at least one colouring agent to the first intermediate mixture, preferably in the volume section $V_5$. This preferred embodiment is a 79$^{th}$ embodiment of the invention, that preferably depends on any of the 77$^{th}$ to 78$^{th}$ embodiments of the invention.

Suitable colouring agents are well-known to the skilled person, and are commercially available from Avient Corporation (USA) and Clariant AG (Switzerland).

In a preferred embodiment of the method for producing a first intermediate product, the amount of the at least one colouring agent added to the first intermediate mixture is determined by at least one or all of the following:

a. less than 200 ppm wt, more preferably less than 100 ppm wt, even more preferably less than 50 ppm wt, further preferably less than 20 ppm wt, even further preferably less than 15 ppm wt, and particularly preferably less than 10 ppm wt of a red colouring agent is added;

b. less than 300 ppm wt, more preferably less than 150 ppm wt, even more preferably less than 70 ppm wt, further preferably less than 30 ppm wt, even further preferably less than 20 ppm wt, and particularly preferably less than 15 ppm wt of a blue colouring agent is added;

c. the red colouring agent and the blue colour agent is added, wherein the ratio of the red colouring agent to the blue colouring agent is in the range of 0.1 to 10.0, more preferably 0.1 to 6.0, even more preferably in the range of 0.1 to 3.0, further preferably in the range of 0.1 to 1.0, even further preferably in the range of 0.3 to 0.8, and particularly preferably in the range of 0.4 to 0.7.

This preferred embodiment is an 80$^{th}$ embodiment of the invention, that preferably depends on the 79$^{th}$ embodiment of the invention.

In the 80$^{th}$ embodiment, the ppm wt values are based on a total weight of the first intermediate mixture. In an aspect of the 80$^{th}$ embodiment, all possible combination of the features a. to c. are preferred aspects of the embodiment. These combinations are e.g., a; b; c; a+b; a+c; b+c; a+b+c. In an aspect of the 80$^{th}$ embodiment, feature a., optionally at least 1 ppm wt, optionally at least 2 ppm wt, optionally at least 3 ppm wt of the red colouring agent is added. In an aspect of the 80$^{th}$ embodiment, feature b., optionally at least 0.8 ppm wt, optionally at least 1.8 ppm wt, optionally at least 2.7 ppm wt of the blue colouring agent is added. In the 80$^{th}$ embodiment, feature c., the ratio of the red colouring agent to the blue colouring agent is calculated as the ppm wt of the red colouring agent added, divided by the ppm wt of the blue colouring agent added. In a preferred aspect of the 80$^{th}$ embodiment, feature c. the red colouring and the blue colouring agent is added when the L value of the of the first intermediate mixture, prior to the addition of any colouring agents, is preferably in the range of 80 to 90, and more preferably in the range of 82 to 88. In a preferred aspect of the 80$^{th}$ embodiment, feature c. both the red colouring and the blue colouring agent is added when the b value of the of the first intermediate mixture, prior to the addition of any colouring agents, is preferably in the range of 0.8 to 2.0, and more preferably in the range of 1 to 2.

In a preferred embodiment of the method for producing a first intermediate product, the at least one colouring agent is selected from the group consisting of dyes, toners, pigments, and a combination of at least two thereof. This preferred embodiment is an 81$^{st}$ embodiment of the invention, that preferably depends on any of the 79$^{th}$ to 80$^{th}$ embodiments of the invention.

In an aspect of the 81$^{st}$ embodiment, it is particularly preferred that the at least one colouring agent is pigments, dyes, or a combination thereof. In this aspect, pigments are more preferred than dyes. In another aspect of the 81$^{st}$ embodiment, it is preferred that the at least one colouring agent is not an acid dye. In yet another aspect of the 81$^{st}$ embodiment, it is preferred that the at least one colouring agent is pigments with a particle size that is less than 20 microns, more preferably less than 10 microns, even more preferably less than 1 micron, and further preferably less than 0.5 micron.

In a preferred embodiment of the method for producing a first intermediate product, a transport direction of the first polyester through the volume section $V_2$ is at least partially opposite to the direction of gravity. In an aspect of this embodiment, it is preferred that the transport direction is opposite the direction of gravity. In a preferred embodiment of the method for producing a first intermediate product, the volume section $V_2$ is arranged at least partially vertically, more preferably vertically. An at least partial vertical arrangement should preferably be understood to mean that a longest dimension (e.g., length) of the volume section $V_2$ is not parallel to the ground. For example, if the volume section $V_2$ is arranged vertically, the length of the volume section $V_2$ is perpendicular to the ground.

In a preferred embodiment of the method for producing a first intermediate product, the intrinsic viscosity of the first intermediate product increases by less than 5%, more preferably by less than 3%, further preferably by less than 1%, and even further preferably by less than 0.1% in the volume section $V_4$. In a preferred embodiment of the method for producing a first intermediate product, the intrinsic viscosity of the first intermediate product decreases by less than 5%, more preferably by less than 3%, further preferably by less than 1%, and even further preferably by less than 0.1% in the volume section $V_4$. In a preferred embodiment of the method for producing a first intermediate product, the intrinsic viscosity of the first intermediate product varies (neither increases nor decreases) by less than 5%, more preferably by less than 3%, further preferably by less than 1%, and even further preferably by less than 0.1% in the volume section $V_4$.

An $82^{nd}$ embodiment of the invention is a method for producing a further intermediate product, comprising the steps of:
  a. providing a first intermediate mixture that comprises a first intermediate product, wherein the first intermediate product is obtainable by a method, according to the invention, for producing a first intermediate product, preferably the method according to any of the $1^{st}$ to $81^{st}$ embodiments of the invention;
  b. increasing the weight average molar mass of the first intermediate product in the first intermediate mixture, preferably in a volume section $V_6$, to obtain a further intermediate mixture that comprises a further intermediate product.

In an optional aspect of the $82^{nd}$ embodiment, the first intermediate mixture comprises at least one or all of the following: the first organic compound, the further organic compound. The first organic compound and/or the further organic compound in the further intermediate mixture may be present for e.g., one of the following reasons: the first organic compound and/or the further organic compound was transported from another volume section (e.g., the volume section $V_5$) to the volume section $V_6$; the first organic compound and/or the further organic compound was bound, and was released during the increase in the weight average molar mass. In another optional aspect of the $82^{nd}$ embodiment, the further intermediate mixture comprises at least one or all of the following: the first organic compound, the further organic compound. In an aspect of the $82^{nd}$ embodiment, it is preferred to at least partially remove at least one or all of the following in the volume section $V_6$: the first organic compound, the further organic compound. In a further aspect of the $82^{nd}$ embodiment, it is preferred that the further intermediate mixture comprises less than 1 wt-%, more preferably less than 0.1 wt-%, and further preferably less than 0.01 wt %, based on the total weight of the further intermediate mixture, of at least one or all of the following: the first organic compound, the further organic compound. In an aspect of the $82^{nd}$ embodiment, it is preferred that the further intermediate product is obtained using less than 20 wt-%, more preferably less than 10 wt-%, even more preferably less than 5 wt-%, and further preferably less than 1 wt-% of a virgin product. The wt-% are based on the total weight of the first intermediate mixture. Here the virgin product has the following properties: a.) is a monomer, an oligomer, a polymer, or a combination thereof, preferably of the first polyester; b.) is obtained via chemical synthesis, wherein the chemical synthesis excludes depolymerisation and solvolysis. An example of the virgin product is BHET monomers obtained by the esterification of terephthalic acid with ethylene glycol.

In a preferred embodiment of the method for producing a further intermediate product, the first intermediate mixture is provided by transporting the first intermediate mixture to a volume section $V_6$. This preferred embodiment is an $83^{rd}$ embodiment of the invention, that preferably depends on the $82^{nd}$ embodiment of the invention.

In an aspect of the $83^{rd}$ embodiment, it is preferred that the first intermediate mixture is transported from a volume section $V_3$ to the volume section $V_6$. It is however, more preferred that the first intermediate mixture is transported from a volume section $V_3$ to the volume section $V_6$ via at least one or all of the following: the volume section $V_4$, the filtering means, the volume section $V_5$. In this aspect, it is particularly preferred that the first intermediate mixture is transported to the volume section $V_6$ from the volume section $V_5$.

In a preferred embodiment of the method for producing a further intermediate product, at least one or all of the following is added to the first intermediate mixture:
  a. an amount of a catalyst in the range of 20 ppm to 600 ppm, more preferably in the range of 30 ppm to 500 ppm, and further preferably in the range of 40 ppm to 400 ppm;
  b. an amount of a stabiliser in the range of 1 ppm to 120 ppm, more preferably in the range of 5 ppm to 100 ppm, even more preferably in the range of 10 ppm to 80 ppm, further preferably in the range of 20 ppm to 60 ppm.

This preferred embodiment is an $84^{th}$ embodiment of the invention, that preferably depends on any of the $82^{nd}$ to $83^{rd}$ embodiments of the invention.

In the $84^{th}$ embodiment, the ppm values are based on a total weight of the first intermediate mixture. In an aspect of the $84^{th}$ embodiment, all possible combination of the features a. and b. are preferred aspects of the embodiment. These combinations are e.g., a; b; a+b. In an aspect of the $84^{th}$ embodiment, a preferred catalyst is $Sb_2O_3$, Tetrabutoxytitanium, PTO ($K_2TiO(C_2H_4)_2*2H_2O$) or a combination of at least two thereof. In this aspect, $Sb_2O_3$ is particularly preferred. In an aspect of the $84^{th}$ embodiment, it is preferred that at least one or all of the following applies: the catalyst is added prior to the first intermediate mixture entering the volume section $V_6$; the catalyst is added to the first intermediate mixture in the volume section $V_6$, preferably prior to increasing the weight average molar mass of the first intermediate product. In an aspect of the $84^{th}$ embodiment, a preferred stabiliser is diphenylamine, 4-aminobenzoic acid, orthophosphoric acid, or a combination of at least two thereof. In an aspect of the $84^{th}$ embodiment, it is preferred at least one or all of the following applies: the stabiliser is added prior to the first intermediate mixture entering the volume section $V_6$; the stabiliser is added to the first intermediate mixture in the volume section $V_6$, preferably prior to increasing the weight average molar mass of the first intermediate product.

In a preferred embodiment of the method for producing a further intermediate product, at least one or all of the following applies to the volume section $V_6$:
  a. the temperature is in the range of 260° C. to 295° C., more preferably in the range of 268° C. to 289° C., and further preferably in the range of 272° C. to 285° C.;
  b. the pressure is equal to or less than 3.7 kPa, more preferably equal to or less than 3.3 kPa, and further preferably equal to or less than 2.8 kPa.

This preferred embodiment is an 85th embodiment of the invention, that preferably depends on any of the 83rd to 84th embodiments of the invention.

In an aspect of the 85th embodiment, all possible combination of the features a. and b. are preferred aspects of the embodiment. These combinations are e.g., a; b; a+b. In an aspect of the 85th embodiment, it is preferred that the pressure is in the range of 0.01 kPa to 3.70 kPa, more preferably in the range of 0.05 kPa to 3.30 kPa, and further preferably in the range of 0.10 kPa to 2.80 kPa.

In a preferred embodiment of the method for producing a further intermediate product, the residence time of the first intermediate mixture in the volume section $V_6$ is less than 750 minutes, more preferably less than 500 even more preferably less than 350 minutes, and further preferably less than 200 minutes. This preferred embodiment is an 86th embodiment of the invention, that preferably depends on any of the 83rd to 85th embodiments of the invention.

In an aspect of the 86th embodiment, it is preferred that the residence time of the first intermediate mixture in volume section $V_6$ is 40 minutes or more, more preferably 70 minutes or more, and further preferably 150 minutes or more.

In a preferred embodiment of the method for producing a further intermediate product, the further intermediate product, preferably the further intermediate product that exits the volume section $V_6$, has at least one or all of the following properties:
  a. an intrinsic viscosity in the range of 0.15 dL/g to 0.45 dL/g, more preferably in the range of 0.18 dL/g to 0.40 dL/g, and further preferably in the range of 0.20 dL/g to 0.30 dL/g;
  b. a weight average molar mass in the range of 5 000 Da to 30 000 Da, more preferably in the range of 9 000 Da to 24 000 Da, even more preferably in the range of 12 000 Da to 20 000 Da, and further preferably in the range of 14 000 Da to 16 500 Da.

This preferred embodiment is an 87th embodiment of the invention, that preferably depends on any of the 82nd to 86th embodiments of the invention.

In an aspect of the 87th embodiment, all possible combination of the features a. and b. are preferred aspects of the embodiment. These combinations are e.g., a; b; a+b.

In a preferred embodiment of the method for producing a further intermediate product, the method further comprises the step of transporting the further intermediate mixture, preferably from the volume section $V_6$, to a volume section $V_7$. This preferred embodiment is an 88th embodiment of the invention, that preferably depends on any of the 82nd to 87th embodiments of the invention.

In a preferred embodiment of the method for producing a further intermediate product, the method further comprises the step of further increasing the weight average molar mass of the further intermediate product in the further intermediate mixture, preferably in the volume section $V_7$. This preferred embodiment is an 89th embodiment of the invention, that preferably depends on any of the 82nd to 88th embodiments of the invention.

In a preferred embodiment of the method for producing a further intermediate product, at least one or all of the following applies to the volume section $V_7$:
  a. the temperature is in the range of 240° C. to 310° C., more preferably in the range of 258° C. to 298° C., and further preferably in the range of 264° C. to 288° C.;
  b. the pressure is equal to or less than 0.4 kPa, more preferably equal to or less than 0.35 kPa, and further preferably equal to or less than 0.32 kPa.

This preferred embodiment is a 90th embodiment of the invention, that preferably depends on any of the 88th to 89th embodiments of the invention.

In an aspect of the 90th embodiment, all possible combination of the features a. and b. are preferred aspects of the embodiment. These combinations are e.g., a; b; a+b. In an aspect of the 90th embodiment, it is preferred that the temperature given in the embodiment is the temperature that is measured at an inlet of the volume section $V_7$, more preferably an inlet through which the further intermediate mixture enters the volume section $V_7$. In an aspect of the 90th embodiment, it is preferred that the pressure is in the range of 0.001 kPa to 0.400 kPa, and more preferably in the range of 0.005 kPa to 0.350 kPa.

In a preferred embodiment of the method for producing a further intermediate product, the residence time of the further intermediate mixture in the volume section $V_7$ is less than 300 minutes, more preferably less than 200 minutes, even more preferably less than 150 minutes, and further preferably less than 100 minutes. This preferred embodiment is a 91st embodiment of the invention, that preferably depends on any of the 88th to 90th embodiments of the invention.

In an aspect of the 91st embodiment, it is preferred that the residence time of the further intermediate mixture in volume section $V_7$ is 10 minutes or more, more preferably 25 minutes or more, and further preferably 40 minutes or more.

In a preferred embodiment of the method for producing a further intermediate product, the further intermediate product, preferably the further intermediate product that exits the volume section $V_7$, has at least one or all of the following properties:
  a. an intrinsic viscosity in the range of 0.50 dL/g to 0.80 dL/g, more preferably in the range of 0.57 dL/g to 0.75 dL/g, and further preferably in the range of 0.62 dL/g to 0.67 dL/g;
  b. a weight average molar mass in the range of 40 000 Da to 60 000 Da, more preferably in the range of 44 000 Da to 54 000 Da, and further preferably in the range of 46 000 Da to 52 000 Da.

This preferred embodiment is a 92nd embodiment of the invention, that preferably depends on any of the 82nd to 91st embodiments of the invention, more preferably according to any of the 88th to 91st embodiments of the invention.

In an aspect of the 92nd embodiment, all possible combination of the features a. and b. are preferred aspects of the embodiment. These combinations are e.g., a; b; a+b.

In a preferred embodiment of the method for producing a further intermediate product, the method further comprises the step of at least partially removing at least one organic compound, preferably in the volume section $V_6$, the volume section $V_7$, or both. This preferred embodiment is a 93rd embodiment of the invention, that preferably depends on any of the 82nd to 92nd embodiments of the invention.

In an aspect of the 93rd embodiment, it is preferred that the at least one organic compound is at least one or all of the following: the first organic compound, the further organic compound. In another aspect of the 93rd embodiment, it is preferred that the at least one organic compound is at least partially removed from at least one or all of the following: the first intermediate mixture, and the further intermediate mixture. In yet another aspect of the 93$^{rd}$ embodiment, it is preferred that the first organic compound is at least partially removed by flash evaporation. In an aspect of the 93$^{rd}$ embodiment, it is preferred that the at least on organic compound is at least partially removed at least partially simultaneously with at least one or all of the following: increasing the weight average molar mass of the first intermediate product, and increasing the weight average molar mass of the further intermediate product.

In a preferred embodiment of the method for producing a further intermediate product, the further intermediate product is a further polyester. This preferred embodiment is a 94$^{th}$ embodiment of the invention, that preferably depends on any of the 82$^{nd}$ to 93$^{rd}$ embodiments of the invention.

In a preferred embodiment of the method for producing a further intermediate product, the further polyester is selected from the group consisting of a polyethylene terephthalate, a polybutylene terephthalate, a polylactide, a polytrimethylene terephthalate, a polyethylene naphthalate, a polycarbonate, a polyester carbonate, a polyarylate, a polyester resin, preferably an unsaturated polyester resin, and a combination of two or more thereof. This preferred embodiment is a 95$^{th}$ embodiment of the invention, that preferably depends on the 94$^{th}$ embodiment of the invention.

In an aspect of the 95$^{th}$ embodiment, it is particularly preferred that the further polyester is polyethylene terephthalate.

In a preferred embodiment of the method for producing a further intermediate product, the further intermediate product is in the form of a liquid (e.g., a melt, or a molten polymer), granules, or a combination thereof. This preferred embodiment is a 96$^{th}$ embodiment of the invention, that preferably depends on any of the 82$^{nd}$ to 95*h embodiments of the invention.

In an aspect of the 96$^{th}$ embodiment, the granules are commonly referred to as chips. In an aspect of the 96$^{th}$ embodiment, it is preferred that the granules are obtained by extruding and cooling the hot melt.

In a preferred embodiment of the method for producing a further intermediate product, the further intermediate product is subjected to at least one processing step in order to obtain a product. This preferred embodiment is a 97$^{th}$ embodiment of the invention, that preferably depends on any of the 82$^{nd}$ to 96$^{th}$ embodiments of the invention.

In an aspect of the 97$^{th}$ embodiment, it is preferred that the further intermediate product is subjected to the at least one processing step downstream of the volume section $V_6$, and more preferably downstream of the volume section $V_7$.

In a preferred embodiment of the method for producing a further intermediate product, the at least one processing step includes least one or all of the following: cooling, spinning, texturing, colouring (preferably by adding at least one colouring agent), melting, injection moulding, blow moulding, coating (preferably spin-coating), cutting, extruding, or a combination of at least two thereof. This preferred embodiment is a 98$^{th}$ embodiment of the invention, that preferably depends on the 97$^{th}$ embodiment of the invention.

A 99$^{th}$ embodiment of the invention is a first intermediate product obtainable by the method, according to the invention, for producing a first intermediate product, preferably the method according to any of the 1$^{st}$ to 81$^{st}$ embodiments of the invention.

A 100$^{th}$ embodiment of the invention is a further intermediate product obtainable by the method, according to the invention, for producing a further intermediate product, preferably the method according to any of the 82$^{nd}$ to 98$^{th}$ embodiments of the invention.

In an aspect of the 100$^{th}$ embodiment, the further intermediate product is preferably a further polyester.

In a preferred embodiment of the further intermediate product, the further intermediate product has at least one or all of the following properties:
  a. a weight average molar mass in the range of 40 000 Da to 100 000 Da, more preferably in the range of 44 000 Da to 80 000 Da, and further preferably in the range of 48 000 Da to 60 000 Da;
  b. an intrinsic viscosity in the range of 0.50 dL/g to 0.80 dL/g, more preferably in the range of 0.57 dL/g to 0.75 dL/g, and further preferably in the range of 0.62 dL/g to 0.67 dL/g;
  c. in Hunter Lab colour coordinates, an L value of at least 48, and a b value of 6 or less.

This preferred embodiment is a 101$^{st}$ embodiment of the invention, that preferably depends on the 100$^{th}$ embodiment of the invention.

In an aspect of the 101$^{st}$ embodiment, all possible combination of the features a. to c. are preferred aspects of the embodiment. These combinations are e.g., a; b; c; a+b; a+c; b+c; a+b+c. In an aspect of the 101$^{st}$ embodiment, feature c., it is preferred that the further intermediate product has, in Hunter Lab colour coordinates, an L value in the range of 45 to 75, more preferably in the range of 50 to 70, and further preferably in the range of 55 to 65. In an aspect of the 101$^{st}$ embodiment, feature c., it is preferred that the further intermediate product has, in Hunter Lab colour coordinates, a b value in the range of 0 to 6, more preferably in the range of 1 to 5, and further preferably in the range of 2 to 4.

A 102$^{nd}$ embodiment of the invention is a product comprising a further intermediate product according to the invention, preferably the further intermediate product according to any of the 100$^{th}$ to 101$^{st}$ embodiments of the invention.

In a preferred embodiment of the product, the product is selected from the group consisting of a yarn, a textile, shaped articles (e.g., bottles), moulding materials, films, sheets, granulates, composites, foams, fibres, lubricants, adhesives, thickening agents, suspending agents, flocculants, resins, plastics, coatings, construction materials, absorbent materials, pharmaceuticals, materials for controlled release of active substances, powders, and a combination of at least two or more thereof. This preferred embodiment is a 103$^{rd}$ embodiment of the invention, that preferably depends on the 102$^{nd}$ embodiment of the invention.

In an aspect of the 103$^{rd}$ embodiment, it is particularly preferred that the product is yarn, more preferably a yarn for a textile. Examples of yarn include fully drawn yarn, draw texture yarn, and partially orientated yarn.

In a preferred embodiment of the product, the product has at least one or all of the following properties:
  a. in Hunter Lab colour coordinates an L value of at least 62, more preferably at least 68, and further preferably at least 73;
  b. in Hunter Lab colour coordinates a b value of at least 1, more preferably at least 2, and further preferably at least 3;
  c. a tensile strength in the range of more than 1.5 g/Denier, preferably more than 2.0 g/Denier, and further preferably more than 2.5 g/Denier;

d. a weight average molar mass in the range of 40 000 Da to 100 000 Da, more preferably in the range of 44 000 Da to 80 000 Da, and further preferably in the range of 48 000 Da to 60 000 Da;
e. an intrinsic viscosity in the range of 0.50 dL/g to 0.80 dL/g, more preferably in the range of 0.57 dL/g to 0.75 dL/g, and further preferably in the range of 0.62 dL/g to 0.67 dL/g;
f. elongation that is in the range of 5% to 175%, more preferably in the range of 10% to 150%, and further preferably in the range of 20% to 125%.

This preferred embodiment is a $104^{th}$ embodiment of the invention, that preferably depends on any of the $102^{nd}$ to $103^{rd}$ embodiments of the invention.

In an aspect of the $104^{th}$ embodiment, all possible combination of the features a. to f. are preferred aspects of the embodiment. These combinations are e.g., a; b; c; d; e; f; a+b; a+c; a+d; a+e; a+f; b+c; b+d; b+e; b+f; c+d; c+e; c+f; d+e; d+f; e+f; a+b+c; a+b+d; a+b+e; a+b+f; a+c+d; a+c+e; a+c+f; a+d+e; a+d+f; a+e+f; b+c+d; b+c+e; b+c+f; b+d+e; b+d+f; b+e+f; c+d+e; c+d+f; c+e+f; d+e+f; a+b+c+d; a+b+c+e; a+b+c+f; a+b+d+e; a+b+d+f; a+b+e+f; a+c+d+e; a+c+d+f; a+c+e+f; a+d+e+f; b+c+d+e; b+c+d+f; b+c+e+f; b+d+e+f; c+d+e+f; a+b+c+d+e; a+b+c+d+f; a+b+c+e+f; a+b+d+e+f; a+c+d+e+f; b+c+d+e+f; a+b+c+d+e+f. In an aspect of the $104^{th}$ embodiment, feature a., if the product is a yarn, it is preferred that the product has, in Hunter Lab colour coordinates, an L value in the range of 62 to 95, more preferably in the range of 68 to 90, and further preferably in the range of 73 to 87. In an aspect of the $104^{th}$ embodiment, feature b., if the product is a yarn, it is preferred that the product has, in Hunter Lab colour coordinates, a b in the range of 1 to 7, more preferably in the range of 2 to 6, and further preferably in the range of 3 to 5. In the $104^{th}$ embodiment, tensile strength and elongation are measured according to the standard ASTM D2256/D2256M-21.

A $105^{th}$ embodiment of the invention is a use of a first intermediate product according to the invention, preferably the first intermediate product according to the $99^{th}$ embodiment of the invention, for producing a further intermediate product, preferably a further polyester.

In an aspect of the $105^{th}$ embodiment, it is preferred that the further intermediate product that is produced is according to any of the $100^{th}$ to $101^{st}$ embodiments of the invention.

A $106^{th}$ embodiment of the invention is a use of a further intermediate product according to the invention, preferably according to any of the $100^{th}$ to $101^{st}$ embodiments of the invention, for producing a product, preferably the product according to any of the $102^{nd}$ to $104^{th}$ embodiments of the invention.

DETAILED DESCRIPTION OF THE INVENTION

Throughout this document, disclosures of ranges should preferably be understood to include both end points of the range. Furthermore, each disclosure of a range in the document should preferably be understood as also disclosing preferred sub-ranges in which one end point is excluded or both end points are excluded. For example, a disclosure of a range from 60° C. to 75° C. is to be understood as disclosing a range that includes both of the end points 60° C. and 75° C. Furthermore, it is to be understood as also disclosing a range that includes the end point 60° C. but excludes the end point 75° C., a range that excludes the end point 60° C. but includes the end point 75° C., and a range that excludes both end points 60° C. and 75° C.

Throughout this document, preferred embodiments and preferred aspects that discloses two or more features that each have preferred ranges or alternatives should be understood to include all possible combinations of these features. For example, an embodiment wherein "a wt-% of feature A, more preferably b wt-% of feature A, and further preferably c wt-% of feature A has a length of x, more preferably a length of y, and further preferably a length of z" discloses all of the embodiments with the following combinations of features: a, x; a, y; a, z; b, x; b, y; b, z; c, x; c, y; c, z.

Some preferred embodiments and preferred aspects may comprise different combinations of features. If the various combinations are listed, the combinations are separated by a semi-colon (";"). For example, the list "a; a+b; a+c+d" should be understood to disclose an embodiment that comprises the feature "a", an embodiment that comprises the features "a" and "b", and an embodiment that comprises the features "a", "c", and "d".

The following abbreviations are used in the description: polyethylene terephthalate (PET), polyvinyl chloride (PVC), ethylene glycol (EG), mono ethylene glycol (MEG), Bis(2-Hydroxyethyl) terephthalate (BHET).

Volume Section

A "volume section" (e.g., $V_1$, $V_2$) should preferably be understood to mean a volume that is adapted and arranged to receive an amount of a solid, a liquid, a gas, or a combination thereof. Examples of a "volume section" include a storage tank, a storage vessel, a reactor (e.g., a depolymerisation reactor), a pipe, a siphon, or a combination of two or more thereof. The numbering of the volume sections should preferably be understood as a means to identify a volume section. For example, if a method for producing a first intermediate product is performed in the volume sections $V_1$ and $V_3$, this does not imply that the method is also performed in the volume section $V_2$.

In one aspect of the invention, it is preferred that at least two volume sections at least partially intersect in space. For example, a first polyester is contacted with a first amount of a first organic compound in a volume section $V_1$, while a reduction of a weight average molar mass of the first polyester is performed in a volume section $V_3$. If the volume sections $V_1$ and $V_3$ both refer to the same inner volume of a reactor, the volume sections $V_1$ and $V_3$ intersect in space. If two volume sections (e.g., a first volume section and a further volume section) intersect in space, the volume sections are distinguished from each other by a difference of at least 15% of at least one physical parameter in the volume sections, e.g., the temperature. For example, the first volume section has an average temperature of 60° C., while the further volume section has an average temperature of 120° C. If two volume sections (e.g., a first volume section and a further volume section) intersect in space, a transport of, e.g., the first initial mixture from the first volume section to the further volume section, should preferably be understood to mean that at least one physical parameter in the volume section, e.g., a temperature, is varied by at least 15%.

In another, more preferred, aspect of the invention, at least two, more preferably at least three, even more preferably at least four, and further preferably all volume sections intersect by less than 30%, more preferably less than 20%, and further preferably by less than 10% in space. In this aspect it is preferred that at least two volume sections are in the same vessel, such as a reactor or a storage tank. In this aspect, it is, however, more preferred that the volume sections are in different vessels, such as reactors or storage tanks.

In an aspect of the invention, it is preferred that a first polyester is transported from a volume section $V_1$ to a volume section $V_2$. In this aspect, it is preferred that at least one outlet through which the first polyester exits the volume section $V_1$ is arranged less than 50 cm, more preferably less than 40 cm, and further preferably less than 35 cm from a bottom of the volume section $V_1$. In this aspect, it is preferred that the at least one inlet (e.g., an inlet of a first kind) through which the first polyester enters the volume section $V_2$ is arranged less than 50 cm, more preferably less than 40 cm, and further preferably less than 30 cm from a bottom of the volume section $V_2$. The distance from a bottom of a volume section to an inlet (or an outlet) is measured from the bottom of the volume section to the closest point of the inlet (or the outlet) to the bottom.

In an aspect of the invention, it is preferred that at least one, more preferably at least two, even more preferably at least three, and further preferably all volume sections are in fluid communication. In another aspect of the invention, it is preferred that at least one or all of the following applies: a volume section $V_1$ is in fluid communication with a volume section $V_2$; a volume section $V_2$ is in fluid communication with a volume section $V_3$; a volume section $V_3$ is in fluid communication with a volume section $V_4$; a volume section $V_4$ is in fluid communication with a volume section $V_5$; a volume section $V_5$ is in fluid communication with a volume section $V_6$; a volume section $V_6$ is in fluid communication with a volume section $V_7$; a volume section $V_1$ is in fluid communication with a volume section $V_3$; a volume section $V_3$ is in fluid communication with a volume section $V_5$; a volume section $V_3$ is in fluid communication with a volume section $V_7$; a volume section $V_5$ is in fluid communication with a volume section $V_7$.

In an aspect of the invention, it is preferred that at least one, more preferably at least two, even more preferably at least three, and further preferably all volume sections are in fluid communication with at least one filtering means. In an aspect of the invention, it is preferred that at least one or all of the following applies: a volume section $V_4$ is in fluid communication with the at least one filtering means; a volume section $V_5$ is in fluid communication with the at least one filtering means.

In an aspect of the invention, it is preferred that a volume section $V_2$ has a first zone and a further zone. In this aspect, it is preferred that the further zone is downstream the first zone. In this aspect, it is preferred that a mass ratio of the first polyester to a first organic compound in the first zone differs from a mass ratio of the first polyester to a first organic compound in the further zone. It is further preferred that the mass ratio of the first polyester to a first organic compound in the first zone is smaller than the mass ratio of the first polyester to a first organic compound in the further zone.

In an aspect of the invention, it is preferred that a volume section $V_2$ has a first zone and a further zone, wherein the first zone and the further zone are not adjacent to each other.

In another aspect of the invention, it is preferred that a volume section $V_2$ has a first zone and a further zone, wherein the first zone and the first zone are adjacent to each other. In this aspect, it is preferred that the first zone and the further zone are at least partially separated by a boundary. A preferred boundary is a physical boundary, and imaginary boundary, or a combination thereof. It is preferred that an imaginary boundary is defined as a position where a physical property, that is measurable in the volume section $V_2$, rapidly changes. An example of the physical property is a mass ratio of a first polyester to a first organic compound in the volume section $V_2$. A rapid change is preferably defined as a variation in a value of the physical property of at least 50%, more preferably at least 60%, and further preferably at least 70% over a distance that is less than 50 cm, more preferably less than 30 cm, and further preferably less than 15 cm. For example, the imaginary boundary can be defined by a liquid level of the first organic compound in the volume section $V_2$. An example of a physical boundary between the first zone and the further zone is a sieve.

In an aspect of the invention, it is preferred that a volume section $V_1$ is adapted and arranged for at least one or all of the following: removing at least one impurity from a surface of a first polyester (e.g., removing labels from PET flakes), removing at least one impurity from a first initial mixture, and removing at least one impurity (e.g., dust) from a feedstock.

In an aspect of the invention, it is preferred that a volume section $V_2$ is adapted and arranged for at least one or all of the following: removing at least one impurity from a mixture comprising a first polyester and a first organic compound, at least partially depolymerising a first polyester (preferably by solvolysis), and embrittling a first polyester. "Embrittling" should preferably be understood to mean a process of making a first polyester more brittle. For example, if the first polyester is in the form of PET flakes, less force is required to break the flakes into smaller pieces after embrittling, compared to the force required to break the PET flakes into smaller pieces prior to embrittling.

In an aspect of the invention, it is preferred that a volume section $V_3$ is adapted and arranged for at least partially depolymerising a first polyester, preferably using solvolysis.

In an aspect of the invention, it is preferred that a volume section $V_4$ is adapted and arranged for at least one or all of the following: mixing a liquid with a particulated material, and heating a liquid.

In an aspect of the invention, it is preferred that a volume section $V_5$ is adapted and arranged for at least one or all of the following: storing a liquid, maintaining a temperature of a liquid, heating a liquid, or a combination of at least two thereof.

In an aspect of the invention, it is preferred that a volume section $V_6$ is adapted and arranged for at least partially polymerising at least one or all of the following, more preferably by polycondensation: monomers and oligomers. In an aspect of the invention, it is preferred that a volume section $V_7$ is adapted and arranged for at least partially polymerising at least one or all of the following, more preferably by polycondensation: monomers and oligomers.

In an aspect of the invention, it is preferred that A1.) a first polyester is contacted with a further amount of a first organic compound in a volume section $V_2$, and A2.) a weight average molar mass of the first polyester is reduced in the volume section $V_2$. In this aspect, it is preferred that steps A1.) and A2.) are performed at least partially simultaneously.

In an aspect of the invention, it is preferred that B1.) a first polyester is contacted with a further organic compound in a volume section $V_3$, and B2.) a weight average molar mass of the first polyester is reduced in the volume section $V_3$. In this aspect, it is preferred that steps B1.) and B2.) are performed at least partially simultaneously.

Fluid Communication

The phrase "in fluid communication" should preferably be understood to mean the following: if a first component (e.g., a volume section $V_1$) and a further component (e.g., a volume section $V_2$) are fluid communication with each other, a fluid, a gas, or a combination thereof, can flow either from the first component to the further component, or from the further component to the first component, or both. It should preferably be further understood that if components are "in fluid communication" with each other, this does not imply that the components have to be adjacent to each other. For example, an even-further component is arranged between the first component and the further component. The first component and the further component are "in fluid communication" if, e.g., a fluid can flow from the first component to the further component via the even-further component.

In an aspect of the invention, if a first component is in fluid communication with a further component, and the further component is in fluid communication with an even-further component, this should preferably be understood to mean that the first component and the even-further component are in fluid communication with each other.

In an aspect of the invention, it is preferred that at least one or all of the following can be transported between two components that are in fluid communication with each other: a solid, a mixture of a solid and a fluid, a mixture of a solid and a gas, and a mixture of a solid, liquid and gas. For example, a mixture comprising PET flakes and MEG can be transported between two volume sections, that are in fluid communication with each other, using an Archimedean screw, a siphon, or a combination thereof.

Mass Ratio of the First Polyester to an Organic Compound

The mass ratio of the first polyester to an organic compound (e.g., the first organic compound, the further organic compound) should preferably be understood to mean the mass ratio of the first polyester to free organic compound.

The Feedstock

In an aspect of the invention, a "feedstock" comprising the first polyester is provided. In this aspect, the feedstock may optionally comprise one or more other components, such as at least one impurity. In various aspects and preferred aspects of the invention, the first polyester is contacted with an organic compound (e.g., the first organic compound, the further organic compound). This contact of the first polyester with the organic compound should preferably be understood to include both of the following scenarios: a.) prior to the contact with the organic compound, at least one other component of the feedstock was at least partially separated from the first polyester (i.e., the originally provided feedstock no longer exists or its composition has been modified), and it is the first polyester (with the at least one other component at least partially removed) that is contacted with the organic compound; b.) the feedstock is contacted with the organic compound without at least partially removing the at least one other component. The above preferably applies, mutatis mutandis, to the transport of the first polyester.

For example, the first polyester is contacted with a first organic compound in a volume section $V_1$. The first polyester was provided as part of a feedstock that also comprised impurities. The impurities were not removed prior to the contact. I.e., the contact of the first polyester with the first organic compound is equivalent to the contact of the feedstock with the first organic compound. In the volume section $V_1$, the impurities are partially removed, and the first polyester is transported to a volume section $V_2$, along with some of the impurities that were not removed. Here the first polyester and the impurities that are transported are no longer equivalent to the originally provided feedstock.

The Plurality of Fragments

A "product article" should preferably be understood as an item that comprises a first polyester. Examples of product articles include: an item that has been used at least once, preferably by a consumer (e.g., post-consumer waste); an item that was produced but was never used (e.g., an item that was rejected due to not meeting quality requirements); an item that is a by-product of a production process (e.g., off-cuts). Examples of product articles include bottles and thermoformed items. In a preferred aspect of the invention, the product articles are bottles and thermoformed items, more preferably bottles.

In an aspect of the of the invention, it is preferred that a first polyester in a feedstock is in the form of a plurality of fragments. In this aspect, it is preferred that the plurality of fragments are obtained by processing product articles. Examples of processing the product articles include shredding, milling, or a combination thereof. For example, PET bottles are provided, which are first shredded to obtain PET flakes, with the PET flakes subsequently milled. In another example, textiles comprising PET are provided, with the textiles shredded to obtain textile fragments. In this aspect wherein the feedstock is in the form of a plurality of fragments, it is preferred that the product articles are processed to obtain a plurality of fragments, wherein at least 50%, more preferably at least 60%, and further preferably at least 70% of the fragments have at least one physical dimension that varies by less than 50%, more preferably less than 40%, and further preferably by less than 30% from an average value of the at least one physical dimension. Examples of the at least one physical dimension are a width, a length, and a thickness of the fragments. For example, at least 70% of the fragments have a width that varies by less than 40% from the average width of the plurality of fragments. In a further aspect of the invention, it is preferred to process the product articles prior to contacting the feedstock with a first amount of a first organic compound.

A "fragment" of a first polyester preferably has physical dimensions (e.g., length, width, thickness) that are all below an upper value. It is preferred that this upper value is less than 5 cm, more preferably less than 4 cm, and further preferably less than 3 cm. An example of a plurality of "fragments" are PET flakes, which are well-known to the skilled person employed in the technical field of recycling.

A "first dimension" of a fragment should preferably be understood to mean either the width, the length, or both, of the fragment. A "length" of a fragment should preferably be understood as referring to the largest dimension of the fragment. A "width" of a fragment should preferably be understood as referring to the second largest dimension of the fragment. A "thickness" of a fragment should preferably be understood as referring to the smallest dimension of a fragment.

In a preferred aspect of the invention, the geometric shape of the fragments are not limited. For example, the fragments can be flat, parabolic, or irregular shaped.

In an aspect of the invention, it is preferred that the plurality of fragments comprises a plurality of fragments of the first kind and the plurality of fragments of the further kind. A "fragment of the first kind" should preferably be understood to mean a fragment that has a maximum thickness of less than 1.0 mm. A "fragment of the further kind" should preferably be understood to mean a fragment that has a maximum thickness of 1.0 mm or more. An example of a "fragment of the first kind" is a fragment that is obtained by shredding a wall of a PET beverage container. An example of a "fragment of the further kind" is a fragment that is obtained by shredding a bottom of a PET beverage container.

In the preferred embodiments and the description, if reference is made to the "fragments", this should preferably be understood to mean the fragments that make up the plurality of fragments The at Least One Impurity In an aspect of the invention, it is preferred that the feedstock comprises at least one impurity. In this aspect, it is preferred that the feedstock comprises less than 3.0 wt-%, more preferably less than 2.0 wt-%, even more preferably less than 1.0 wt-%, further preferably less than 0.5 wt-%, and even further preferably less than 0.1 wt-%, based on a total weight of the feedstock, of the at least one impurity.

Examples of the "at least one impurity" include adhesive, paper, sand (e.g., in the form of dust) stone (e.g., gravel), wood, food remains, at least one metal (e.g., Sb, Fe, Ti, Al), at least one polyolefin (e.g., high-density polyethylene, polyethylene, polypropylene), polystyrene, polyvinyl chloride, fuel (e.g., paraffin, petrol, diesel), or a combination of two or more thereof. An example of an at least one polyolefin impurity is bottle caps.

In the preferred aspect of the invention wherein a first polyester in a feedstock is provided in the form of a plurality of fragments, examples of the at least one impurity is one or all of the following: at least one impurity that adheres to the outer surfaces of the fragments (e.g., a label that adheres to the outer surfaces of PET flakes), at least one impurity that is mixed with the plurality of fragments (e.g., gravel that is mixed with PET flakes), or a combination thereof.

In an aspect of the invention, it is preferred that the feedstock is washed, preferably using at least one or all of the following; water, a caustic wash. A preferred caustic wash comprises sodium hydroxide. In this aspect, it is preferred to wash the feedstock prior to contacting the feedstock with the first amount of the first organic compound. E.g., a feedstock used in a method, according to the invention, for producing a first intermediate product is washed prior to contacting the feedstock with a first amount of a first organic compound.

Particle Count Per Area

In an aspect of the invention, it is preferred that at least one or all of the following applies:
a. a particle count per area of the at least one impurity in a volume section $V_1$ is at least 100 000 particles/cm$^2$, more preferably at least 1 000 000 particles/cm$^2$, and further preferably at least 3 000 000 particles/cm$^2$;
b. the particle count per area of the at least one impurity in a first zone of a volume section $V_2$ is in the range of 3 000 particles/cm$^2$ to 350 000 particles/cm$^2$, more preferably in the range of 30 000 particles/cm$^2$ to 250 000 particles/cm$^2$, and further preferably in the range of 100 000 particles/cm$^2$ to 200 000 particles/cm$^2$;
c. the particle count per area of the at least one impurity in a further zone of a volume section $V_2$ is in the range of 100 particles/cm$^2$ to 12 000 particles/cm$^2$, more preferably in the range of 500 particles/cm$^2$ to 6000 particles/cm$^2$, further preferably in the range of 1000 particles/cm$^2$ to 2000 particles/cm$^2$.

In the above aspect, all possible combination of the features a. to c. are preferred. These combinations are e.g., a; b; c; a+b; a+c; b+c; a+b+c.

Inlets

An "inlet of a first kind" should preferably be understood to mean an inlet that is adapted and arranged to allow a first polyester to enter a volume section. An example is the following: a volume section is a reactor, and an inlet of the first kind is an opening on a side of the reactor.

An "inlet of a further kind" should preferably be understood to mean an inlet that is adapted and arranged to allow an organic compound (e.g., a first organic compound) to enter a volume section. A preferred inlet of the further kind is adapted and arranged to allow the organic compound to enter the volume section in the form of a gas, e.g., a vapour. An example of an inlet of the further kind is a gas nozzle, such as a high-pressure gas nozzle.

An "inlet of an even-further kind" should preferably be understood to mean an inlet that is adapted and arranged to allow an organic compound (e.g., a first organic compound) to enter a volume section. A preferred inlet of the even-further kind is adapted and arranged to allow the organic compound to enter the volume section in the form of a liquid. An example of an inlet of the even-further kind is a nozzle, such as a nozzle that is adapted and arranged to spray the liquid.

Molar Mass

In an aspect of the invention, it is preferred that a number average molar mass of a first polyester, prior to being contacted with a first amount of a first organic compound, is in the range of 12 000 Da to 18 500 Da, more preferably in the range of 12 700 Da to 17 700 Da, and further preferably in the range of 13 200 Da to 17 200 Da.

In an aspect of the invention, it is preferred that a number average molar mass of a first polyester exiting a volume section $V_1$ is in the range of 10 100 Da to 21 800 Da, more preferably in the range of 10 900 Da to 21 100 Da, and further preferably in the range of 11 400 Da to 20 600 Da.

In an aspect of the invention, it is preferred that a number average molar mass of a first polyester that exists a volume section $V_2$ is in the range of 500 Da to 2 500 Da, more preferably in the range of 700 Da to 2 000 Da, and further preferably in the range of 1 000 Da to 1 500 Da.

In an aspect of the invention, it is preferred that a number average molar mass of a first intermediate product is in the range of 200 Da to 600 Da, more preferably in the range of 300 Da to 500 Da, and further preferably in the range of 350 Da to 400 Da.

In an aspect of the invention, it is preferred that a number average molar mass of a further intermediate product that exits a volume section $V_6$ is in the range of 200 Da to 600 Da, more preferably in the range of 3 000 Da to 6 500 Da, and further preferably in the range of 3 700 Da to 5 500 Da.

In an aspect of the invention, it is preferred that a number average molar mass of a further intermediate product that exits a volume section $V_7$ is in the range of 6 500 Da to 10 500 Da, more preferably in the range of 7 500 Da to 10 000 Da, and further preferably in the range of 8 000 Da to 9 500 Da.

In an aspect of the invention, it is preferred that a first polyester is in the form of a plurality of fragments of a first kind and a plurality of fragments of a further kind. In this aspect, it is preferred that at least one or all of the following applies:
A.) a weight average molar mass of the plurality of fragments of the first kind, prior to being contacted with a first amount of a first organic compound, is in the range of 55 000 Da to 72 000 Da, more preferably in the range of 60 000 Da to 68 000 Da, and further preferably in the range of 62 000 Da to 66 000 Da;
B.) a weight average molar mass of the plurality of fragments of the further kind, prior to being contacted with a first amount of a first organic compound, is in the range of 50 000 Da to 70 000 Da, more preferably in the range of 55 000 Da to 64 000 Da, and further preferably in the range of 57 000 Da to 62 000 Da;

C.) the weight average molar mass of the plurality of fragments of the first kind exiting a volume section $V_1$ is in the range of 47 000 Da to 58 000 Da, more preferably in the range of 49 000 Da to 56 500 Da, and further preferably in the range of 51 000 Da to 54 500 Da.

D.) the weight average molar mass of the plurality of fragments of the further kind exiting a volume section $V_1$ is in the range of 44 000 Da to 77 000 Da, more preferably in the range of 48 000 Da to 73 000 Da, and further preferably in the range of 50 000 Da to 71 000 Da.

E.) the weight average molar mass of the plurality of fragments of the first kind exiting a volume section $V_2$ is in the range of 3 700 Da to 6 000 Da, more preferably in the range of 4 100 Da to 5 300 Da;

F.) the weight average molar mass of the plurality of fragments of the further kind exiting a volume section $V_2$ is in the range of 2 300 Da to 7 500 Da, more preferably in the range of 3 200 Da to 7 200 Da.

In the above aspect, all possible combination of the features A. to F. are preferred. These combinations are e.g., A; B; C; D; E; F; A+B; A+C; A+D; A+E; A+F; B+C; B+D; B+E; B+F; C+D; C+E; C+F; D+E; D+F; E+F; A+B+C; A+B+D; A+B+E; A+B+F; A+C+D; A+C+E; A+C+F; A+D+E; A+D+F; A+E+F; B+C+D; B+C+E; B+C+F; B+D+E; B+D+F; B+E+F; C+D+E; C+D+F; C+E+F; D+E+F; A+B+C+D; A+B+C+E; A+B+C+F; A+B+D+E; A+B+D+F; A+B+E+F; A+C+D+E; A+C+D+F; A+C+E+F; A+D+E+F; B+C+D+E; B+C+D+F; B+C+E+F; B+D+E+F; C+D+E+F; A+B+C+D+E; A+B+C+D+F; A+B+C+E+F; A+B+D+E+F; A+C+D+E+F; B+C+D+E+F; A+B+C+D+E+F.

Orientation of a Direction with Respect to Gravity

If a direction (e.g., a first direction) is "at least partially opposite the direction of gravity", this should preferably be understood to mean the following: if the direction is decomposed into its three, perpendicular components, the component parallel to the direction of gravity is orientated such that this component is opposite the direction of gravity. If a direction (e.g., a first direction) is "at least partially along the direction of gravity", this should preferably be understood to mean the following: if the direction is decomposed into its three, perpendicular components, the component parallel to the direction of gravity is orientated such that this component is along the direction of gravity, i.e., points in the same direction as gravity.

Agitation in a Volume Section

Agitation in a volume section is preferably performed using a mechanical means adapted and arranged for agitation, a non-mechanical means adapted and arranged for agitation, or a combination thereof. Examples of suitable mechanical means include a stirrer, e.g., a vertical blade stirrer, a turbine, an impeller, and a propellor. Examples of suitable non-mechanical means include the injection, preferably under pressure, of at least one fluid (e.g., in the form of a gas, a liquid, or a combination thereof) into a volume section, and ultrasound. For example, a further organic compound is injected as a liquid, via a nozzle, into a volume section $V_3$.

Organic Compound

A preferred "organic compound" (e.g., a first organic compound, a further organic compound) is a compound that is suitable for use for reducing a molar mass (e.g., weight average molar mass, number average molar mass) of a first polyester, preferably by solvolysis. For example, if the first polyester is PET, (mono)ethylene glycol, alcohol, or methanol can be used to reduce the weight average molar mass of the first polyester via the process of solvolysis. A preferred "organic compound" (e.g., a first organic compound, a further organic compound) is selected from the list consisting of (mono)ethylene glycol, diethylene glycol, triethylene glycol, dipropylene glycol, poly propylene glycol, alcohol, methanol, and a combination of at least two thereof, with (mono)ethylene glycol more preferred, and mono ethylene glycol particularly preferred.

"Free" organic compound should preferably be understood to mean organic compound that is not chemically bound to e.g., the first polyester, the first intermediate product, the further intermediate product, by a covalent bond. "Free" organic compound is in contrast to "bound" organic compound, which is chemically bound to e.g., the first polyester, the first intermediate product, the further intermediate product, by a covalent bond. For example, during the solvolysis of PET using MEG, some of the MEG is chemically bound to the PET oligomers. Such bound MEG is not free MEG.

In an aspect of the invention, it is preferred that a first organic compound and a further organic compound is the same organic compound. For example, it is preferred that the first organic compound and the further organic compound are both (mono)ethylene glycol.

Initial Mixtures

In an aspect of the invention, it is preferred that a first initial mixture comprises a first polyester and a first organic compound. In an aspect of the invention, it is preferred that a further initial mixture comprises a first polyester and a further organic compound. In this aspect, it is further preferred that the further initial mixture also comprises the first organic compound. In an aspect of the invention, it is preferred that an even-further initial mixture comprises a first polyester and a first organic compound.

First Particulated Material

First particulated material suitable for the invention is commercially available from e.g., Merck KGaA (Germany) and Donau Carbon GmbH (Germany).

A "mode" of the first particulated material is a well-known measure of a statistical distribution. The mode of the first particulated material is described further below with regards to FIG. 8.

Further Aspects and Definitions

In an aspect of the invention, it is preferred that the feedstock comprises less than 5 wt-%, more preferably less than 1 wt-%, and further preferably less than 0.1 wt-% of a colourant. E.g., the feedstock comprises PET flakes that were obtained by shredding colourless bottles. In an aspect of the invention, it is preferred that the feedstock comprises less than 5 wt-%, more preferably less than 1 wt-%, and further preferably less than 0.1 wt-% of coloured fragments.

In an aspect of the invention, it is preferred that a method according to the invention is operated continuously, semi-continuously, or batchwise. Examples of these methods are a "method for producing a first intermediate product" and a "method for producing a further intermediate product".

A preferred example of a "method for producing a first intermediate product" is a method wherein the first intermediate product is produced by a recycling of a first polyester. A preferred example of a "method for producing a further intermediate product" is a method wherein the further intermediate product is produced by a recycling of a first polyester.

A process step of "contacting" a component (e.g., a first polyester) with an organic compound preferably includes at least one or all of the following: a process step wherein the organic compound and the component are mixed (e.g., mixing the organic compound and the component in a volume section using an agitation means); a process step of keeping the organic compound and the component in contact with each other (e.g., the component and the organic compound form a mixture, the component is in suspension in the organic compound, or the component is at least partially dissolved in the organic compound); a process step of passing the organic compound through the component (e.g., allowing a vapour to pass through a porous component, or the component is in the form of a plurality of fragment and the vapour is allowed to pass between the fragments); or a combination of at least two or more thereof.

The process step of "reducing a weight average molar mass of a first polyester" preferably includes at least one or all of the following: at least partially depolymerising the first polyester (e.g., via solvolysis); heating the first polyester; photodegradation of the first polyester; shearing the first polyester; or a combination of at least two or more thereof.

In an aspect of the invention, it is particularly preferred that the weight average molar mass of the first polyester is reduced by solvolysis. Examples of solvolysis include hydrolysis, glycolysis, alcoholysis, and aminolysis. For example, if the first polyester is PET, water can be used to depolymerised the PET to terephthalic acid and ethylene glycol (hydrolysis). For example, if the first polyester is PET, methanol can be used to depolymerised the PET to dimethyl terephthalate and ethylene glycol (methanolysis). For example, if the first polyester is PET, (mono)ethylene glycol can be used to depolymerised the PET to BHET and other PET glycolysates (glycolysis). In this aspect, glycolysis is particularly preferred.

The process step of "increasing a weight average molar mass of an intermediate product" (e.g., a first intermediate product, or a further intermediate product) preferably includes at least one or all of the following: at least partially polymerising the intermediate product; cross-linking the intermediate product; transesterification of the intermediate product; or a combination of at least two or more thereof. In an aspect of the invention, it is particularly preferred that the weight average molar mass of an intermediate product is increased by at least partially polymerising the intermediate product. In this aspect, polycondensation is preferred.

The "intrinsic viscosity" should preferably be understood to mean an average intrinsic viscosity.

A "first direction" should preferably be understood to mean a direction that is at least partially opposite the direction of gravity. A "further direction" should preferably be understood to mean a direction that is at least partially along the direction of gravity.

An "ambient pressure" in a volume section should preferably be understood to mean a pressure in a headspace of a volume section. An "overpressure" in a volume section should preferably be understood to mean a differential pressure with respect to an ambient pressure, e.g., the atmospheric pressure at the location of the volume section.

A "repeating unit" should preferably be understood to mean a part of a polymer whose repetition produces a polymer chain. For example, a polymer is formed by linking "repeating units" together. A "dimer" should preferably be understood to mean a chain that consists of two "repeating units". A "trimer" should preferably be understood to mean a chain that consists of three "repeating units". In an aspect of the invention, a preferred repeating unit has the form

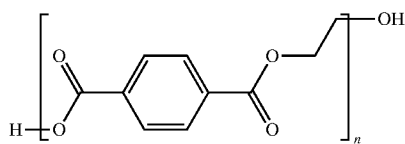

A "first intermediate product" should preferably be understood to mean a product that is obtained by reducing a weight average molar mass of a first polyester. Examples of the "first intermediate product" are oligomers of the first polyester, monomers of the first polyester, or a combination thereof. In an aspect of the invention, it is preferred that the "first intermediate product" comprises at least one or all of the following: monomers of the first polyester, oligomers of the first polyester, or both.

An "oligomer" should preferably be understood to mean a chain of repeating units, wherein the number of repeating units is not more than 50.

Test Methods

The test methods which follow were utilized within the context of the invention. Unless stated otherwise, the measurements were conducted at an ambient temperature of 25° C., an ambient air pressure of 100 kPa (0.986 atm) and a relative air humidity of 65%. Unless stated otherwise, the measurement methods have an error margin of ±5%.

In the test methods below, when reference is made to PET, it should be understood that the specific test method can be applied to any polyester, without adapting the test method.

Bulk Density of the Feedstock

When the feedstock comprises a plurality of fragments, the bulk density of the feedstock, $\rho_{BULK,FEED}$, is calculated according to the standard ASTM D1895-17 B. The bulk density of the feedstock is measured prior to contacting the feedstock with the first amount of the first organic compound. The method is described using a feedstock of PET flakes as an example.

Bulk Density of the First Polyester in the Volume Sections $V_1$ and $V_2$

If the first polyester is in the form of a plurality of fragments, the bulk density of the first polyester in the volume section $V_1$ and the first zone of the volume section $V_2$ is determined as described below. The method is illustrated using PET flakes as an example, a. The bulk density of the PET flakes exiting the volume section $V_1$ is assumed to be the same as the bulk density of the flakes in the volume section $V_1$, $\rho_{BULK, V1}$. The value of $\rho_{BULK, V1}$ is determined by taking 10 samples of the PET flakes at the exit of the volume section $V_1$, and calculating $\rho_{BULK, V1}$ using the same procedure as described for calculating the bulk density of the feedstock.

b. Due to the pressure in the first zone of the volume section $V_2$, the PET flakes will be compressed, leading to an increase in the bulk density in the first zone $\rho_{BULK, V2, Z1}$. The bulk density is calculated as follows:

$$\rho_{BULK,V2,Z1} = C_{FACTOR} \cdot \rho_{BULK,V1},$$

where $C_{FACTOR}$ is a compression factor.

c. The bulk density of the PET flakes in the further zone of the volume section $V_2$, $\rho_{BULK, V2, Z2}$, is determined by taking 10 samples of the PET flakes at the exit of the volume section $V_2$, and calculating $\rho_{BULK, V2, Z2}$ using the same procedure as described for calculating the bulk density of the feedstock.

The compression factor $C_{FACTOR}$ is determined as follows:

a. The head pressure, $p_{HEAD, V2}$, at the bottom of the volume section $V_2$ is calculated as follows:

$$p_{HEAD,V2} = [H_{MEG,V2} \cdot (\rho_{PET} - \rho_{MEG}) + (H_{REACTOR,V2} - H_{MEG,V2}) \cdot \rho_{BULK,V2,Z2}] \cdot a_{GRAV},$$

where $H_{MEG, V2}$ is the height of the first organic compound (e.g., MEG) in the volume section $V_2$ (measured from the bottom of the volume section $V_2$), $H_{REACTOR, V2}$ is the height of the volume section $V_2$, $\rho_{PET}$ is the density of PET in SI units (1380 kg/m$^3$), $\rho_{MEG}$ is the density of MEG in SI units (1110 kg/m$^3$), $\rho_{BULK, V2, Z2}$ is in SI units, and $\alpha_{GRAV}$ is the acceleration due to gravity (9.81 m/s). The value of $p_{HEAD, V2}$ is in units of N/m$^2$.

b. 500 ml of PET flakes ($V_{PET, C-TEST, INITIAL}$) are placed in a cylindrical container with a diameter of 50 mm. The sample of PET flakes is taken from the feedstock and is not mixed with any organic compound.

c. A cylindrical rod with a diameter of 12 mm is used to apply a pressure to the PET flakes. The pressure to be applied by the rod, $p_{ROD, TEST}$, is calculated as follows:

$$p_{ROD,TEST} = p_{HEAD,V2} \cdot (A_{CONTAINER}/A_{ROD}),$$

where $A_{CONTAINER}$ is the diameter of the cylindrical container (1964 mm$^2$), and $A_{ROD}$ is the diameter of the rod (13 mm$^2$).

d. The pressure $p_{ROD, TEST}$ is applied to the PET flakes in the cylindrical containers for 5 minutes. The rod is then removed, and the volume of the PET flakes ($V_{PET, C-TEST, AFTER}$) in the cylindrical container is measured.

e. The above experiments is performed 10 times. The compression factor $C_{FACTOR}$ is calculated as follows:

$$C_{FACTOR} = V_{PET,C-TEST,INITIAL,AVG} - V_{PET,C-TEST,AFTER,AVG},$$

where $V_{PET, C-TEST, INITIAL, AVG}$ (500 ml) is the average volume of the PET flakes, of the 10 repetitions of the experiment, as measured prior to the application of the rod, and $V_{PET, C-TEST, AFTER, AVG}$ is the average volume of the PET flakes, of the 10 repetitions of the experiment, measured after the rod has been removed.

Mass Ratio of the First Polyester to an Organic Compound

The mass ratio of the first polyester to an organic compound is determined as described below. The method is illustrated using PET flakes as the first polyester and MEG as the first and further organic compounds.

The mass ratio of PET to MEG in the volume section $V_1$ is determined as described below. The collective sample, used to determine the mass ratio, is obtained as illustrated in the description of FIG. 9. The mass ratio is determined by first measuring the weight of the collective sample of the first initial mixture $M_{SAMPLE, TOTAL, V1}$. The MEG is then decanted from the collective sample, and the remaining PET flakes are placed in an oven for 1 hour at 250° C. After 1 hour, the PET flakes are removed and weighed to obtain the weight of the PET flakes $M_{SAMPLE, PET, V1}$. The weight of the MEG in the collective sample $M_{SAMPLE, MEG, V1}$ is thus given by $$M_{SAMPLE,MEG,V1} = M_{SAMPLE,TOTAL,V1} - M_{SAMPLE,PET,V1}.$$

The mass ratio of PET to MEG in the volume section $V_1$ is then calculated as follows:

$$R_{PET/MEG,SAMPLE,V1} = M_{SAMPLE,PET,V1}/M_{SAMPLE,MEG,V1}.$$

I. The mass ratio of PET to MEG in the first zone of the volume section $V_2$, $R_{PET/MEG, V2, Z1}$, is calculated as described below:

a. A fill ratio of the flakes $V_{F-RATIO, PET, V2}$ is calculated using the following formula:

$$V_{F-RATIO,PET,V2,Z1} = \rho_{BULK,V2,Z1}/\rho_{PET},$$

where $\rho_{BULK}, V_{2, Z1}$ is the bulk density of the flakes in the first zone of the volume section $V_2$, calculated as explained above, and $\rho_{PET}$ is the density of PET (1380 kg/m$^3$).

b. A fill ratio of the MEG $V_{F-RATIO, MEG, V2, Z1}$ is calculated as $$V_{F-RATIO,MEG,V2,Z1} = 1 - V_{F-RATIO,PET,V2,Z1}.$$

c. A ratio of fill ratios $R_{F-RATIOS, V2, Z1}$ is then calculated as $$R_{F-RATIOS,V2,Z1} = V_{F-RATIO,PET,V2,Z1}/V_{F-RATIO,MEG,V2,Z1}.$$

d. The mass ratio $R_{PET/MEG, V2, Z1}$ of PET to MEG in the first zone of the volume section $V_2$ is calculated using the following formula:

$$R_{PET/MEG,V2,Z1} = R_{F-RATIOS,V2,Z1} \cdot (\rho_{PET}/\rho_{MEG}),$$

where $\rho_{MEG}$ is the density of MEG (1113 kg/m$^3$).

II. The mass ratio of PET to MEG in the further zone of volume section $V_2$ $R_{PET/MEG, V2, Z2}$ is calculated by taking 10 samples of the PET flakes exiting the volume section $V_2$. Each sample is 100 g. The PET flakes in the samples have MEG adhering to the surfaces of the flakes. The mass ratio of a sample $R_{SAMPLE, PET/MEG}$ is calculated as follows:

a. The mass of the sample is denoted by $M_{SAMPLE, V2, Z2}$. This mass is the sum of the mass of the PET flakes $M_{SAMPLE, PET, V2, Z2}$ and the mass of the MEG adhering to the PET flakes $M_{SAMPLE, MEG, V2, Z2}$.

b. The sample is placed on a tray, which in turn is placed in an oven for at least 1 hour at a temperature of 250° C. The sample is removed every 20 minutes, weighed using an analytical balance, and placed back into the oven. This procedure is repeated until three successive weight measurements do not change by more than 0.2%. The average of the final three measurement is $M_{SAMPLE, PET, V2, Z2}$. The weight of the MEG is given by $$M_{SAMPLE,MEG,V2,Z2} = M_{SAMPLE,V2,Z2} - M_{SAMPLE,PET,V2,Z2}.$$

c. The mass ratio of PET to MEG for the sample is thus given by $$R_{SAMPLE,PET/MEG,V2,Z2} = M_{SAMPLE,PET,V2,Z2}/M_{SAMPLE,MEG,V2,Z2}.$$

d. The mass ratio $R_{PET/MEG, V2, Z2}$ is calculated as the average of the $R_{SAMPLE, PET/MEG, V2, Z2}$ values calculated for the 10 samples.

Variation in a Property

The percentage variation of a physical property (e.g., the intrinsic viscosity of the first polyester) is determined as follows:

$$\chi = 100 \cdot |P_2 - P_1|P_1,$$

where $\chi$ is the percentage variation, $P_1$ is the average value of the property measured at a first position, and $P_2$ is the average value of the property measured at a second position. The variation can either be an increase or a decrease. 10 measurements should be made of the physical property at the first position, where each measurement is separated by a 5 minute interval. $P_1$ is the average of the 10 measurements made at the first position. Similarly, 10 measurements should be made of the physical property at the second position, where each measurement is separated by a 5 minute interval. $P_2$ is the average of the 10 measurements made at the second position.

For determining the percentage variation of the intrinsic viscosity and a molar mass (e.g., the weight average molar mass, the number average molar mass) of the first polyester in the volume section $V_1$, $P_1$ is measured at the inlet where the first polyester enters the volume section $V_1$, while $P_2$ is measured at the outlet where the first polyester exits the volume section $V_1$.

For determining the percentage variation of the intrinsic viscosity and a molar mass (e.g., the weight average molar mass, the number average molar mass) of the first polyester in the volume section $V_2$, $P_1$ is measured at the inlet where the first polyester enters the volume section $V_2$, while $P_2$ is measured at the outlet where the first polyester exits the volume section $V_2$.

The variation in a physical property should be calculated using values that are expressed in the units used for the property in the description, e.g., the variation in temperature should be calculated using values expressed in ° C.

Relative Ratio of a Property

Unless specified otherwise, the relative ratio β of a physical property (e.g., particle count per area of the at least one impurity) is determined as follows:

$$\beta = P_1/P_2,$$

where $P_1$ is the average value of the property measured at a first position, and $P_2$ is the average value of the property measured at a second position. With the exception of the value P; for the feedstock, the values for $P_1$ and $P_2$ are calculated as described in the method for determining the "Variation in a property".

For determining the relative ratio of the particle count per area of the at least one impurity in the feedstock to the particle count per area of the at least one impurity at an outlet of the volume section $V_1$, $P_1$ is measured in the feedstock prior to transporting the feedstock into the volume section $V_1$, while $P_2$ is measured at the outlet where the first polyester exits the volume section $V_1$. For the feedstock, the 10 measurements for $P_1$ are taken at 10 different positions in the feedstock, where the positions are uniformly distributed through the volume of the feedstock.

For determining the relative ratio of the temperature in the first zone to the temperature in the further zone in the volume section $V_2$, $P_1$ is measured at the inlet where the first polyester enters the volume section $V_2$, while $P_2$ is measured at the outlet where the first polyester exits the volume section $V_2$.

For determining the relative ratio of the particle count per area of the at least one impurity in the first zone to the particle count per area of the at least one impurity in the further zone in the volume section $V_2$, $P_1$ is measured at the inlet where the first polyester enters the volume section $V_2$, while $P_2$ is measured at the outlet where the first polyester exits the volume section $V_2$.

The relative ratio $\beta_{PET/MEG, V2, Z1/Z2}$ of the mass ratio of the first polyester to the first organic compound in the first zone to the mass ratio of the first polyester to the first organic compound in the further zone in the volume section $V_2$ is calculated as follows:

$$\beta_{PET/MEG,V2,Z1/Z2} = R_{PET/MEG,V2,Z1}/R_{PET/MEG,V2,Z2},$$

where $R_{PET/MEG, V2, Z1}$ and $R_{PET/MEG, V2, Z2}$ are calculated as described above.

The relative ratio should be calculated using values that are expressed in the units used for the property in the description, e.g., the relative ratio of the temperature should be calculated using values expressed in ° C.

Density of the First Polyester

Densities of the first polyester are well-known in the art, and can be found, e.g., C.A. Harper, Modern Plastics Handbook: Handbook, McGraw-Hill Professional, New York, 2000, and at https://en.wikipedia.org/wiki/Polyethylene_terephthalate.

Composition of the Feedstock

The content of PVC in the feedstock $C_{PVC}$ is determined by selecting 10 samples, comprising PET flakes, from the feedstock. The sample are selected at positions that are uniformly distributed through the volume of the feedstock.

The PVC content of a sample $C_{SAMPLE, PVC}$ is determined as follows:

i.) Weigh out a sample of 250 g. The weighed-out sample is specimen A with mass $W_A$. Place specimen A on a tray.

ii.) Place the tray in an over at 200° C. for 2 hours.

iii.) Remove the tray from the oven and allow specimen A to cool to room temperature (25° C. or lower).
iv.) Remove any burnt or black parts or pieces from specimen A—the removed parts or pieces form specimen B.
v.) Weigh specimen B. The mass of specimen B is $W_B$.
vi.) The PVC content of the sample, $C_{SAMPLE,\ PVC}$, is calculated as follows:

$$C_{SAMPLE,PVC} = W_B/W_A \cdot 10^6,$$

where $C_{SAMPLE,\ PVC}$ is the PVC content in ppm.

The weighing of the specimen A and specimen B is performed using an analytical balance. The PVC content in the feedstock $C_{PVC}$ is the average of the $C_{SAMPLE,\ PVC}$ values determined for the samples.

The content of floatable impurities in the feedstock $C_F$ is determined by selecting 10 samples, comprising PET flakes, from the feedstock. The sample are selected at positions that are uniformly distributed through the volume of the feedstock. The content of floatable impurities for a sample $C_{SAMPLE,\ C}$ is determined as follows:
i.) Fill a plastic beaker with 500 ml of distilled water.
ii.) Weigh out a sample of 250 g. The weighed-out feedstock is specimen C with a mass $W_C$.
iii.) Transfer specimen C to the plastic beaker, and stir the distilled water and specimen C for 10 minutes.
iv.) Allow the mixture of the distilled water and specimen C to rest for 10 minutes.
v.) Remove any material floating on the surface of the distilled water, and place the removed material in a petri dish. The mass of the petri dish with the removed material, $W_D$, is measured.
vi.) Place the petri dish in an oven at 110° C. for 1 hour.
vii.) Remove the petri dish from the oven and allow to cool in desiccators. The mass of the petri dish, $W_E$, after cooling is measured.
viii.) The floatable content of the sample, $C_{SAMPLE,\ F}$, is calculated as follows:

$$C_{SAMPLE,F} = (W_E - W_D)/W_C \cdot 10^6.$$

The weighing of specimen C and the petri dish is performed using an analytical balance. The content of floatable impurities in the feedstock $C_F$ is the average of the $C_{SAMPLE,\ F}$ values determined for the samples.

The content of solid impurities in the feedstock $C_S$ is determined by selecting 10 samples, comprising PET flakes, from the feedstock. The sample are selected at positions that are uniformly distributed through the volume of the feedstock. The content of solid impurities for a sample $C_{SAMPLE,\ S}$ is determined as follows:
i.) Weigh out a sample of 250 g. The weighed-out sample is specimen F with a mass $W_F$.
ii.) Place specimen F in a stainless steel tray by spreading out specimen F over the surface of the tray.
iii.) Sort out the following types of impurities manually from specimen F: labels, labels with glue, caps and closures, coloured fragments (e.g., blue, green, red, yellow, and other colours), metal, stones, rubber, any other unidentified materials.
iv.) Provide a petri dish with a mass $W_G$.
v.) Place the impurities that have been manually sorted out in the petri dish, and weigh the petri dish. The mass of the petri dish with the impurities is $W_H$.
ix.) The solid content, $C_{SAMPLE,S}$, is calculated as follows:

$$C_{SAMPLE,S} = (W_H - W_G)/W_F \cdot 10^6.$$

The weighing of specimen F and the petri dish is performed using an analytical balance. The content of solid impurities in the feedstock $C_S$ is the average of the $C_{SAMPLE,\ S}$ values determined for the samples.

The wt-% of PET, $PET_{wt-\%}$, in the feedstock is determined as follows:

$$PET_{wt-\%} = 100\% - (C_{PVC} - C_F - C_S)/10^6.$$

Percentages Related to the Plurality of Fragments

In a number of preferred embodiments and preferred aspects of the invention, the feedstock comprises a plurality of fragments. Many of these aspects and embodiments have a feature that "at least X wt-% of the fragments" or "X wt-% or less of the fragments" have a certain geometric property, e.g., a thickness of more than 1 mm. The geometric properties include a thickness, a width, and a length of a fragment. Here X is a variable, which is calculated as follows $$X = M_\%/M_{FRAGMENT,TOTAL},$$

where $M_\%$ is the mass of the fragments that have the certain property, and $M_{FRAGMENT,\ TOTAL}$ is the mass of a selected sample of the plurality of fragments.

In order to determine X, 10 samples of the fragments, each weighing 250 g, are selected from the feedstock at evenly distributed positions. $M_{FRAGMENT,\ TOTAL}$ is thus 2.5 kg. The geometric property (e.g., the thickness) of each fragment is measured at 5 positions evenly spaced on the fragment. The geometric property is measured using a calliper. The maximum value that is measured is defined as the value of the geometric property of the fragment. For example, if a fragment is measured to have a thickness of 1.3 mm, 1.2 mm, 1.7 mm. 1.4 mm, and 1.2 mm, the fragment has a thickness of 1.7 mm.

Particle Size of First Particulated Material

The median particle size of the first particulated material is measured using the following particle analyser and set-up: Helos/BR+Rodos+Vibri/L. This particle analyser and set-up is commercially available from Sympatec GmbH (Germany).

Temperature

The temperature is measured using a resistive thermometer commercially available from WIKA Alexander Wiegand SE & Co. KG (Germany).

The temperature in the first zone in the volume section $V_2$ is measured at 10 different, equally spaced position in the first zone. An average of the 10 measurements defines the temperature in the first zone. The temperature in the further zone in the volume section $V_2$ is measured at 10 different, equally spaced position in the further zone. An average of the 10 measurements defines the temperature in the further zone.

Molar Mass

The number average molar mass, $M_n$, is defined as $$M_n = \frac{\sum M_i N_i}{\sum N_i},$$

and the weight average molar mass, $M_w$, is defined as $$M_w = \frac{\sum M_i^2 N_i}{\sum M_i N_i},$$

where in both of the above expressions $M_i$ is the mass of a polymer i with a chain length L, and $N_i$ is the number of polymers with chain length L.

A molar mass (e.g., the weight average molar mass, the number average molar mass) of the first polyester is measured using gel permeation chromatography (GPC). This method is suitable for determining both the number average molar mass and the weight average molar mass. The method is performed as follows:

i.) A sample of the first polyester is mixed with eluent to produce a solution with a first polyester concentration of 3.0 mg/ml. The eluent is 1,1,1,3,3,3-Hexafluor-2-propanol (HFIP)+0.05 M Potassium trifluoroacetate (KTFAc).

ii.) The solution is kept at a temperature of 23° C. for 12 hours.

iii.) The solution is filtered using a polytetra-fluorethylene syringe filter with a nominal porosity of 1.0 μm.

iv.) 50 μL of the filtrate is injected into a detector using a PSS SECcurity 1260 autosampler. The flow rate is 1.0 mL/min. The detector used is a PSS SECcurity 1260 RI Detector. For the evaluation of the measurements, the software PSS-WinGPC UniChrom Version 8.33 is used. The autosampler, detector, and software are commercially available from PSS Polymer Standards Service GmbH (Germany). The column temperature is 25° C.

In order to evaluate the measurements, it is necessary to perform a calibration of the measurements. This is done as follows:

a.) A conventional calibration with narrowly distributed standards made from polymethyl methacrylate (PMMA), which reproduces the separation behaviour of the gel permeation chromatography (GPC) columns, is made. The measurements for the PMMA is performed using the same eluent and parameter values as described in point i.) to iv.) above.

b.) Eight broadly distributed standards of the first polyester (e.g., PET) are then measured.

c.) On the basis of the known $M_w$ values of the first polyester standards, the PMMA calibration is used to determine the calibration for the first polyester standards. This calibration is performed using mathematical calculations. This provides absolute molar masses for the first polyester samples. The molar mass distributions and molar mass averages of the first polyester samples are calculated by means of the strip method, based on the first polyester calibration curve. Furthermore, the calculation is done using a computer.

The calibration curves used for the above calibration is shown in FIG. 6. FIG. 6A shows the calibration curve for PMMA, which corresponds to the below data:

| Vp/mL | Mp/Da | Designation of standard | Increase | Deviation in % |
|---|---|---|---|---|
| 13.71 | 988000 | PSS-ReadyCal-Kit mmkitr1-07, red | −0.32 | −2.14 |
| 14.31 | 608000 | PSS-ReadyCal-Kit mmkitr1-07, white | −0.31 | 3.37 |
| 15.15 | 340000 | PSS-ReadyCal-Kit mmkitr1-07, green | −0.29 | 3.34 |
| 16.05 | 202000 | PSS-ReadyCal-Kit mmkitr1-07, red | −0.29 | −4.15 |
| 17.33 | 88500 | PSS-ReadyCal-Kit mmkitr1-07, white | −0.28 | −5.10 |
| 18.42 | 41400 | PSS-ReadyCal-Kit mmkitr1-07, green | −0.29 | −1.00 |
| 19.45 | 18700 | PSS-ReadyCal-Kit mmkitr1-07, red | −0.3 | 8.83 |
| 20.41 | 9680 | PSS-ReadyCal-Kit mmkitr1-07, white | −0.32 | 5.04 |
| 21.35 | 5050 | PSS-ReadyCal-Kit mmkitr1-07, green | −0.35 | −2.59 |
| 22.35 | 2380 | PSS-ReadyCal-Kit mmkitr1-07, red | −0.38 | −10.24 |
| 23.35 | 800 | PSS-ReadyCal-Kit mmkitr1-07, white | −0.42 | 6.28 |

FIG. 6B shows the measured first polyester standards, where the first polyester is PET. FIG. 6C shows the calibration curve used to determine the molar masses of the first polyester. The curve in FIG. 6C corresponds to the following data:

| Vp/mL | Mp/Da | Designation of standard | Increase | Deviation in % |
|---|---|---|---|---|
| 13.71 | 931380 | Calibration Point 1 | −0.33 | −2.20 |
| 14.31 | 564864 | Calibration Point 2 | −0.32 | 3.47 |
| 15.15 | 310414 | Calibration Point 3 | −0.30 | 3.44 |
| 16.05 | 181563 | Calibration Point 4 | −0.29 | −4.27 |
| 17.33 | 77600 | Calibration Point 5 | −0.29 | −5.25 |
| 18.42 | 35482 | Calibration Point 6 | −0.30 | −1.03 |
| 19.45 | 15649 | Calibration Point 7 | −0.31 | 9.11 |
| 20.41 | 7942 | Calibration Point 8 | −0.33 | 5.20 |
| 21.35 | 4063 | Calibration Point 9 | −0.36 | −2.66 |
| 22.35 | 1872 | Calibration Point 10 | −0.39 | −10.53 |
| 23.35 | 609 | Calibration Point 11 | −0.43 | 6.48 |

For the fit in FIGS. 6A and 6C, the following calibration parameters were used:

| Parameter | FIG. 6A Value | FIG. 6C Value |
|---|---|---|
| Substance | PPMA | PET |
| Eluent | HFIP + 0.05KTFAc | HFIP + 0.05KTFAc |
| Fit | Polynomial 3 | Polynomial 3 |
| R | 1.000 | 1.000 |
| Mark-Houwink K | — | 1.5834 mL/g |
| Mark-Houwink alpha | — | −0.02914 |

For the measurements shown in FIGS. 6A to 6C, the following columns are used: PSS PFG, 7 μm, pre-column, 8 mm×50 mm; and two PSS PFG, 7 μm, linear M, 8 mm×300 mum. These columns are commercially available from PSS Polymer Standards Service GmbH (Germany).

The above method is also used to measure a molar mass (e.g., weight average molar mass, number average molar mass) of the first intermediate product (e.g., PET oligomers), the further intermediate product (e.g., recycled PET), and the product.

Composition of the First Intermediate Mixture

The amount of free MEG in the first intermediate mixture (comprising e.g., PET oligomers and free MEG) is determined as follows:

i.) Preparation of periodic acid solution: add 23 g periodic acid to a 1000 ml volumetric flask. Dissolve the periodic acid in distilled water. The flask must be filled with distilled water so that 1000 ml of the solution is obtained.

ii.) Preparation of 10% sulphuric acid: add 25 ml distilled water in a 100 ml volumetric flask. Add 10 g of 98% sulphuric acid to the flask. Cool the solution at 23° C. Then, fill the volumetric flask with distilled water to obtain 100 ml of the solution.

iii.) Preparation of 10% potassium iodide: add 10 g potassium iodide to a beaker. Add 90 ml distilled water to the beaker and shake vigorously.

iv.) Standardization of 0.1 N sodium arsenite solution: add 125±0.1 mg potassium iodate to a 300 ml Erlenmeyer flask. Dissolved the potassium iodate in 100 ml distilled water at 50° C. Add 4 g solid potassium iodide and 4 ml of the 10% sulphuric acid (prepared in step ii.) to the flask. Allow the solution to stand in the closed flask and in the dark for 5 minutes. Then add 12 g solid sodium bicarbonate and dilute with distilled water. Titrate the formed iodine with an arsenite solution using the starch as indicator. Calculate the F-factor:

$$F\text{-factor} = \text{initial weight of } KIO_3(\text{mg})/3.567 \times \text{spent arsenic solution (ml)}.$$

v.) Preparation of starch indicator solution: add 1 g starch powder to a 100 ml beaker. Add 10 ml distilled water to the beaker, and then add 100 ml of boiled distilled water.

vi.) Take a sample of the first intermediate mixture and finely grind the sample. Determine the initial weight of the sample in accordance with expected glycol content.

| Glycol content (%) | Initial sample weight (mg) |
| --- | --- |
| 1 | 9300 |
| 5 | 1860 |
| 10 | 930 |
| 15 | 620 |
| 20 | 465 |
| 30 | 311 |
| 40 | 233 |
| 50 | 186 | vii.) Weigh the sample accurately and transfer into a 300 ml Erlenmeyer flask, and prepare the slurry with 100 ml distilled water. Acidify the slurry with 3 drops of the 10% sulphuric acid (prepared in step ii.), and then add 25 ml of the periodic acid solution (prepared in step i.) with a burette. Loosely stopper the flask and allow the flask to stand for 30 minutes at 23° C. Shake from time to time. Then, add 10 g solid sodium bicarbonate and 10% potassium iodide (prepared in step iii.) to the flask. Shake vigorously and immediately titrate against the 0.1 N sodium arsenite solution (prepared in step iv.) until a faint yellow colour is obtained. Then, add 1 ml of the starch indicator solution (prepared in step v.) and continue titration until the blue colour completely disappears. The end point of titration is indicated by the extinction of the blue colouring. The colour extinction must persist for 3 minutes.

viii.) Determine, as described in the previous step vii.), a blank for 25 ml of the periodic acid solution (prepared in step i.), i.e., and all added chemicals as described in the previous step vii.), with the exception of the addition of the sample.

ix.) The percentage of free MEG is determined as follows:

$$\% \ MEG \ \text{content} = [(BW - V) \times F \times 0.31]/E$$

where BW is the spent 0.1 N sodium arsenite solution (ml) for the blank, V is the spent 0.1 N sodium arsenite solution (ml) for the sample, F is the factor of the 0.1 N sodium arsenite solution, and E is the initial weight of the sample in g.

Mass Ratio of the First Particulated Material to the First Intermediate Mixture

The mass ratio, $R_{PM/FIM}$, of the first particulated material to the first intermediate mixture is calculated by $$R_{PM/FIM} = M_{PM}/M_{FIM},$$

where $M_{PM}$ is the mass of the first particulated material and $M_{FIM}$ is the mass of the first intermediate mixture.

Intrinsic Viscosity

The intrinsic viscosity IV of the first polyester is measured according to the standard ASTM D4603:2018, with the following change: the flow time of the solution in a capillary viscometer is determined at 25° C., instead of 30° C. (as given in the standard).

The above method is also used to measure the intrinsic viscosity of the first intermediate product, the further intermediate product, and the product.

Unless specified otherwise, the intrinsic viscosity of the first polyester in the volume section $V_1$ is measured at an outlet where the first polyester exits the volume section $V_1$. Unless specified otherwise, the intrinsic viscosity of the first polyester in the further zone of the volume section $V_2$ is measured at an outlet where the first polyester exits the volume section $V_2$. The intrinsic viscosity of the first intermediate product is measured at an outlet where the first intermediate product exits the volume section $V_3$.

Particle Count Per Area of the at Least One Impurity 10 fragments of the first polyester (e.g., 10 PET flakes) are selected. A scanning electron microscope (SEM) image is taken for each of the fragments, with an image having an area of 100 μm×100 μm (see FIG. 7). The number of impurities are counted in each of the images to obtain the number of particles/cm$^2$ per image, $N_i$. Here the subscript i refers to the number of particles/cm$^2$ determined for the ith fragment. Furthermore, number of impurities are counted on a surface of a fragment, and not an edge of the fragment. The particle count per area, $P_{COUNT}$, is determined by $$P_{COUNT} = \sum N_i/10,$$

where i=runs from 1 to 10. The particle count per area is thus determined by averaging over the values determined for the 10 images.

For the feedstock, the fragments used for determining the particle count per area of the feedstock is selected prior to contacting the feedstock with the first amount of the first organic compound.

If the volume section $V_2$ has a first zone and a further zone: the fragments used for determining the particle count per area in the first zone is selected at the inlet through which the fragments enters the volume section $V_2$, i.e., an inlet of the first kind. 10 fragments are selected at intervals of 5 minutes until 10 fragments have been selected.

The fragments used for determining the particle count per area in the further zone is selected at the outlet through which the fragments exits the volume section $V_2$. Similar to selecting the fragments that enter the volume section $V_2$, the 10 fragments are selected at intervals of 5 minutes until 10 fragments have been selected.

Pressure

Pressure is measured using a pressure gauge commercially available from WIKA Alexander Wiegand SE & Co. KG (Germany).

Residence Time

The residence time TRES is determined by the following equation:

$$T_{RES} = V_{REACTOR}/F_{PRODUCT\ VOLUME\ RATE},$$

where $V_{REACTOR}$ is the volume of a volume space, e.g., a reactor volume, and $F_{PRODUCT\ VOLUME\ RATE}$ is the volume rate of a mixture exiting (e.g., the first intermediate mixture, the further intermediate mixture) the volume section.

Colour Coordinates

The colour coordinates of, e.g., the first intermediate mixture and the product (such as yarn) are measured using the UltraScan VIS spectrophotometer commercially available from HunterLab (USA).

The colour coordinates of a sample of e.g., the first intermediate mixture (comprising, for example, PET oligomers and MEG) or the product, are measured when the sample has a temperature in the range of 22° C. to 25° C.

Properties of the First Particulated Material

The properties of the first particulated material, such as total pore surface area, total pore volume, average pore diameter, median pore diameter, modal pore diameter, and total pore volume are measured using mercury (Hg) porosimetry. The mercury porosimetry analysis was performed according to ISO15901-1 (2005). A Thermo Fisher Scientific PASCAL 140 (low pressure up to 4 bar) und a PASCAL 440 (high pressure up to 4000 bar) and SOLID Software version 3.0.2 (all available from Thermo Fisher Scientific, Inc.) were calibrated with a blank that has a filling volume of 460.82 mm$^3$/g. During measurements the pressure was increased or decrease continuously and controlled automatically by the instrument running in the PASCAL mode and speed set to 3 for intrusion and 7 for extrusion. The "Cylindrical and Plate" model was employed for the evaluation and the density of Hg was corrected for the actual temperature. The value for surface tension of the Hg was 0.48 N/m and the contact angle 140°. The sample size of the first particulated material was between 0.28 g and 0.29 g.

The invention is now illustrated by non-limiting examples and exemplifying embodiments. In the examples and figures, the following abbreviations are used: polyethylene terephthalate (PET), mono ethylene glycol (MEG), bis(2-hydroxyethyl) terephthalate (BHET).

FIGURES

List of Figures

The figures serve to exemplify the present invention, and should not be viewed as limiting the invention. Furthermore, the figures are not drawn to scale.

FIGS. 1A to 1C: schematic illustration of an assembly and a method, according to the invention, for producing a first intermediate product and a further polyester.

FIGS. 2A and 2B: schematic illustration of the angle between the even-further direction and a horizontal plane.

FIG. 3: flow diagram showing the steps of an embodiment of a method, according to the invention, for producing a first intermediate product.

FIG. 4: flow diagram showing the steps of an embodiment of a method, according to the invention, for producing a further intermediate product.

FIGS. 5A and 5B: orientation of a direction with respect to gravity.

FIGS. 6A to 6C: calibration plots used in the method for measuring molar mass.

FIG. 7: scanning electron microscope image of a PET flake showing impurities on the surface of the PET flake.

FIG. 8: graph showing the pore diameter distribution of the first particulated material.

FIG. 9: illustration of the test method for determining the mass ratio of the feedstock, more preferably the first polyester, to the first organic compound in the volume section $V_1$.

DESCRIPTION OF FIGURES

In the figure descriptions, reference is made to a feedstock that comprises PET flakes which are obtained by the shredding of PET plastic bottles. Additionally or alternatively, the feedstock may comprise textile fragments and/or threads that are obtained by the shredding of textiles. Therefore, in the figure descriptions, the term "PET flakes" should preferably be understood as collectively referring to PET flakes obtained from the shredding of bottles and/or the textile fragments and/or threads obtained from shredding textiles.

FIG. 1 shows an assembly and method for recycling used PET.

Figure 1A:
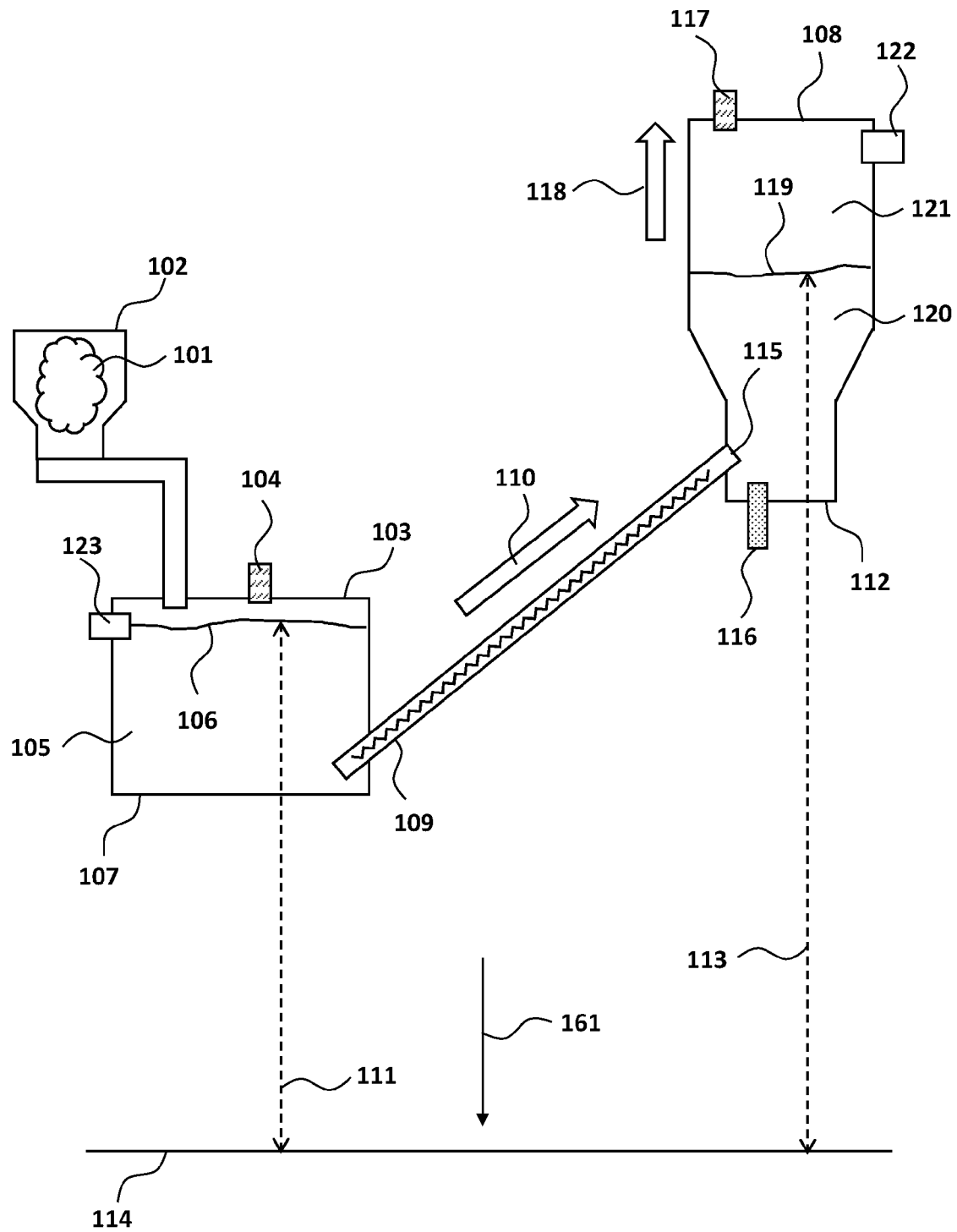
FIG. 1A shows a cross-section of a first part of the assembly, viewed from the side. A feedstock 101, comprising PET flakes (a first polyester in the form of a plurality of fragments), is provided. Residual impurities such as glue, polyvinyl chloride (PVC) labels, food preservatives, and flavouring agents, adhere to the surfaces of the PET flakes. The feedstock may also contain other impurities such as sand. The PET flakes are obtained by shredding PET plastic bottles that were used for beverages. The feedstock 101 is placed in a hopper 102. The feedstock 101 is transported from the hopper 102 to a volume section $V_1$ 103. The transportation of the feedstock 101 can be performed using, e.g., conveying screws, gravity, or a combination thereof. The volume section $V_1$ 103 can be e.g., a receptacle, a tank, or a reactor, such as a washing reactor.

Liquid MEG (a first amount of a first organic compound) is added to the volume section $V_1$ 103 via inlet 104 and mixed (contacted) with the PET flakes and impurities making up the feedstock 101 to obtain a first initial mixture 105 that comprises the PET flakes and the liquid MEG. The first initial mixture 105 is agitated (the agitation means is not shown) to improve the mixing of the PET flakes and MEG. The agitation is performed using mechanical means. The MEG can remove impurities from the surfaces of the PET flakes. This is partly due to the fact that MEG is a powerful solvent and at moderate temperatures its ability to remove organic contaminants is enhanced. Agitating the first initial mixture 105 also at least partly enables the removal of glue from the surfaces of the PET flakes by friction between the PET flakes.

At least a fraction of the impurities, e.g., fragments of bottle caps which comprise polyolefins, float on a surface 106 of the first initial mixture 105. These floating impurities can be removed by using, e.g., skimming or filtration. The impurities are removed from the volume section $V_1$ 103 via the outlet 123. By contrast, the PET flakes in the first initial mixture 105 sink to a bottom 107 of the volume section $V_1$ 103.

The PET flakes, as well as some of the MEG in the first initial mixture 105, are transported to a volume section $V_2$ 108 that is partially filled with MEG. The transport is performed using conveying screw 109 (an Archimedean screw) and a siphon (not shown) that is in fluid communication with the conveying screw 109 and the volume section $V_2$ 108. Further means of transportation, such as additional conveying screws or pumps, can also be used, and are not shown. Furthermore, the volume section $V_2$ 108 is in fluid communication with the volume section $V_1$ 103. The volume section $V_2$ 108 can be e.g., a receptacle, a tank, or a reactor, such as a pre-glycolysis reactor. The conveying screw 109 is arranged such that the PET flakes that are transported to the volume section $V_2$ 108 are transported along a direction 110 (an even-further direction) that is at least partially opposite the direction of gravity 161.

The PET flakes enter the volume section $V_2$ 108 via an inlet of a first kind 115. In FIG. 1A, the inlet of the first kind 115 is an opening in the volume section $V_2$ 108. In addition, MEG (a further amount of the first organic compound) is injected into the volume section $V_2$ 108. A first fraction of the MEG is injected in the form of a vapour via an inlet of a further kind 116. The first fraction may possibly include MEG that was in vapour form, but which has condensed prior to being injected into the volume section $V_2$ 108. The inlet of the further kind 116 is a nozzle that is adapted and arranged to inject the MEG vapour into the volume section $V_2$ 108 under pressure. Although only one inlet of the further kind 116 is shown, it is also possible that there are more than one inlet of the further kind 116. A further fraction of the MEG is injected in the form of a liquid via an inlet of an even-further kind 117. The inlet of the even-further kind 117 is a nozzle that is adapted and arranged to spray the liquid MEG into the volume section $V_2$ 108. The PET flakes in volume section $V_2$ 108 are partially depolymerised (reducing a weight average molar mass) via glycolysis, thereby reducing the weight average molar mass of the PET flakes in the volume section $V_2$. Part of the PET flakes may be depolymerised to oligomers in the volume section $V_2$.

A screw conveyor (not shown) transports the PET flakes (and the PET oligomers, if present) in the volume section $V_2$ 108 in a transport direction 118 that is upward. The vapour MEG that enters the volume section $V_2$ 108, via the inlet of the further kind 116, also flows in an upward direction, i.e., along the transport direction 118. By contrast, the liquid MEG that enters the volume section $V_2$ 108, via the inlet of the even-further kind 117, flows in a downward direction, i.e., opposite the transport direction 118.

The liquid MEG in the volume section $V_2$ 108 comprises liquid MEG that was transported from the volume section $V_1$ 103, liquid MEG that was injected via the inlet of the even-further kind 117, and any MEG vapour (injected via the inlet of the further kind 116) that has condensed. The liquid MEG does not completely fill the volume section $V_2$ 108. The surface (or level) of the liquid MEG therefore forms a boundary 119 that divides the volume section $V_2$ 108 into a first zone 120 and a further zone 121. The further zone 121 is downstream the first zone 120.

The first zone 120 is filled with an even-further initial mixture, which comprises a mixture of PET flakes (and PET oligomers, if present) that are submerged in MEG. The further zone 121 comprises PET flakes and any liquid MEG that adheres to surfaces of the PET flakes, as well as MEG vapour. The further zone 121 may also comprise PET oligomers.

As shown in FIG. 1A, a level 111 of MEG in the volume section $V_1$ 103 is below a level of MEG 113 in the volume section $V_2$ 108. FIG. 1A further shows that the MEG levels 111 and 113 are measured from the ground 114 (e.g., a floor of the recycling plant) to the surfaces of the liquid MEG in the volume section $V_1$ 103 and $V_2$ 108. As a result of this difference in the MEG levels 111 and 113, a fraction of the liquid MEG in the volume section $V_2$ 108 flows back to the volume section $V_1$ 103 via the conveying screw 109. Floatable impurities that were not removed in the volume section $V_1$ 103, and which were transported to the volume section $V_2$ 108 (along with the transport of the PET flakes), can thus be transported back to the volume section $V_1$ 103. The PET flakes with MEG that is adhering to their surfaces (and PET oligomers, if present) exit the volume section $V_2$ 108 via an outlet 122.

Figure 1B:
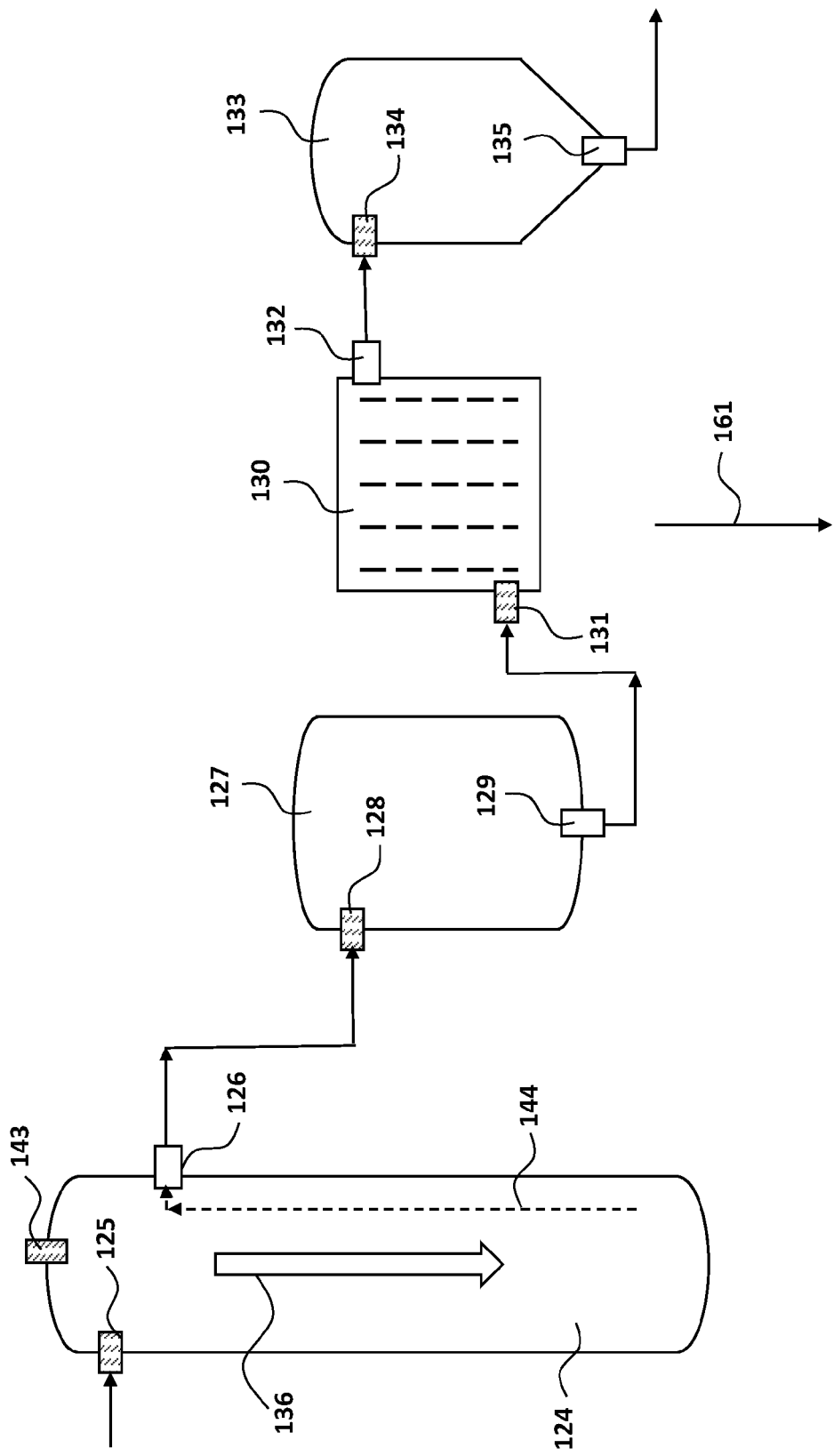
FIG. 1 is a schematic illustration of an assembly and a method, according to the invention, for producing a first intermediate product and a further polyester, such as PET. More specifically.

FIG. 1B shows a cross-section of a further part of the assembly, viewed from the side. The PET flakes (and PET oligomers, if present) that exit via outlet 122 are transported to a volume section $V_3$ 124, which is a reactor (e.g., a glycolysis reactor). The volume section $V_3$ 124 is in fluid communication with the volume section $V_2$ 108. The PET flakes (and PET oligomers, if present) enter the volume section $V_3$ 124 via the inlet 125, and flow through the volume section $V_3$ 124 as indicated by the arrow 136. The inlet 125 of the volume section $V_3$ 124 is also below the outlet 122 of the volume section $V_2$ 108. In other words, when the PET flakes (and PET oligomers, if present) are transported from the volume section $V_2$ 108 to the volume section $V_3$ 124, the PET flakes (and PET oligomers, if present) are transported at least partially along the direction of gravity.

The volume section $V_3$ 124 is fed with MEG (a further organic compound) via an inlet 143. The mixing of the PET with MEG (fed to the volume section $V_3$) leads to the obtaining of a further initial mixture that comprises the PET flakes (and PET oligomers, if present) and MEG. The MEG in the further initial mixture causes the partly depolymerised PET flakes (and PET oligomers, if present) to undergo further glycolysis (reducing a weight average molar mass of the first polyester) as the further initial mixture flows through the volume section $V_3$ 124. A first intermediate mixture is thereby obtained. A transport pipe 144, in fluid communication with an outlet 126, is located inside the volume section $V_3$ 124. The first intermediate mixture exits the volume section $V_3$ 124 via the transport pipe 144 and the outlet 126. The first intermediate mixture that exits the outlet 126 of the volume section $V_3$ 124 comprises free MEG and a first intermediate product (comprising BHET and PET oligomers). The oligomers are polymers with more than one repeating unit (e.g., dimers, trimers, and oligomers with more than three repeating units). Some PET flakes which are not depolymerised to oligomers or BHET may also be present in the first intermediate mixture.

As shown by the arrows in FIG. 1B, after exiting the volume section $V_3$ 124 via an outlet 126, the first intermediate mixture is transported to a volume section $V_4$ 127, which is in fluid communication with the volume section $V_3$ 124. The volume section $V_4$ 127 can be e.g., a receptacle, or a tank, such as a stirred tank. The first intermediate mixture enters the volume section $V_4$ 127 via an inlet 128. In the volume section $V_4$ 127 the first intermediate mixture is mixed with diatomaceous earth (first particulated material). The first intermediate mixture in the volume section $V_4$ 127 is agitated in order to improve the mixing of the first intermediate mixture and the diatomaceous earth.

As shown by the arrows in FIG. 1B, the first intermediate mixture, which comprises the diatomaceous earth, exits the volume section $V_4$ 127 via an outlet 129, and is transported to a vertical leaf filter 130 (filtering means), which is in fluid communication with the volume section $V_4$ 127. The first intermediate mixture, which comprises the diatomaceous earth, enters the vertical leaf filter 130 via an inlet 131. The first intermediate mixture flows through the leaf filter 130 and is re-circulated (not shown) between the leaf filter 130 and the volume section $V_4$ 127, thereby allowing the individual filters of the leaf filter 130 to be coated with the diatomaceous earth. Initially the filtrate (the intermediate mixture) will be turbid. However, if the individual filters have been sufficiently coated, the filtrate will become clear. Once the filtrate has become clear, the intermediate mixture is allowed to exit the vertical leaf filter 130 via an outlet 132. The vertical leaf filter 130 filters out the diatomaceous earth and other particulated material (i.e., impurities) in the first intermediate mixture, as well as any PET flakes that have not been depolymerised to oligomers or BHET. The first intermediate mixture which exits the vertical leaf filter 130 via outlet 132 has only trace amounts of impurities and diatomaceous earth.

As shown by the arrows in FIG. 1B, the first intermediate mixture that exits the vertical leaf filter 130, via the outlet 132, is transported to a volume section $V_5$ 133, which is in fluid communication with the vertical leaf filter 130. The first intermediate mixture enters the volume section $V_5$ 133 via an inlet 134. The volume section $V_5$ 133 can be e.g., a receptacle, or a tank, such as a rectification tank. The volume section $V_5$ 133 is used to determine and correct the colour of the first intermediate mixture. If necessary, at least one colouring agent is added to the first intermediate mixture in the volume section $V_5$ 133. If at least one colouring agent is added to the first intermediate mixture, the first intermediate mixture is agitated in order to better mix the first intermediate mixture with the at least one colouring agent. The first intermediate mixture, which possibly comprises the at least one colouring agent, exits the volume section $V_5$ 133 via an outlet 135.

Figure 1C:
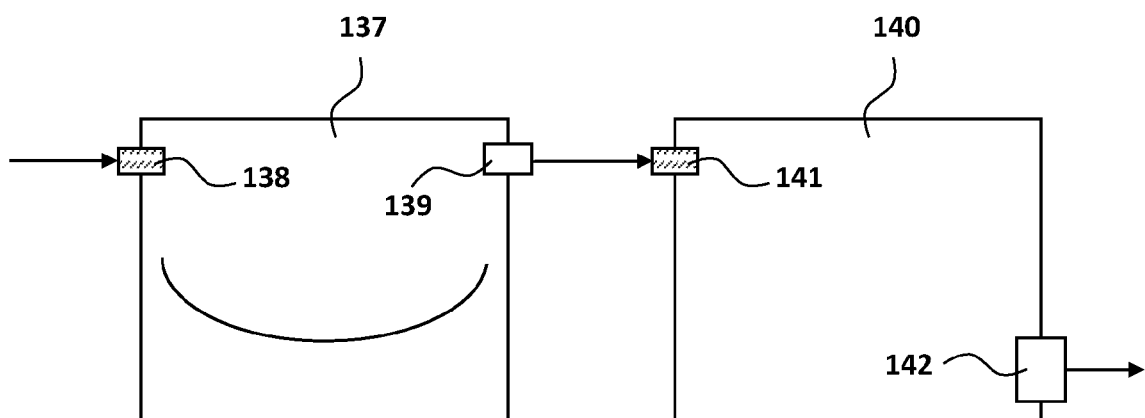

FIG. 1C shows a cross-section of a further part of the assembly, viewed from the side. The first intermediate mixture, that possibly comprises the at least one colouring agent, is transported from the outlet 135 to a volume section $V_6$ 137, which is in fluid communication with the volume section $V_5$ 133. The first intermediate mixture enters the volume section $V_6$ 137 via an inlet 138. Prior to entering the volume section $V_6$ 137, a catalyst and stabiliser may be added to the first intermediate mixture. The PET flakes in the feedstock are obtained by shredding used PET bottles. During the production of the PET used for the bottles, a catalyst is often added. Therefore, the PET flakes of the feedstock very often already contain a catalyst, and it may thus not be necessary to add further catalyst during the recycling process. The volume section $V_6$ 137 is a pre-polymerisation reactor that polymerises the oligomers and BHET (increasing the weight average molar mass of the first intermediate product) in the first intermediate mixture to obtain polymers (the further intermediate product). A further intermediate mixture comprising polymers (i.e., PET polymers) and MEG is thereby obtained. In the volume section $V_6$ 137, up to 95% of excess MEG is evaporated under vacuum conditions. The excess MEG comprises both free MEG that was transported into the volume section $V_6$, as well as bound MEG that was released by the polymerisation. The further intermediate mixture exits the volume section $V_6$ 137 via an outlet 139.

As shown by the arrows in FIG. 1C, the further intermediate mixture that exits the volume section $V_6$ 137, via the outlet 139, is transported to a volume section $V_7$ 140, which is in fluid communication with the volume section $V_6$ 137. The further intermediate mixture enters the volume section $V_7$ 140 via an inlet 141. The volume section $V_7$ 140 is a polymerisation reactor, such as a disc-cage reactor, that is used to further increase the weight average molar mass (via polymerisation) of the polymers, and any remaining oligomers, in the further intermediate mixture. In addition, any remaining MEG in the further intermediate mixture is also evaporated under vacuum conditions in the volume section $V_7$ 140. The remaining MEG comprises both free MEG that was transported into the volume section $V_7$, as well as bound MEG that was released by the polymerisation. The further intermediate mixture, comprising the further intermediate product, exits the volume section $V_7$ 140 via the outlet 142. The further intermediate product (i.e., recycled PET) that is obtained, following the completion of the polymerisation in the volume section $V_7$ 140, is in the form of a hot melt. The hot melt can be used to produce yarn (an example of a product), as well as granules, commonly referred to as chips. The chips can be obtained by extruding and cooling the hot melt. The further intermediate product is thus a further polyester.

Although not shown, the transport of the first intermediate mixture between volume sections $V_3$, $V_4$, $V_5$, $V_6$, and the vertical leaf filter is achieved by pumping the first intermediate mixture. This also holds for the further intermediate mixture, i.e., the further intermediate mixture is pumped between the volume sections $V_6$ and $V_7$.

(Not shown in the figures): the further intermediate product can subsequently be used to produce further products, such as yarn for textiles. For example, the further intermediate product, in molten form, is pumped through spin-packs. A spin-pack is conceptually similar to a domestic shower head. The number of apertures in the spin-pack determine the filament count of the yarn that is produced. The molten, further intermediate product streams that exit the spin-packs are cooled, and coalesce into a single yarn. The single yarn is then wound onto bobbins. The further intermediate product is also obtained without using virgin PET. E.g., virgin PET monomers and oligomers are not mixed with the first intermediate product prior to polymerisation. E.g., virgin PET polymers are also not mixed with the further intermediate product.

Returning to FIGS. 1A and 1B: these figures show that the PET flakes are transported in a first direction that is at least partially opposite the direction of gravity when the PET flakes have an intrinsic viscosity that is larger than or equal to a value $Y_{IV,1}$, and transported in further direction that is at least partially along the direction of gravity when the PET flakes have an intrinsic viscosity that is less than a value $Y_{IV,2}$ (here $Y_{IV,1}$ and $Y_{IV,2}$ represents variables, with $Y_{IV,1} > Y_{IV,2}$).

As shown in FIG. 1A, after being contacted with MEG in the volume section $V_1$ 103, the PET flakes are transported to volume section $V_2$ 108 along the direction 110, which is at least partially opposite the direction of gravity 161. In the volume section $V_2$ 108 the PET flakes are transported in the transport direction 118, which is directed opposite the direction of gravity 161, i.e., the average transport direction of the PET flakes in the volume section $V_2$ 108 is upward. In the context of FIG. 1A, the first direction can be defined as the direction from the bottom 107 of the volume section $V_1$ 103 to the outlet 122 of the volume section $V_2$ 108. The preceding should, however, not be seen as the general definition of the first direction. The transporting of PET (e.g., in the form of flakes) in the first direction should generally be understood to mean that PET fragments (e.g., in the form of flakes) is transported at least partially against the direction of gravity as long as the intrinsic viscosity of the PET fragments is larger than or equal to a value $Y_{IV,1}$.

As shown in FIG. 1B, when the PET flakes enter the volume section $V_3$ 124, via the inlet 125, the PET flakes are transported along the direction 136, which is directed along the direction of gravity 161. In the context of FIG. 1B, the direction 136 defines the further direction. The preceding should, however, not be seen as the general definition of the further direction. The transporting of PET (e.g., in the form of flakes) in the further direction should generally be understood to mean that PET fragments (e.g., in the form of flakes) is transported at least partially along the direction of gravity as long as the intrinsic viscosity of the PET fragments is less than or equal to a value $Y_{IV,2}$. However, once the PET has been depolymerised, the PET oligomers and/or monomers can be transported either against gravity, or along the direction of gravity.

Figure 2A:
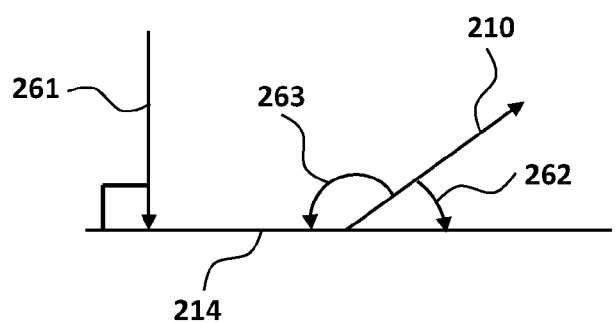
Figure 2B:
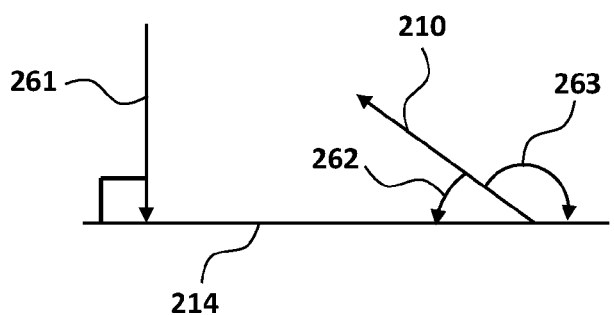

FIG. 2 is a schematic illustration 200 showing how the angle between the even-further direction 210 and a horizontal plane 214 is measured. The horizontal plane 214 is perpendicular to the direction of gravity 261. The angle is measured as the smallest angle between the even-further direction 210 and the horizontal plane 214. This is illustrated in FIG. 2A and FIG. 2B. In each of these figures, the angle 262 is defined as the angle between the even-further direction 210 and the horizontal plane 214, and not the angle to 263.

Figure 3:
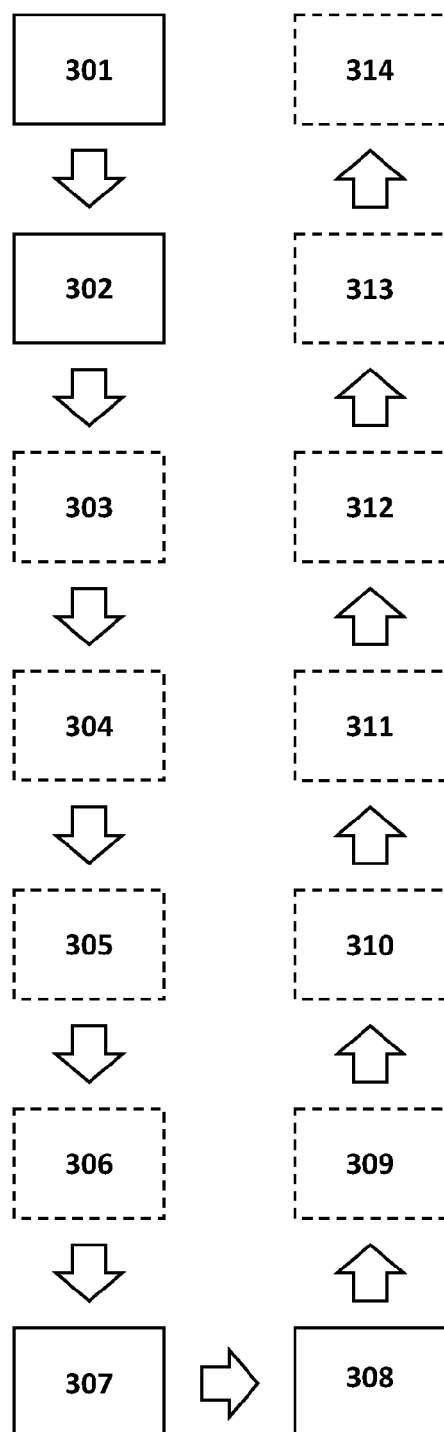

FIG. 3 is flow diagram showing the steps of an embodiment of a method 300, according to the invention, for producing a first intermediate product. Optional steps in FIG. 3 are indicated with a dashed box. The description of the method steps are given below.

| Step: | Description: |
|---|---|
| 301 | Providing a feedstock that comprises a first polyester. |
| 302 | Contacting the feedstock with a first amount of a first organic compound in a volume section $V_1$ to obtain a first initial mixture, wherein the first amount is in the form of a liquid. |
| 303 | Optionally, transporting the first polyester to a volume section $V_2$ from the volume section $V_1$. |
| 304 | Optionally, contacting the first polyester with a further amount of the first organic compound in the volume section $V_2$. |
| 305 | Optionally, reducing a weight average molar mass of the first polyester in the volume section $V_2$. |
| 306 | Optionally, transporting the first polyester to a volume section $V_3$ from the volume section $V_2$. |
| 307 | Contacting the first polyester with a further organic compound, in the volume section $V_3$, to obtain a further initial mixture. |
| 308 | Reducing the weight average molar mass of the first polyester, in the volume section $V_3$, to obtain a first intermediate mixture, wherein the first intermediate mixture comprises a first intermediate product and the further organic compound. |
| 309 | Optionally, transporting the first intermediate mixture to a volume section $V_4$ from the volume section $V_3$. |
| 310 | Optionally, adding first particulated material to the first intermediate mixture in the volume section $V_4$. |
| 311 | Optionally, transporting the first intermediate mixture to a filtering means from the volume section $V_4$. |
| 312 | Optionally, at least partially removing the following, using the filtering means, from the first intermediate mixture: the first particulated material, at least one impurity. |
| 313 | Optionally, transporting the first intermediate mixture to a volume section $V_5$ from the filtering means. |
| 314 | Optionally, adding at least one colouring agent to the first intermediate mixture in the volume section $V_5$. |

In FIG. 3, the first polyester is transported in a first direction that is at least partially opposite the direction of gravity when the first polyester has an intrinsic viscosity that is larger than or equal to $Y_{IV,1}$, where $Y_{IV,1}$ is 0.10 dL/g; and in further direction that is at least partially along the direction of gravity when the first polyester has an intrinsic viscosity that is less than or equal to $Y_{IV,2}$, where $Y_{IV,2}$ is 0.09 dL/g. Here the transport can be between two different volume section, through a volume section, or both. For example, the first direction is preferably from the volume section $V_1$ to the volume section $V_2$, and through the volume section $V_2$. For example, the further direction is through the volume section $V_3$.

In an aspect of the embodiment in FIG. 3, it is preferred that steps 304 and 305 are performed at least partially simultaneously. In an aspect of the embodiment in FIG. 3, it is preferred that steps 307 and 308 are performed at least partially simultaneously.

Figure 4:
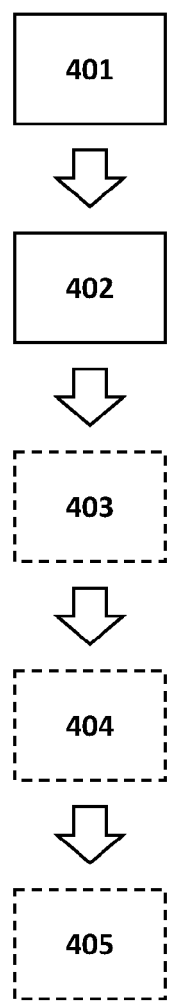

FIG. 4 is flow diagram showing the steps of an embodiment of a method 400, according to the invention, for producing a further intermediate product. Optional steps in FIG. 4 are indicated with a dashed box. The description of the method steps are given below.

| Step: | Description: |
|---|---|
| 401 | Providing a first intermediate mixture that comprises a first intermediate product. The first intermediate product and the first intermediate mixture are obtained from the method of FIG. 3. The first intermediate mixture is provided in a volume section $V_6$ by transporting the first intermediate mixture from the filtering means to the volume section $V_6$. |
| 402 | Increasing the weight average molar mass of the first intermediate product in the first intermediate mixture, in the volume section $V_6$, to obtain a further intermediate mixture that comprises a further intermediate product. The further intermediate mixture further comprises at least one or all of the following: the first organic compound, the further organic compound. |
| 403 | Optionally, transporting the further intermediate mixture to a volume section $V_7$. |
| 404 | Optionally, further increasing the weight average molar mass of the further intermediate product in the further intermediate mixture in the volume section $V_7$. |

-continued

| Step: | Description: |
|---|---|
| 405 | Optionally, at least partially removing at least one organic compound, e.g., the first organic compound or the further organic compound, from the further intermediate mixture. This step can be performed at least partially simultaneously with at least one or all of the steps 402 and 404. |

In an aspect of the embodiment in FIG. 4, it is preferred that step 405 is performed at least partially simultaneously with at least one or all of the steps 402 and 405. In a preferred embodiment of the invention, a method, according to the invention, for producing a further intermediate product comprises the steps 301 to 314, as well as the steps 401 to 405. E.g., the steps of FIG. 3 can be combined with the steps of FIG. 4, where the steps of FIG. 3 are performed prior to the steps of FIG. 4. In such a combination, optional steps described in FIGS. 3 and 4 remain optional.

Figure 5A:
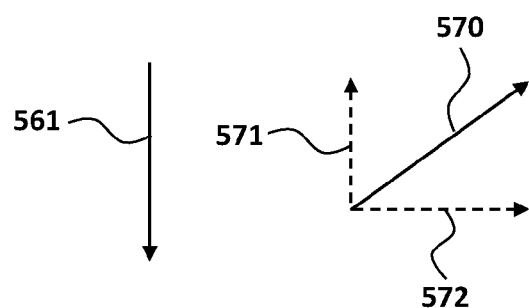

FIG. 5 shows how an orientation of a direction with respect to gravity is defined. FIG. 5A shows a direction 570 that is at least partially opposite the direction of gravity 561. The direction 570 can be decomposed into three components. The direction 570 has a component 571 parallel to the direction of gravity 561, and a component 572 perpendicular to the direction of gravity (the other component perpendicular to the direction of gravity is not shown). The direction of the component 571 is opposite the direction of gravity.

Figure 5B:
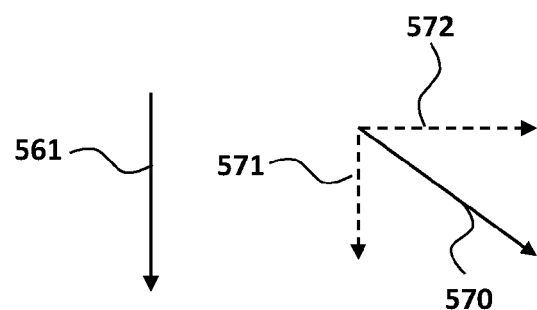
Figure 6A:
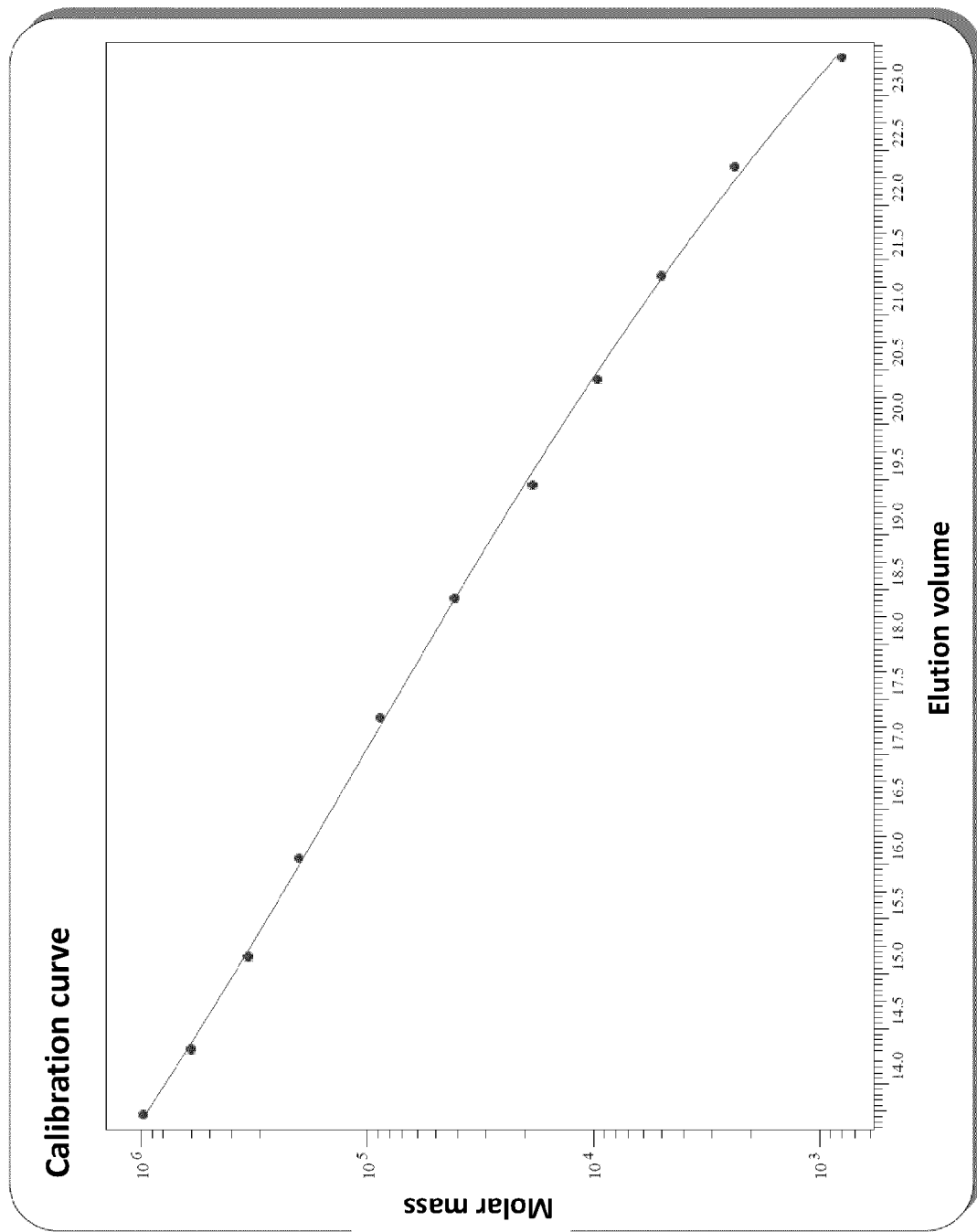
Figure 6B:
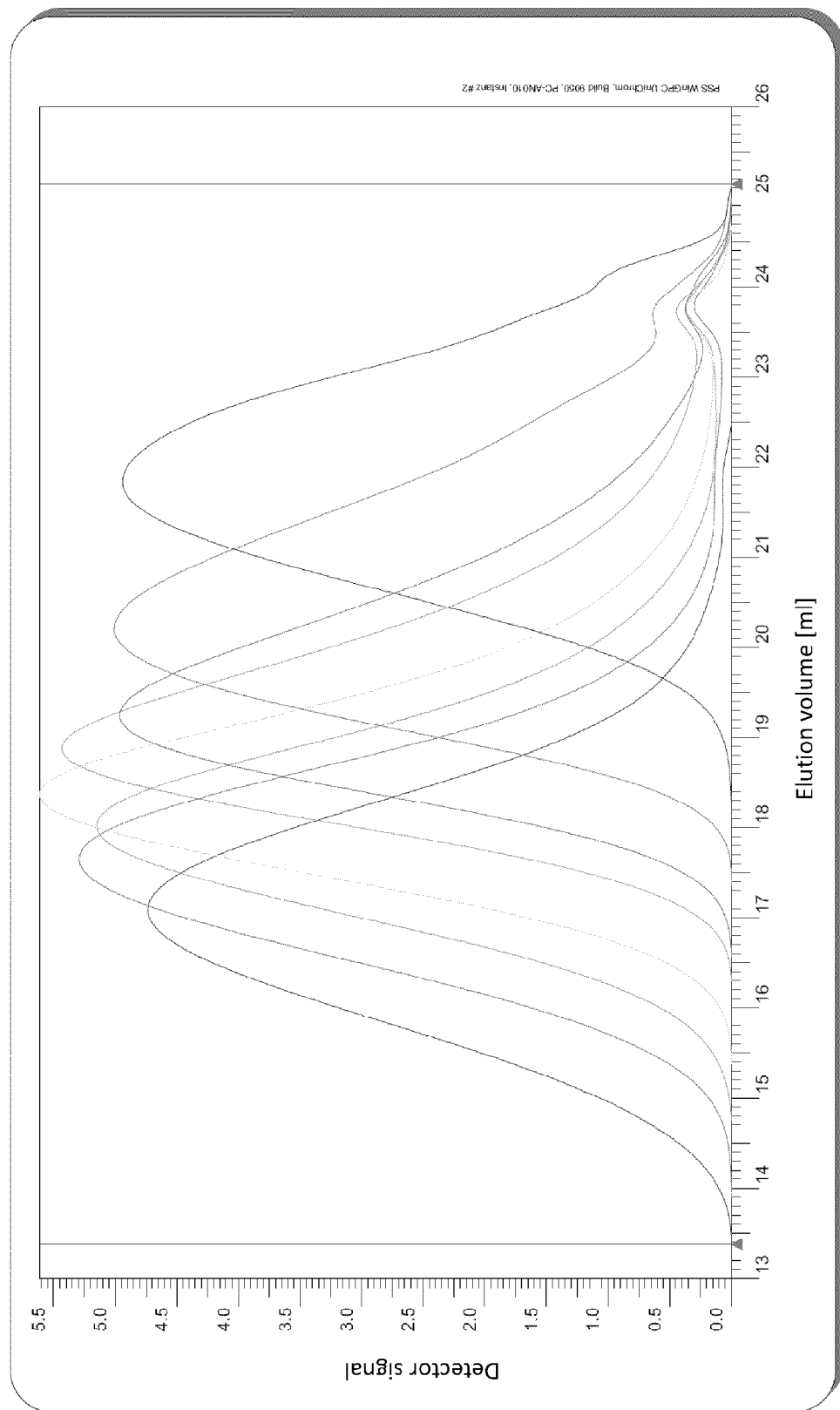
Figure 6C:
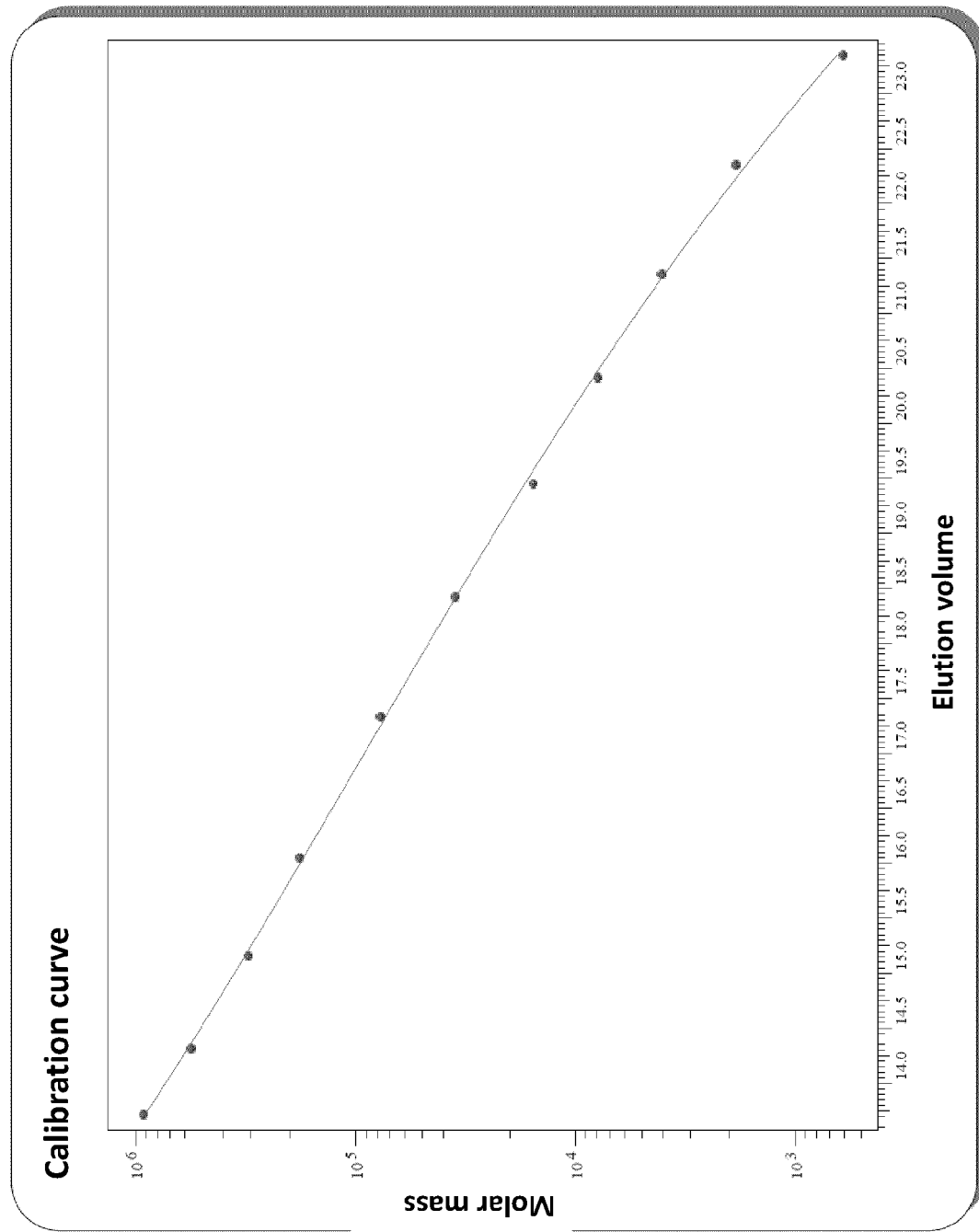

FIG. 5B shows a direction 570 that is at least partially along the direction of gravity 561. Similar to FIG. 5A, the direction 570 has a component 571 parallel to the direction of gravity 561, and a component 572 perpendicular to direction of gravity. However, in contrast to FIG. 5A, the direction of the component 571 in FIG. 5B is along the direction of gravity.

Figure 7:
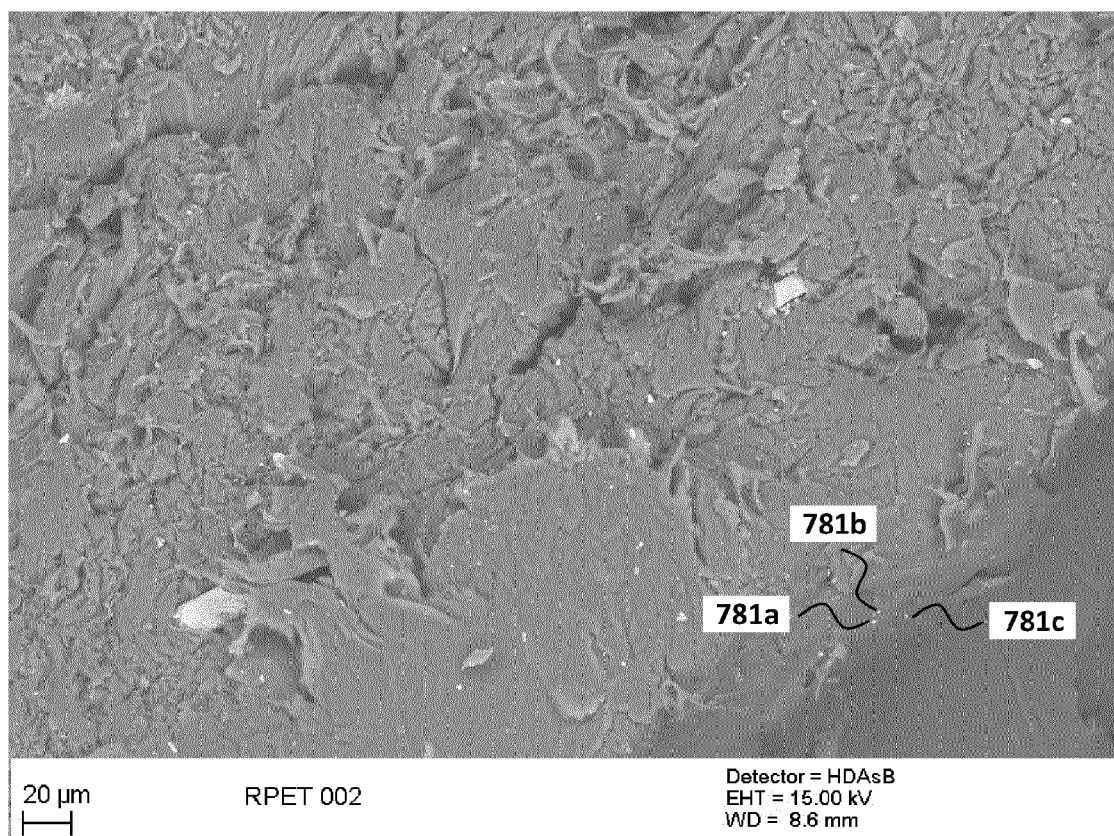

An SEM image of a PET flake is shown in FIG. 7. The impurities on the surface of the PET flakes can be identified as the white particles. Three impurities, 781a, 781b, and 781c, are indicated in FIG. 7. FIG. 7 is an example of the SEM image to determine the particle count per area of the at least one impurity.

Figure 8:
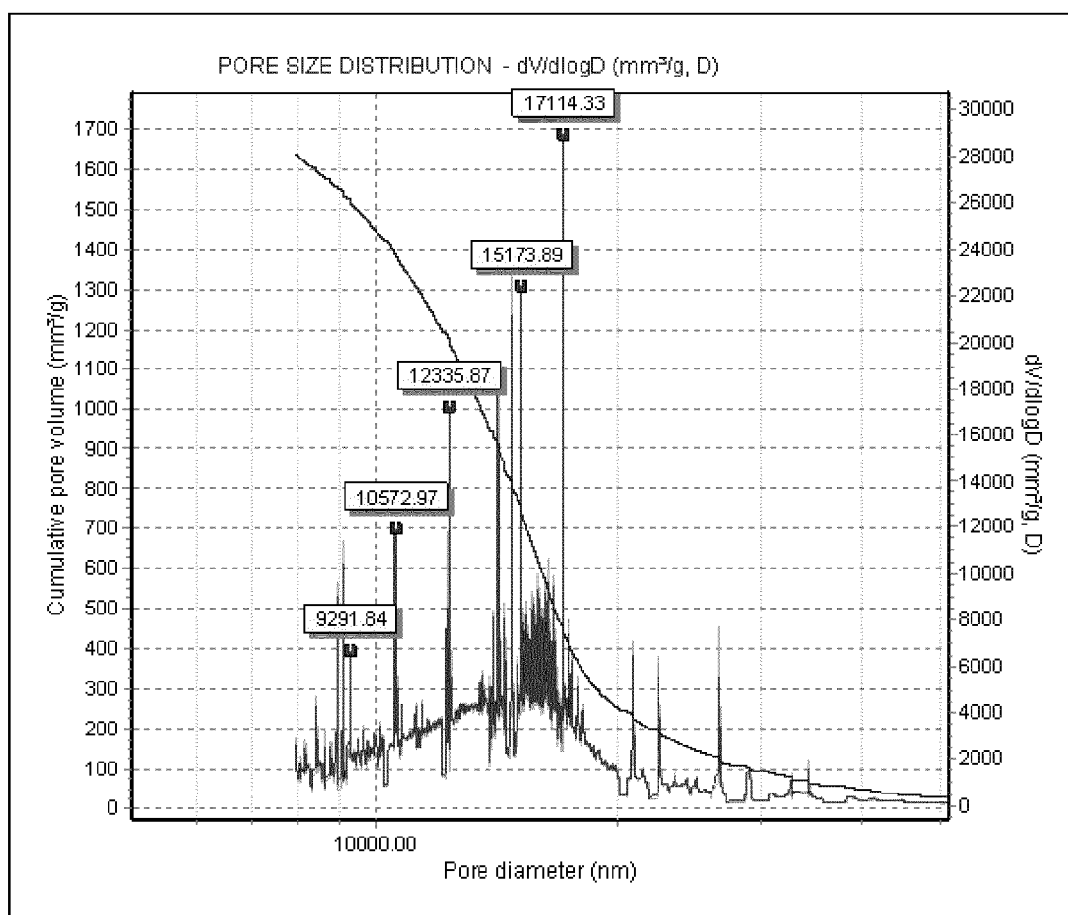

FIG. 8 shows the distribution of the pore diameter of the first particulated material. As can be seen from FIG. 8, the first particulated material has modes at approximately 17 100 nm, 15 100 nm, 12 300 nm, 10 600 nm, and 9 300 nm. A mode is where the quantity dV/d log D has a maximum value (either a local maximum or a global maximum). dV is the differential volume and d log D is the differential of the logarithm of the pore diameter of the first particulated material. A primary mode refers to the global maximum of dV/d log D. A secondary mode refers to the second largest maximum of dV/d log D. FIG. 8 also shows the cumulative pore volume for the first particulated material.

Figure 9:
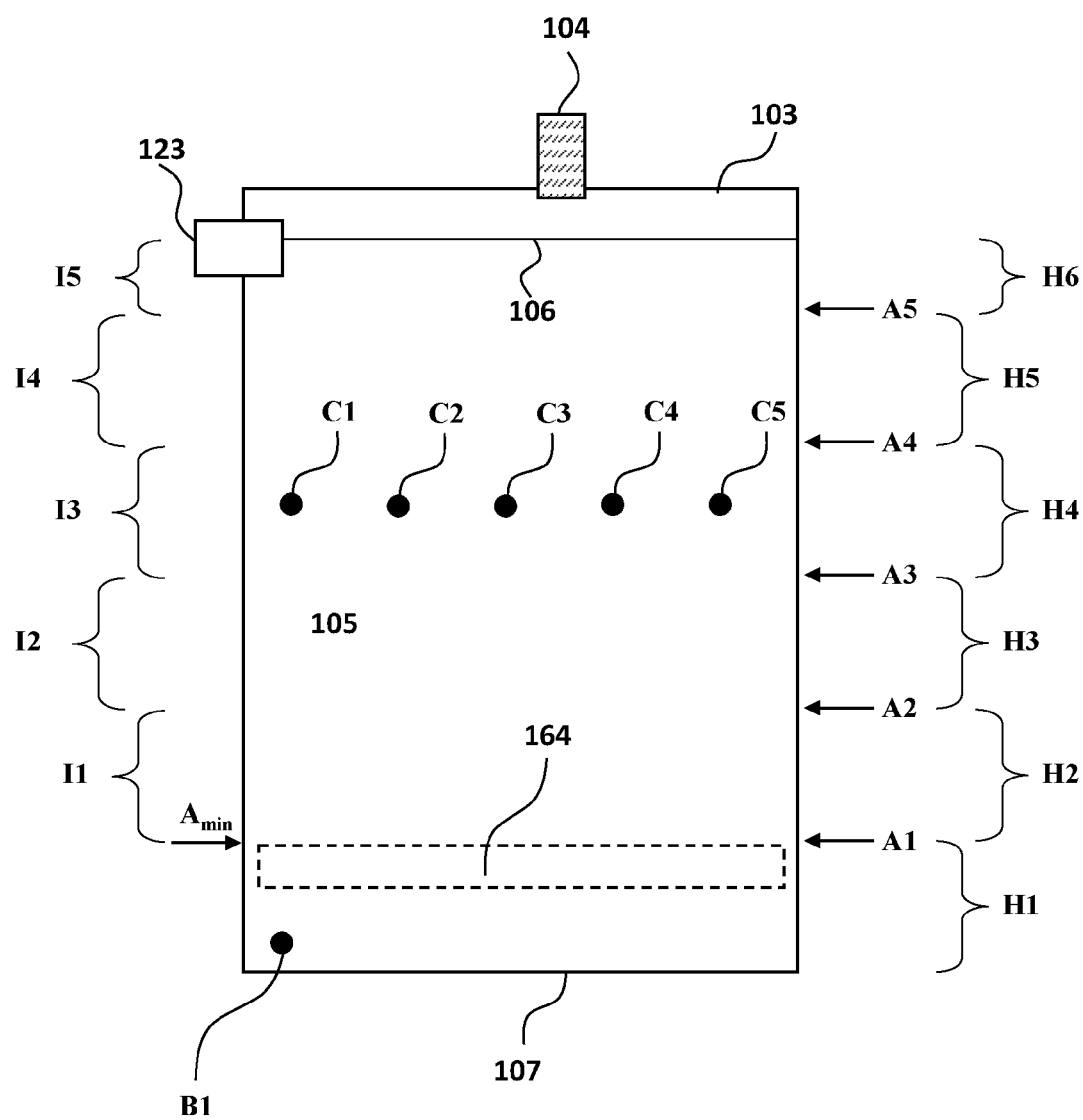

FIG. 9 is an illustration of the test method for determining the mass ratio of the feedstock, more preferably the first polyester, to the first organic compound in the volume section $V_1$. FIG. 9 shows an enlargement of the cross-section of the volume section $V_1$ 103 of FIG. 1A (for illustration purposes the dimension of the volume section $V_1$ 103 in FIG. 9 has been changed compared to the dimensions of the volume section $V_1$ in FIG. 1A).

The first initial mixture 105 in the volume section $V_1$ is divided into a number of height sections H as shown in FIG. 9. The first height section H1 is bordered by the bottom 107 of the volume section $V_1$ 103 and a height A1, the second height section H2 is bordered by the heights A1 and A2, etc. The last height section H6 is bordered by the height A5 and the surface 106 of the first initial mixture 105. While FIG. 9 shows 6 height sections H, the number of height sections is determined by the fill height of the first initial mixture 105 in the volume section $V_1$ 103. The height sections should each have a height of 20 cm, with the exception of the last height section bordered by the surface of the first initial mixture (height section H6 in FIG. 9). E.g., if the fill height of the first initial mixture in the volume section $V_1$ is 150 cm, then the first initial mixture is divided into 8 height sections, with 7 height section have a height of 20 cm, and the last height section having a height of 10 cm. The height of the first height section H1, bordered by the bottom 107, is measured from the lowest point of the bottom 107. 5 samples of the first initial mixture are taken in each height section. Each sample taken has a volume of 250 ml. All samples taken are then combined to obtain a collective sample. The mass ratio is determined using the collective sample.

If the volume section $V_1$ is agitated during the normal operation of the PET recycling process, the samples should be taken while the volume section $V_1$ is being agitated. In this case, the 5 samples taken in a height section should be taken at the same position in the height section, with the taking of two subsequent samples being separated by a two-minute interval. This is illustrated in FIG. 9, where the 5 samples in the height section H1 are taken at position B1, with the samples taken at two-minute intervals. The position in a height section where the five samples are taken can be anywhere in the height section.

If the agitation means is a physical agitation means (e.g., 164 in FIG. 9) which does not allow for the taking of samples below a certain height, the lowest height $A_{min}$ where it is possible to take a sample without interfering with the agitation means replaces the bottom 107 in the procedure above, i.e., the first height section is bordered by $A_{min}$. The new height sections I, adjusted for the presence of the agitation means 164, are shown in FIG. 9. Similar to the height sections H, the height sections I also have a height of 20 cm, with the exception of the height section 15 bordered by the surface 106.

If the volume section $V_1$ is not agitated during the normal operation of the PET recycling process, the 5 samples taken in a height section should be taken at positions that are evenly spread out in a direction that is perpendicular to the height of the first initial mixture. This is shown as positions $C_1$ to $C_5$ in FIG. 9.

EXAMPLES

The invention is illustrated further by way of examples. The invention is not restricted to the examples. In the tables given in the examples, the size of a technical effect is indicated by one or more "−" or "+". The scale, arranged from lowest to highest, is as follows: "−−−, −−, −, +, ++, +++". A value of "Ref" indicates a reference value, i.e., the increase or decrease of a technical effect is relative to the "Ref" value. A value of "O" indicates no change with respect to the reference value. When a "Ref" value is used, the scale, arranged from lowest to highest, is as follows: "−−−, −−, −, Ref, +, ++, +++".

Basic Set-Up

Unless specified otherwise, the basic set-up described below applies to all examples.

A feedstock comprising PET flakes is provided. The PET flakes were obtained by processing (e.g., shredding) used PET bottles. The PET flakes subjected to the method steps as described in FIG. 1A. In other words, the PET flakes are transported through the volume sections $V_1$ and $V_2$, where the volume section $V_2$ has a first zone and a further zone. In both the volume sections $V_1$ and $V_2$, the PET flakes are contacted with MEG. The following parameters are used for the volume section $V_1$: a mass ratio of PET to MEG in the range of 0.06-0.25, a temperature in the range of 60° C. to 65° C., a pressure in the range of 98 kPa to 103 kPa, and a residence time in the range of 20 minutes to 30 minutes. The following parameters are used for the volume section $V_2$: a mass ratio of PET to MEG at an inlet of the volume section $V_2$ in the range of 0.3-0.5, a mass ratio of PET to MEG at an outlet of the volume section $V_2$ in the range of 5-20, a temperature in the range of 60° C. to 200° C., an overpressure in the range of 4 kPa to 8 kPa, and a residence time in the range of 110 minutes to 150 minutes.

As described in FIG. 1B, the PET flakes are subsequently transported from the volume section $V_2$ to the volume section $V_3$ (a glycolysis reactor). The PET flakes in the volume section $V_3$ are also contacted with MEG. The following parameters are used for the glycolysis process in the volume section $V_3$: a temperature in the range of 195° C. to 240° C., an overpressure in the range of 0.7 kPa to 0.9 kPa, and a residence time in the range of 250 minutes to 420 minutes.

As a result of the depolymerisation (via glycolysis) in $V_3$, a first intermediate mixture comprising BHET, PET oligomers and free MEG is obtained. The first intermediate mixture comprises a first intermediate product (BHET and PET oligomers) free MEG, and residual impurities (to be filtered out).

As is also described in FIG. 1B, the intermediate product is transported from the volume section $V_3$ to a volume section $V_4$. The first intermediate mixture is agitated in the volume section $V_4$ while first particulated material is added to the first intermediate mixture. The first intermediate mixture, now comprising the first particulated material, is transported from the volume section $V_4$ to a filtering means, where the first intermediate mixture is subjected to a filtering step. This filtering step also includes the pre-coating step described in FIG. 1B. The filtered, first intermediate mixture is subsequently subjected to polymerisation as described in FIG. 1C. Recycled PET is thus obtained. The recycled PET is used to produce yarn.

Example 1

The example was repeated using different set-ups, as shown in Table 1. Table 1 shows whether the PET flakes are transported along or against gravity when the PET flakes have an intrinsic viscosity that is ≥0.20 dL/g, and whether the PET flakes are transported along or against gravity when the PET flakes have an intrinsic viscosity that is ≤0.09 dL/g. Table 1 also shows the effects of transporting the PET flakes either against or along gravity depending on the intrinsic viscosity of the PET flakes.

The PET flakes are transported against gravity when the PET flakes are transported from the volume section $V_1$ to the volume section $V_2$, as described in FIG. 1A. The PET flakes are also transported against gravity from a bottom to a top of the volume section $V_2$. Once the PET flakes have entered the volume section $V_3$, the PET flakes are transported along gravity, as described in FIG. 1B.

When the PET flakes have an intrinsic viscosity that is less than 0.20 dL/g and more than 0.09 dL/g, the PET flakes are transported along the direction of gravity. This happens when the PET flakes are transported from the volume section $V_2$ to the volume section $V_3$.

TABLE 1

| Example | | | 1.1 | 1.2 | 1.3 | 1.4 |
|---|---|---|---|---|---|---|
| Set-up | | | | | | |
| Intrinsic viscosity of PET flakes [dL/g] | ≥0.20 ≤0.09 | Transport direction | Against Against | Along Along | Against Along | Along Against |
| Technical effects | | | | | | |
| Concentration of impurities remaining after depolymerisation | | | 0 | ++ | Ref | ++ |
| Embrittling of PET flakes | | | − | ++ | ++ | − |
| Heating rate | | | − | + | 0 | 0 |
| Energy required during depolymerisation | | | More | Less | Ref | Slightly less |
| Transport efficiency | | | − | −− | −−− | + |
| Yield of first intermediate product (BHET and PET oligomers) [wt-%] | | | 30-40 | 60-68 | 55-60 | 40-50 |
| Filter lifetime [hours] | | | 150 | 75 | 132 | 110 |
| Colour quality of recycled PET | | | Satisfactory | Not acceptable | Good | Not acceptable |

The technical effects described in Table 1 are as follows:
Concentration of impurities remaining after depolymerisation: the concentration of impurities that are present in the first intermediate mixture that is obtained after depolymerisation, i.e., the mixture that exits the volume section $V_3$. It is desired to decrease the concentration of impurities.
Embrittling of PET flakes: the increase in the brittleness of the PET flakes during the residence of the PET flakes in the volume section $V_2$. It is desired to increase the brittleness of the PET flakes.
Heating rate: how effectively the PET flakes can be heating when the intrinsic viscosity of the PET flakes is larger than or equal to 0.5 dL/g. It is desired to increase the heating rate.
Energy required during depolymerisation: the amount of energy required to depolymerise the PET flakes in the volume sections $V_2$ and $V_3$. It is desired to reduce the energy.
Transport efficiency: how efficiently the PET flakes (in the feedstock and/or partially depolymerised PET flakes) can be transported through the recycling plant without a blockage occurring in a component (e.g., an Archimedean screw). It is desired to increase the transport efficiency and to reduce the occurrence of blockages.
Yield of first intermediate product: the wt-% of BHET and PET oligomers that are obtained after depolymerisation in the volume section $V_3$. The wt-% values are based on a total mass of the first intermediate mixture. It is desired to increase the yield.
Filter lifetime: the number of hours that filters in the recycling plant can be used before requiring cleaning or exchange. This is, for example, the filters that are used to filter the first intermediate mixture that comprises the oligomers that are obtained from the depolymerised PET flakes. It is desired to increase the filter lifetime Colour quality of recycled PET: it is desired that the recycled PET melt obtained after polymerisation has been completed has the following Hunter Lab colour coordinates: an L value of at least 55, and a b value in the range of 2 to 4. Although colouring agents can be used during the recycling process to improve the colour coordinates, it is desired to reduce the amount of colouring agents used. Note that if the colour quality is poor, it is generally not possibly to improve the colour by adding colouring agents.

REFERENCE LIST

100 Assembly and method for producing a further polyester
101 Feedstock
102 Hopper
103 Volume section $V_1$
104 Inlet of volume section $V_1$
105 First initial mixture
106 Surface of the first initial mixture
107 Bottom of volume section $V_1$
108 Volume section $V_2$
109 Conveying screw
110 Even-further direction
111 Level $H_1$ of first organic compound
112 Bottom of volume section $V_2$
113 Level $H_2$ of first organic compound
114 Ground
115 Inlet of the first kind of volume section $V_2$
116 Inlet of the further kind of volume section $V_2$
117 Inlet of the even-further kind of volume section $V_2$
118 Transport direction
119 Boundary
120 First zone
121 Further zone
122 Outlet of volume section $V_2$
123 Outlet of volume section $V_1$
124 Volume section $V_3$
125 Inlet of volume section $V_3$
126 Outlet of volume section $V_3$
127 Volume section $V_4$
128 Inlet of volume section $V_4$
129 Outlet of volume section $V_4$
130 Vertical leaf filter
131 Inlet of vertical leaf filter
132 Outlet of vertical leaf filter
133 Volume section $V_5$
134 Inlet of volume section $V_5$
135 Outlet of volume section $V_5$
136 Direction of flow through volume section $V_3$
137 Volume section $V_6$
138 Inlet of volume section $V_6$
139 Outlet of volume section $V_6$
140 Volume section $V_7$
141 Inlet of volume section $V_7$
142 Outlet of volume section $V_7$
143 Inlet of volume section $V_3$
144 Transport pipe
161 Direction of gravity
200 Measuring angle between even-further direction and horizontal plane
210 Even-further direction
214 Horizontal plane
261 Direction of gravity
262 Angle defining orientation of even-further direction with respect to a horizontal plane
263 Incorrect angle
500 Orientation of a direction
561 Direction of gravity
570 Direction
571 Component parallel to gravity
572 Component perpendicular to gravity
700 SEM image used for determining particle count per area of the impurities
781 Impurities

The invention claimed is:

1. A method for producing a first intermediate product, comprising the steps of
   a. providing a feedstock that comprises a first polyester;
   b. contacting the feedstock with a first amount of a first organic compound in a volume section $V_1$ to obtain a first initial mixture, wherein the first amount is in the form of a liquid and wherein the intrinsic viscosity of the first polyester in the volume section $V_1$ varies by less than 15%;
   c. transporting the first polyester to a volume section $V_2$ from the volume section $V_1$;
   d. contacting the first polyester with a further amount of the first organic compound in the volume section $V_2$;
   e. reducing an intrinsic viscosity of the first polyester in the volume section $V_2$, wherein after the reduction step has been completed in the volume section $V_2$, the first polyester has an intrinsic viscosity in the range of 0.10 dL/g to 0.45 dL/g;
   f. transporting the first polyester to a volume section $V_3$;
   g. contacting the first polyester with a further organic compound in the volume section $V_3$ to obtain a further initial mixture;
   h. reducing a weight average molar mass of the first polyester in the volume section $V_3$ to obtain a first intermediate mixture, wherein the first intermediate mixture comprises
      i. a first intermediate product that has an intrinsic viscosity in the range of 0.010 dL/g to 0.090 dL/g,
      ii. the further organic compound;
   wherein the first polyester is transported
      I./ in a first direction that is at least partially opposite the direction of gravity when the first polyester has an intrinsic viscosity that is larger than or equal to $Y_{IV,1}$, where $Y_{IV,1}$ is 0.10 dL/g;
      II./ in further direction that is at least partially along the direction of gravity when the first polyester has an intrinsic viscosity that is less than or equal to $Y_{IV,2}$, where $Y_{IV,2}$ is 0.09 dL/g; and
      III./ the transport of the first polyester along the first direction comprises transport from the volume section $V_1$ to the volume section V and transport through the volume section $V_2$,
   with the intrinsic viscosity determined according to the method described herein.

2. The method according to claim 1, wherein the first polyester is selected from the group consisting of a polyethylene terephthalate, a polybutylene terephthalate, a polylactide, a polytrimethylene terephthalate, a polyethylene naphthalate, a polycarbonate, a polyester carbonate, a polyarylate, a polyester resin, and a combination of two or more thereof.

3. The method according to claim 1, wherein the first organic compound has at least one or all of the following properties:
  a. comprises at least two hydroxyl groups;
  b. a molar mass of at least 60 g/mol;
  c. a boiling point of at least 192° C.

4. The method according to claim 1, wherein the first polyester in the volume section $V_1$ has an intrinsic viscosity in the range of 0.50 dL/g to 1.00 dL/g, with the intrinsic viscosity determined according to the method described herein.

5. The method according to claim 1, wherein the method further comprises the step of reducing the following in the volume section $V_2$:
  a. the weight average molar mass of the first polyester.

6. The method according to claim 5, wherein after the reduction step has been completed in the volume section $V_2$, the first polyester has the following property: a weight average molar mass in the range of 3 000 Da to 7 500 Da with the weight average molar mass determined according to the method described herein.

7. The method according to claim 1, wherein the further organic compound has at least one or all of the following properties:
  a. comprises at least two hydroxyl groups;
  b. a molar mass of at least 60 g/mol;
  c. a boiling point of at least 192° C.

8. The method according to claim 1, wherein at least 40 wt-% of the first intermediate product is in the form of oligomers that have in the range of 2 to 35 repeating units, with the wt-% determined according to the method described herein.

* * * * *